(12) United States Patent
Moore et al.

(10) Patent No.: US 9,547,423 B1
(45) Date of Patent: Jan. 17, 2017

(54) SYSTEMS AND METHODS FOR GENERATING MESSAGE SEQUENCE DIAGRAMS FROM GRAPHICAL PROGRAMS

(71) Applicant: The MathWorks, Inc., Natick, MA (US)

(72) Inventors: Alan J. Moore, Devon (GB); Ebrahim Mehran Mestchian, Newton, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/513,978

(22) Filed: Oct. 14, 2014

Related U.S. Application Data

(63) Continuation-in-part of application No. 14/150,282, filed on Jan. 8, 2014, which is a continuation-in-part of application No. 13/117,859, filed on May 27, 2011.

(60) Provisional application No. 61/830,839, filed on Jun. 4, 2013, provisional application No. 61/349,401, filed on May 28, 2010.

(51) Int. Cl.
G06F 9/54 (2006.01)
G06F 3/0484 (2013.01)
G06F 3/0481 (2013.01)

(52) U.S. Cl.
CPC ........... *G06F 3/0484* (2013.01); *G06F 3/0481* (2013.01); *G06F 9/546* (2013.01)

(58) Field of Classification Search
CPC .. G06F 9/546; G06F 17/5031; G06F 17/5009; G06F 3/0484; G06F 3/0481; G01R 31/318357
See application file for complete search history.

(56) References Cited

U.S. PATENT DOCUMENTS

| 5,317,746 | A | 5/1994 | Watanabe |
|---|---|---|---|
| 6,519,639 | B1 | 2/2003 | Glasser et al. |
| 6,522,635 | B1 | 2/2003 | Bedwell |
| 7,313,449 | B1 | 12/2007 | Ciolfi et al. |
| 7,324,931 | B1 | 1/2008 | Warlock |

(Continued)

FOREIGN PATENT DOCUMENTS

| GB | 2006/003928 | 5/2007 |
|---|---|---|
| GB | 0521624.4 | 5/2007 |
| GB | 0521625.4 | 5/2007 |

OTHER PUBLICATIONS

"Creating and Managing Timing Diagrams", IBM, retrieved from www.ibm.com on Mar. 29, 2013, 5 pages.

(Continued)

*Primary Examiner* — Syed Roni
(74) *Attorney, Agent, or Firm* — Cesari and McKenna, LLP; Michael R. Reinemann

(57) ABSTRACT

A system and method automatically generating one or more message view windows or panes based on an analysis of the execution behavior of a model, such as a computer-generated, executable graphical model. A model analyzer examines execution instructions including schedules generated for the model and the sending and receiving of messages by model components or elements. An auto diagram builder generates the one or more message view windows that includes graphical affordances representing at least some of the messages. The messages may be presented in the one or more message view windows in the order of the occurrence of the messages during execution of the model.

55 Claims, 29 Drawing Sheets

(56) References Cited

U.S. PATENT DOCUMENTS

| | | | |
|---|---|---|---|
| 7,941,299 | B1 | 5/2011 | Aldrich et al. |
| 7,991,598 | B1 | 8/2011 | Wood |
| 8,190,417 | B2 | 5/2012 | Shachar |
| 8,689,236 | B2 | 4/2014 | Simsek et al. |
| 2002/0013889 | A1 | 1/2002 | Schuster et al. |
| 2004/0230979 | A1 | 11/2004 | Beecroft et al. |
| 2005/0216248 | A1 | 9/2005 | Ciolfi et al. |
| 2007/0288885 | A1 | 12/2007 | Brunel et al. |
| 2008/0059739 | A1 | 3/2008 | Ciolfi |
| 2008/0098349 | A1 | 4/2008 | Lin et al. |
| 2009/0044171 | A1 | 2/2009 | Avadhanula |
| 2009/0132936 | A1 | 5/2009 | Anderson et al. |
| 2009/0164558 | A1 | 6/2009 | Hofmann |
| 2009/0177779 | A1 | 7/2009 | DeVal et al. |
| 2009/0204949 | A1 | 8/2009 | Howland et al. |
| 2009/0240449 | A1 | 9/2009 | Gibala |
| 2009/0292518 | A1 | 11/2009 | Shachar et al. |
| 2010/0049821 | A1 | 2/2010 | Oved |
| 2010/0070753 | A1 | 3/2010 | Kido et al. |
| 2011/0106890 | A1 | 5/2011 | Karpov |
| 2011/0296436 | A1 | 12/2011 | Moore et al. |

OTHER PUBLICATIONS

"Creating Communication Diagrams", IBM, retrieved from www.ibm.com on Mar. 29. 2013, 12 pages.

"Creating Sequence Diagrams", IBM, retrieved from www.ibm.com on Mar. 29. 2013, 24 pages.

"UML Sequence Diagrams", uml-diagrams.org, retrieved from http://www.uml-diagrams.org/sequence-diagrams.html on Mar. 29, 2013, 18 pages.

Ciancarini, Paolo, "Exercises on Basic UML Behaviors," Nov. 2013, pp. 1-38.

Dumond, Yves, et al., "A Relationship Between Sequence and Statechart Diagrams," 2000, pp. 1-6.

Gronmo, Roy, et al., "From UML 2 Sequence Diagrams to State Machines by Graph Transformation," Journal of Object Technology, AITO-Association Internationale pour les Technologies Objets, JOT, vol. 10, Jun. 2011, pp. 1-22.

Harel, David, et al., "Synthesis Revisited: Generating Statechart Models from Scenario-Based Requirements," Formal Methods in Software and Systems Modeling, LNCS, vol. 3393, Springer-Verlag Berlin, Heidelberg, Jan. 13, 2005, pp. 1-18.

Latronico, Beth, et al., "Representing Embedded System Sequence Diagrams as a Formal Language," Electrical & Computer Engineering, Carnegie Mellon University, UML, Oct. 2001, pp. 1-23.

U.S. Appl. No. 13/117,531, filed May 27, 2011 by Hidayet Tunc Simsek et al. for Message-Based Modeling, pp. 1-62.

U.S. Appl. No. 13/117,859, filed May 27, 2011 by Alan J. Moore et al. for a Message-Based Model Verification, pp. 1-62.

Whittle, Jon, et al., "Generating Statechart Designs From Scenarios," Jun. 2000, pp. 1-10.

Bagrodia, Rajive I., et al., "A Message-Based Approach to Discrete-Event Simulation," IEEE, IEEE Transactions on Software Engineering, vol. SE-13, No. 6, Jun. 1987, pp. 654-665.

Bringmann, Eckard, Automated Model-Based Testing of Control Software with TPT, 2008, pp. 1-19.

Bringmann, Eckard, "Model-Based Testing of Automotive Systems," International Conference on Software Testing, Verification and Validation (ICST), 2008, pp. 1-9.

Cleaveland, Rance, et al., "AN Instrumentation-Based Approach to Controller Model Validation," Model-Driven Development of Reliable Automotive Services. Second Automotive Software Workshop, ASWSD 2006, Revised Selected Papers Springer-Verlag Berlin, 2008, pp. 1-14.

Heverhagen, Torsten, et al., "A Profile for Integrating Function Blocks into the Unifiled Modeling Language," http://www-verimag.imag.fr/EVENTS/2003/SVERTS/PAPERS-WEB/08-Heverhagen-FunctionBlockAdapters.pdf, Oct. 20, 2003, pp. 1-19.

Hoffmann, Ph.D., Hans-Peter, "SysML-Based Systems Engineering Using a Model-Driven Development Approach," Telelogic, an IBM Company, Version 1, Jul. 2008, pp. 1-16.

Hooman, Jozef, et al., "Coupling Simulink and UML Models," http://www.mbsd.cs.ru.nl/publications/papers/hooman/FORMS04.pdf, 2004, pp. 1-8.

Krahl, David, et al., "A Message-Based Discrete Event Simulation Architecture," IEEE, Proceedings of the 1997 Winter Simulation Conference, Winter 1997, pp. 1361-1367.

Krahl, David, "Extendsim 7," IEEE, Proceedings of the 2008 Winter Simulation Conference, Winter 2008, pp. 215-221.

McQuillan, John M., et al., "Some Considerations for a High Performance Message-Based Interprocess Communication System," Bolt Beranek and Newman, Inc., Jul. 1975, pp. 77-86.

"Notification of Transmittal of the International Search Report and the Written Opinion of the International Searching Authority, or the Declaration," International Filing Date: May 27, 2011, International Application No. PCT/US2011/000964, Applicant: The MathWorks, Inc., Date of Mailing: Aug. 25, 2011, pp. 1-12.

Notification of Transmittal of the International Search Report and the Written Opinion of the International Searching Authority, or the Declaration, International Filing Date: May 27, 2011, International Application No. PCT/US2011/000967, Applicant: The MathWorks, Inc., Date of Mailing: Aug. 26, 2011, pp. 1-12.

"Public Health Information Network Messaging System (PHINMS),"Technical Guide Version 2.8.01, U.S. Department of Health & Human Services, Feb. 2, 2009, pp. 1-50.

"Real-Time Workshop: For Use with Simulink-Getting Started," Version 6, The MathWorks, Inc., Jun. 2004, pp. i-iv, 1-1 to 1-20 and 2-1 to 2-30.

"Simulink® 7: User's Guide," The MathWorks, Inc., Sep. 2009, pp. i -xlvi, 1-1 to 1-46, 2-1 to 2-44, 3-1 to 3-34, 4-1 to 4138, 5-1 to 5-30, 6-1 to 6-84, 7-1 to 7-60, 8-1 to 8-26, 9-1 to 9-60, 10-1 to 10-88, 11-1 to 11-30, 12-1 to 12-66, 13-1 to 13-58, 14-1 to 14-28, 15-1 to 15-36, 16-1 to 16-28, 17-1 to 17-46, 18-1 to 18-16, 19-1 to 19-68, 20-1 to 20-32, 21-1 to 21-32, 22-1 to 22-16, 23-1 to 23-10, 24-1 to 24-24, 25-1 to 25-12, 26-1 to 26-42, 27-1 to 27-36, 28-1 to 28-26, 29-1 to 29-46, 30-1 to 30-160, 31-1 to 31-32, Glossary-1 to Glossary-2, A-1 to A-4, Index-1 to Index-22.

"Simulink, Model-based and System-based Design", The MathWorks, 2004, pp. 1-488.

"Simulink® Verification and Validation 2: User's Guide," The MathWorks, Inc., Sep. 2007, pp. i-xii, 1-1 to 1-6, 2-1 to 258, 3-1 to 3-32, 4-1 to 4-28, 5-1 to 5-66, 6-1 to 6-30, 7-1 to 7-4, 8-1 to 8-56, 9-1 to 9-4, 10-1 to 10-42, A-1 to A-4, and Index-1 to Index-4.

Traub, Matthias, et al., "Generating Hardware Descriptions from Automotive Function Models for an FPGA-Based Body Controller: A Case Study," http://www.mathworks.com/automotive/macde2008/ proceedings/day2/04_daimler_generting_hw_descriptions_with_$_{hdl}$_coder_papers.pdf, 2008, pp. 1-8.

U.S. Appl. No. 14/163,147, filed Jan. 24, 2014 by Hidayet T. Simsek et al. for Message-Based Modeling, pp. 1-64.

Behrmann, Gerd, et al., "A Tutorial on UPPAAL 4.0," Nov. 28, 2006, pp. 1-48.

Bobbio, Andrea, "System Modeling with Petri Nets," A. G. Colombo and A. Saiz de Bustamante (eds.), System Reliability Assessment, Kluwer p. c., 1990, pp. 1-44.

Campos-Rebelo, Rogerio, et al., "From IOPT Petri Nets to C: An Automatic Code Generator Tool," 2011 9th IEEE International Conference on Industrial Informatics, Caparica, Lisbon, IEEE, Jul. 26-29, 2011, pp. 390-395.

Leung, Man-Kit, "An Extensible and Retargetable Code Generation Framework for Actor Models," Electrical Engineering and Computer Sciences University of California at Berkeley, Dec. 19, 2009, pp. 1-82.

Murata, Tado, "Petri Nets: Properties, Analysis and applications," Proceedings of the IEEE, vol. 77, No. 4, IEEE, Apr. 1989, pp. 541-580.

Van Der Aalast, W.M.P., et al., "Analysis of Discrete-time Stochastic Petri Nets," Statistica Neerlandica, vol. 54, Issue 2, Blackwell Publishers, Ltd., Jul. 2000, pp. 1-17.

SYSTEMS AND METHODS FOR GENERATING MESSAGE SEQUENCE DIAGRAMS FROM GRAPHICAL PROGRAMS

CROSS-REFERENCE TO RELATED APPLICATIONS

This application is a continuation-in-part of U.S. patent application Ser. No. 14/150,282, filed Jan. 8, 2014, which claims the benefit of U.S. Provisional Patent Application Ser. No. 61/830,839, filed Jun. 4, 2013, and is a continuation-in-part of U.S. patent application Ser. No. 13/117,859, filed May 27, 2011, which claims the benefit of U.S. Provisional Application Ser. No. 61/349,401, filed May 28, 2010, which applications are hereby incorporated by reference in their entireties.

BRIEF DESCRIPTION OF THE DRAWINGS

The description below refers to the accompanying drawings, of which.

DETAILED DESCRIPTION OF ILLUSTRATIVE EMBODIMENTS

Figure 1:
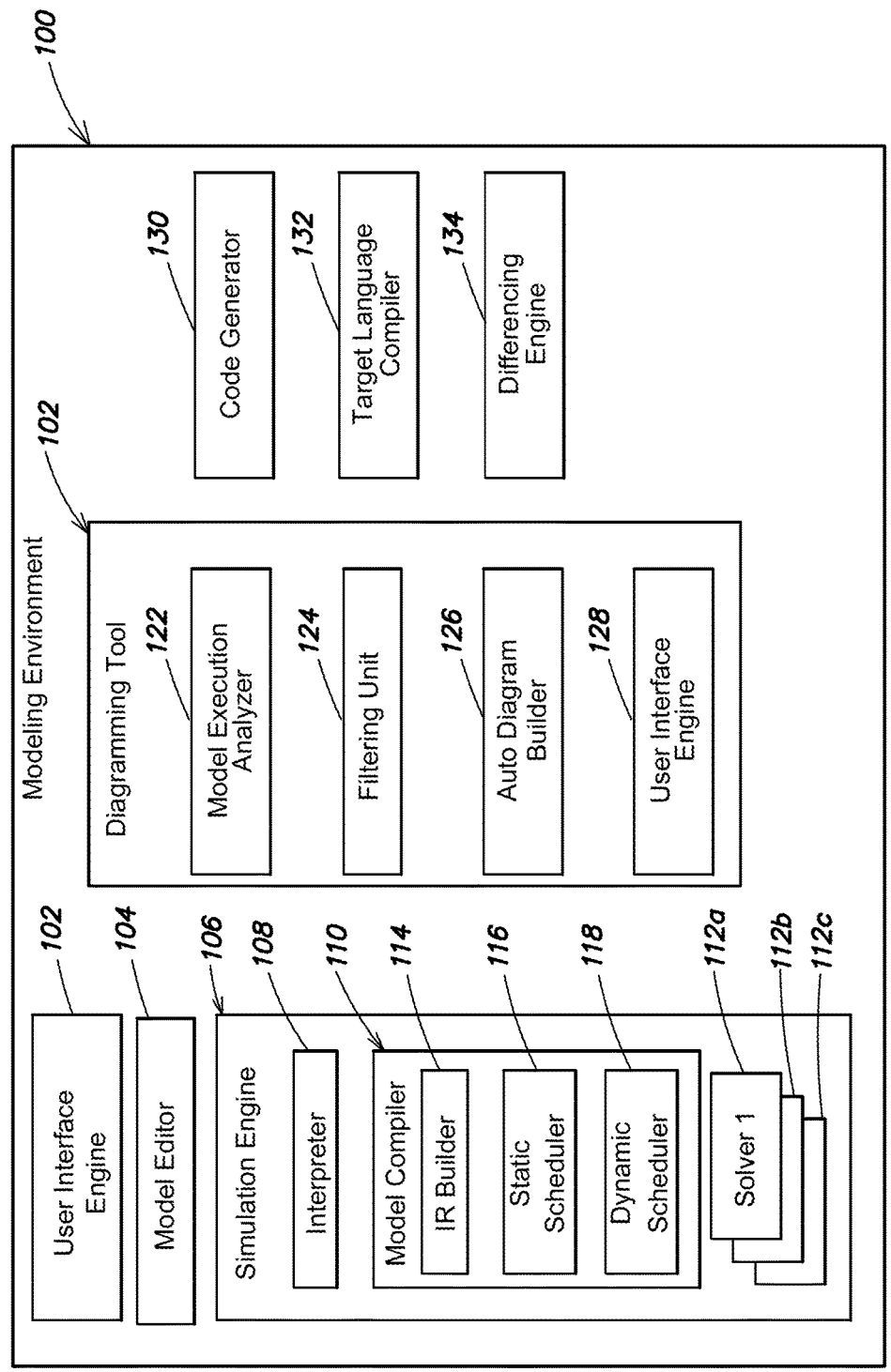
FIG. 1 is a partial, functional block diagram of a modeling environment in accordance with an embodiment of the disclosure.

The Unified Modeling Language (UML) is a standard visual modeling language used to specify and/or document new or existing business processes or software systems. The UML standard defines many different types of diagrams including Class Diagrams, Object Diagrams, State Machine Diagrams, and Interaction Diagrams. Examples of Interaction Diagrams include Sequence Diagrams, Communication Diagrams, and Timing Diagrams, which provide different views of the interaction among objects or entities of a process or system. A Sequence Diagram typically illustrates message interchange between objects or entities of a business process or software system. A Timing Diagram typically illustrates the timing or duration of messages or conditions in the system or process. A developer or other user may create UML diagrams using a variety of existing software tools, such as the Systems Modeling Language (SysML) from the Object Management Group (OMG) and IBM Rational Rose from IBM, among others.

Tools, such as modeling environments, also exist for creating computer-generated models, such as graphical behavioral models, that represent dynamic systems. A model may include a plurality of graphical objects, such as blocks or icons. A model may be executed to simulate the operation or behavior of the system being modeled. For example, the model may be executed by evaluating the model at a plurality of simulation (or execution) time steps beginning at a start time and ending at a stop time. In a single-rate model, all of the objects may execute during each time step, except for objects configured for conditional execution where the condition is not met. In a multi-rate model, objects execute at different rates relative to each other and thus in a given time step only a portion of the blocks may execute. Some of the graphical objects of the model may generate and/or process signals. A signal may refer to a time varying quantity having one or more values for example at all points in time during model execution. In addition, some objects of the model may generate and/or process messages that may have payloads that include one or more values. Payloads may be fixed and may persist for a determined time interval during a simulation time. A message may be generated at a particular point in time during model execution, e.g., by a source message-based block, and may only exist for a limited time interval, during which the message may be read by another message-based block, such as an intermediary block or a sink block.

To execute a model, a scheduling order may be created that specifies an order of execution of at least some of the objects or components that make up a model. In addition, one or more execution tasks may be implemented or defined, and the objects of the model may be assigned to the one or more tasks for execution. Priorities may be assigned to the tasks, and a higher priority task may preempt and/or block execution of a lower priority task.

The present invention relates to systems and methods for automatically generating and presenting one or more message views based on an analysis of a model, such as a computer-generated, executable graphical model. In an embodiment, a system may include a modeling environment having a user interface engine, a model editor and a simulation engine. The simulation engine may include one or more schedulers, such as a static scheduler, which may apply a scheduling algorithm, such as the Rate Monotonic Scheduling (RMS) algorithm, and a dynamic scheduler that may, for example, use an event calendar to establish a schedule. The simulation engine also may include one or more solvers. The modeling environment may support the creation of a model having dynamic, i.e., time-based, objects, and state-based objects, among other objects, and at least some of the time-based and state-based objects may be further configured to send and/or receive messages. The modeling environment also may include or be in communication with a diagramming tool. The diagramming tool may include a plurality of components, such as a model analyzer, a filtering unit, an auto diagram builder, and a user interface (UI) engine.

The model analyzer may be configured to examine a model created in the modeling environment, and determine when particular execution activities, such as the occurrence of events, the execution of objects or blocks, the sending and receiving of messages, the changes in signal values, the changes in states, occur during execution of the model. The auto diagram builder may be configured to receive information concerning the model's execution behavior, and to automatically generate one or more message views for the model. The filtering unit may receive inputs, such as user inputs, specifying selected model elements, such as objects, signals, messages, queues, communication elements, etc., to be included in the message view. For example, a user may designate one or more signals, functions, state-based blocks, time-based blocks, and messages to be included in the message view generated by the auto diagram builder. The diagramming tool may be configured to provide the message view to an output device, such as a display or a printer. A user may review the message view to observe and thus better understand the execution behavior of the model.

The message view may be dynamically generated and updated during execution of the model. Alternatively, information needed to generate the message view may be logged or otherwise saved during model execution, and the message view may be generated following model execution, for example in a post-mortem analysis.

Message Sequence Diagramming

A first message view, which may also be referred to as a message sequence diagram, created by the auto diagram builder may include a plurality of visual elements including lifelines and message arrows. The lifelines, which may be vertically oriented on the first message sequence diagram, may represent selected message-based objects of the model, such as message source and/or message sink objects. The arrows, which may extend between the lifelines, may represent selected messages, such as synchronous and asynchronous messages, that are sent and received by the objects illustrated by the lifelines. As the model executes, the first message sequence diagram may scroll, e.g., upward, and the temporal relationship among events or other interactions or activities may be shown on a dynamic, e.g., scrolling, diagram.

The auto diagram builder may include execution timing information on the message sequence diagram. For example, the auto diagram builder may include a plurality of epoch elements in the diagram where each epoch element represents an execution time increment or instant defined during execution of the model. In an embodiment, the epochs may correspond to simulation steps and/or sample times determined by the simulation engine. For example, a model may execute over a simulation time that starts at a simulation start time and ends at a simulation end time. States and outputs defined by model objects and other values may be computed at successive points in time between the start and end times. These points in time may be referred to as simulation steps or time steps, and their size may be fixed or variable as determined by a particular solver used by the simulation engine. In another embodiment, epochs may correspond to time periods specified by a user, and may be hierarchically organized, e.g., into major and minor epochs, and the periods and organization of epochs may be changed during execution of visualization. In a state-based modeling environment, such as the Stateflow system, when a state diagram executes, it may respond to an event that may occur in its context. An event may be a sample time hit. In response to this event, one or more transitions may be possible. In a normal step, which may also be referred to as a micro step, only one such transition may be executed. In a superstep, which may also be referred to as a macro step, multiple such transitions may be executed. A superstep may complete when the state diagram, which may be referred to as a state chart, reaches a new stable configuration, e.g., no more transitions from active states exist. Also, during execution of a state chart, new events may be generated locally instead of in the state chart context. The corresponding chart activity may take place in a local step. In an embodiment, epochs may correspond to one or more of these various steps, e.g., micro step, superstep, and local step. The type of step to which an epoch corresponds may be user-specified. Additionally, or alternatively, the multiple types of epochs may be indicated, e.g., explicitly, in a message sequence diagram. The epoch elements may be illustrated by horizontally arranged bands or regions overlaid on the first message sequence diagram. The first message sequence diagram may thus illustrate the particular time instants in which selected messages are sent and received by selected message-based objects of the model.

The simulation engine may implement or define a single task or multiple tasks or processes for executing various portions of the model. A task may be scheduled, and a task may have an execution list that includes a set of blocks. The model compiler may assign priorities to the tasks, and may assign graphical objects or other model elements, such as blocks, to a particular task for execution. For example, an object associated with a higher sample rate than another object or task may be assigned to a task having a higher priority than another task to which objects having a lower sample rate are assigned. A higher priority task may preempt execution of a lower priority task. In addition, the simulation engine may implement a blocking (or non-blocking) execution paradigm. Blocking refers to the process of placing a task on hold because the task is waiting for something, e.g., input data, a resource, a reply to a function call, a return from a function call, etc. The assignment of priorities and the use of blocking or non-blocking schemes may depend on the scheduling algorithm being used by the simulation engine. Other scheduling algorithms, besides RMS, include Earliest Deadline First, Static Cyclic Scheduling, and Deadline Monotonic Scheduling.

The simulation engine may be configured to simulate a multitask environment. In addition, the simulation engine may be configured to simulate the contention for access to shared resources, such a processor resource, a memory resource, a communication resource, etc., by objects of the model or by tasks.

To execute message-based blocks, the simulation engine may allocate queues, such as input and/or output queues, for the message-based blocks, and the queues may be used to temporarily store the values of messages received and/or to be sent by the message-based blocks.

The model analyzer may detect the allocation of such queues, and the auto diagram builder may include queue elements in the first message sequence diagram. A queue element may include a vertically arranged queue lifeline that is disposed adjacent to the lifeline for the respective message-based block. To the extent messages are sent from an output queue of a source block and received in an input queue of a sink block, message arrows of the message sequence diagram may extend between the respective queue lifelines. In an embodiment, a graphical affordance, such as a queue depth bar, may be provided on at least some of the queue lifelines that indicate the number of messages in the queue represented by the respective queue lifeline. For example, a queue depth bar may have a width that indicates the number of messages in the respective queue. The queue depth bar may be widened when an additional message is added to the queue, and narrowed when a message is removed from the queue.

The queue depth bar also may be configured to indicate if the depth of the queue has been exceeded. For example, a queue may have a depth of five, if a sixth message is sent to the queue, the color of the queue depth bar may be changed by the auto diagram builder, e.g., from green to red, or some other indication may be provided.

Interactive Diagrams

In an embodiment, a user may modify a message sequence diagram. For example, the user may change the execution of a selected task from a first epoch to a second epoch, e.g., by dragging and dropping the task execution bar from a first epoch element to a second epoch element. The user also may change when a selected message is sent and/or received by editing the corresponding arrow, again using drag and drop techniques. Other changes may be made to a message sequence diagram. The user-initiated changes may be captured by the UI engine of the diagramming tool. The diagramming tool may notify the simulation engine of the changes detected in the message sequence diagram. The simulation engine, including the model compiler and the schedulers, may generate new execution instructions for the model that conform to the user-modified message sequence diagram. For example, the schedulers may reschedule the execution order of one or more objects of the model in order to comply with the changes made to the message sequence diagram. In an embodiment, the simulation engine may be configured to create new execution constraints for example based changes in the order of one or more messages. The simulation engine may then attempt to generate an execution schedule that satisfies these new constraints. If such a schedule cannot be generated, a warning or error message may be issued and presented, e.g., on a display. In addition, the user may designate at least some changes as preferential, and the simulation engine may create preferential constraints. If a schedule cannot be generated that satisfies one or more of the preferential constraints, the preferential constraints that cannot be satisfied may be removed, and a schedule generated. In addition to creating new constraints, or alternatively, the simulation engine may be configured to modify other execution information, such as sample time, e.g., period and offset, in order to generate a new schedule that implements the user's changes.

Modeling Environment

FIG. 1 is a partial, functional block diagram of a modeling environment 100 in accordance with an embodiment of the invention. The modeling environment 100 may include a plurality of modules or components. For example, the modeling environment 100 may include a user interface engine 102, a model editor 104, and a simulation engine 106. The simulation engine 106 may include an interpreter 108, a model compiler 110, and one or more solvers, such as solvers 112a-c. The model compiler 110 may include one or more Intermediate Representation (IR) builders, such as IR builder 114, and one or more schedulers, such as a static scheduler 116 and a dynamic scheduler 118. The user interface engine 102 may be configured to create and present one or more User Interfaces (UIs), such as Graphical User Interfaces (GUIs) and/or Command Line Interfaces (CLIs), on one or more display devices of a computer processing device. The one or more GUIs and/or CLIs may be operated by users to perform various modeling tasks, such as opening, creating and saving models, such as computer-generated, executable graphical models. The GUIs and/or CLIs may also be used to enter commands, set values for parameters and properties, run models, enter commands, change model settings, etc. The model editor 104 may be configured to perform selected operations, such as open, create, edit, and save, in response to the user inputs. The simulation engine 106 may be configured to generate execution instructions for a model, and execute, e.g., compile and run or interpret, the model, using one or more of the solvers 112a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink 7 User's Guide* from The MathWorks, Inc. (September 2013 ed.), which is hereby incorporated by reference in its entirety.

The modeling environment 100 may further include a diagramming tool 120. The diagramming tool 120 may include a model execution analyzer 122, a filtering unit 124, an automatic (auto) diagram builder 126, and a user interface (UI) engine 128. As described herein, the model execution analyzer 122 may be configured to examine the execution instructions generated by the simulation engine 106 for a specified model. The filtering unit 124 may be configured to search the execution instructions for particular elements of the model. The auto diagram builder 126 may be configured to generate one or more message sequence diagrams utilizing the information obtained by the model execution analyzer 122, as filtered by the filtering unit 124. The UI engine 128 may be configured to generate one or more user interfaces that include the one or more message sequence diagrams and to receive edits thereto.

The modeling environment 100 may include other components, such as a code generator 130, a target language compiler 132, and a differencing engine 134. The code generator 130 may be configured to generate computer programming code, such as source and/or object code, from a model. The target language compiler 132 may be configured to compile source code, such as source code generated by the code generator 130, into an executable form, such as one or more object code files or binaries, for execution by target platform or target hardware, such as a central processing unit (CPU), an embedded processor, a microprocessor, a microcontroller, a Field Programmable Gate Array (FPGA), an Application Specific Integrated Circuit (ASIC), a Graphics Processing Unit (GPU), etc., of a data processing device. The differencing engine 134 may be configured to analyze two models, identify the differences between them, and generate a report that sets forth the identified differences.

Suitable code generators for use with the present invention include, but are not limited to, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include C and C++ language compilers. Nonetheless, other code generation systems and other compilers may be used. Suitable differencing engines include the version compare utility in the Simulink Report Generator tool and the SimDiff tool from Ensoft Corp. of Ames, Iowa.

In an embodiment, the diagramming tool 120 may be implemented through one or more software modules or libraries containing program instructions pertaining to the methods described herein. The software modules may be stored in one or more memories, such as a main memory, a persistent memory and/or on computer readable media, of a workstation or other data processing machine or device, and executed by one or more processing elements. Other computer readable media may also be used to store and execute these program instructions, such as non-transitory computer readable media, such as optical, magnetic, or magneto-optical media. In another embodiment, the diagramming tool 120 may comprise registers and combinational logic implemented in hardware and configured and arranged to produce sequential logic circuits. In alternative embodiments, various combinations of software and hardware, including firmware, may be utilized to implement the described methods.

In other embodiments, the diagramming tool 120, or one or more components thereof, may be separate from the modeling environment 100. In such cases, the diagramming tool 120 may be in communication with the modeling environment 100, e.g., through local procedure calls (LPCs), remote procedure calls (RPCs), or one or more Application Programming Interfaces (APIs).

In an embodiment, the modeling environment 100 is a high-level modeling environment. Suitable high-level modeling environments include the MATLAB® and Simulink® technical computing environments from The MathWorks, Inc., as well as the Simscape physical modeling system and the Stateflow charting tool also from The MathWorks, Inc., the MapleSim physical modeling and simulation tool from Waterloo Maple Inc. of Waterloo, Ontario, Canada, the LabVIEW programming system and the NI MatrixX model-based design product both from National Instruments Corp. of Austin, Tex., the Visual Engineering Environment (VEE) product from Agilent Technologies, Inc. of Santa Clara, Calif., the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, the System Generator system from Xilinx, Inc. of San Jose, Calif., and the graphical modeling systems described in U.S. Pat. No. 7,324,931 for Conversion of Model Components Into References and U.S. Pat. No. 7,991,598 for Method and System for Modeling a Mechanical System, which are hereby incorporated by reference in their entireties, among others. Models created in the high-level modeling environment may contain less implementation detail, and thus operate at a higher level than certain programming languages, such as the C, C++, C#, and SystemC programming languages.

Those skilled in the art will understand that the MATLAB® technical computing environment is a math-oriented, textual programming environment for digital signal processing (DSP) design, among other uses. The Simulink® technical computing environment is a model-based design environment for modeling and simulating dynamic and other systems, among other uses. The MATLAB® and Simulink® tools provide a number of high-level features that facilitate algorithm development and exploration, and support model-based design. Exemplary high-level features include dynamic typing, array-based operations, noncausal equation processing, data type inferencing, sample time inferencing, and execution order inferencing, among others.

In another embodiment, a lower level programming language, such as the C, C++, and C# programming languages, among others, may be used to create one or more models.

Models constructed by the modeling environment 102 may include textual models, graphical models, and combinations of graphical and textual models. A given model may simulate, e.g., approximate the operation of, a system. Exemplary systems include physical systems, such as weather systems, financial markets, plants, controllers, etc. A model may be executed in order to simulate the system being modeled, and the execution of a model may be referred to as simulating the model.

Figure 2:
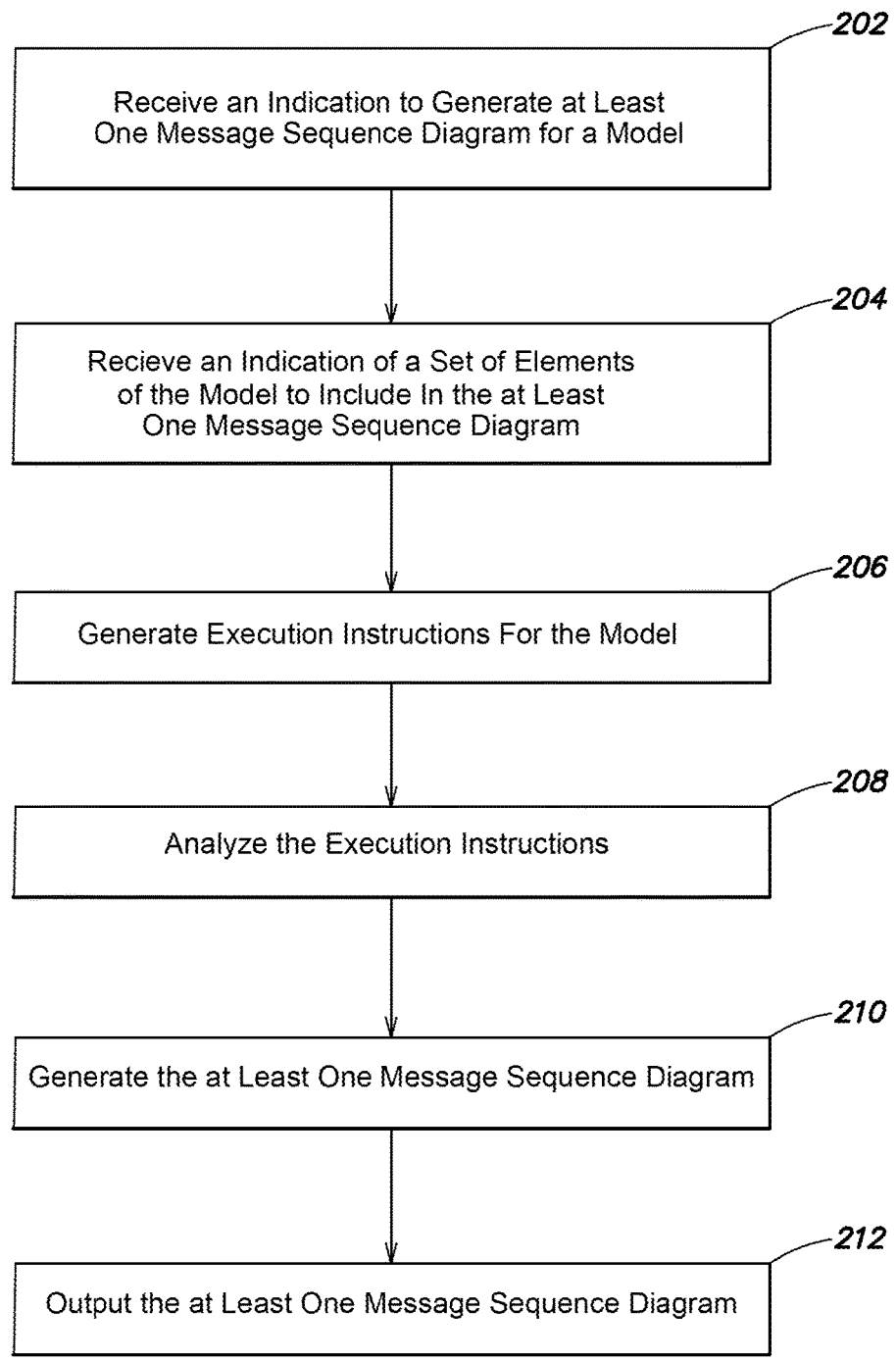
FIG. 2 is a flow diagram of a method in accordance with an embodiment of the disclosure.

FIG. 2 is a flow diagram of a method in accordance with an embodiment of the present invention.

The diagramming tool 120 may receive an indication, such as a command, to generate one or more message sequence diagrams for a model, as indicated at block 202. The diagramming tool 120 also may receive an indication of one or more model elements to be included in the one or more message sequence diagrams to be generated, as indicated at block 204. In an embodiment, the user interface engine 102 may be configured to present one or more model editor windows on a display. The model editor windows may include a plurality of graphical elements, such as menu bars, tool bars, and a canvas for displaying a graphical model. A user may select one or more elements of a model presented on the model canvas. Alternatively or additionally, a parameter or property may be defined for at least some of the graphical objects used in models. The setting of the parameter may determine whether the respective object is to be included in a message sequence diagram. To set the parameter, the user may select the respective object, and the UI engine 128 may present a graphical affordance, such as a dialog or pane, through which the value of the parameter may be set by the user.

The simulation engine 106 may generate execution instructions for the model, as indicated at block 206. The generation of execution instructions, and the simulation of a model may involve several phases, such as a compilation phase, a link phase, and a simulation phase. Model execution may involve processing input data and generating output data. In an embodiment, execution of the model may be carried out over a time span, e.g., a simulation time, which may be user specified or machine specified. The simulation time is a logical execution time, and may begin at a simulation start time and end at a simulation end time. At successive points in time between the simulation start and end times, which points in time may be called simulation time steps, states, inputs and outputs of objects of the model may be computed. The sizes of the time steps may be fixed or may vary, and are determined by the particular solver 112 used in the execution of the model. Execution instructions may be generated for the entire simulation time.

Model Compilation Phase

A compile stage may mark the start of execution of the model, and may involve preparing data structures and evaluating parameters, configuring and propagating block characteristics, determining block connectivity, and performing block reduction and block insertion. The preparation of data structures and the evaluation of parameters may result in the creation and initialization of one or more data structures for use in the compile stage. For the blocks of the model, a method may force the block to evaluate all of its parameters. This method may be called for the blocks in the model. If there are any unresolved parameters, execution and/or compilation errors may be thrown. During the configuration and propagation of block and port/signal characteristics, the compiled attributes (such as data dimensions, data types, complexity, sample modes, and sample time) of each block and/or port/signal may be setup on the basis of the corresponding behaviors and the attributes of blocks and/or port/signal that are connected to the given block and/or port/signal, which connections may be graphically represented on the model through lines, arrows or other connectors. The attribute setup may be performed through a process during which block behaviors "ripple through" the model from one block to the next following signal, state, physical, message or other connectivity.

This process is referred to as inferencing, an implementation of which is propagation. In the case of a block that has explicitly specified its block (or port) behaviors, propagation helps ensure that the attributes of the block (or port) are compatible with the attributes of the blocks (or ports) connected to it. If not, a warning or an error may be issued. Secondly, in many cases, blocks (or ports) are implemented to be compatible with a wide range of attributes. Such blocks (or ports) may adapt their behavior in accordance with the attributes of the blocks (or ports) connected to them. The exact implementation of the block may be chosen on the basis of the model in which the block finds itself. Included within this step may be other aspects such as validating that all rate-transitions yield deterministic results, and that the appropriate rate transition blocks and/or delay blocks are being used. The compilation step also may determine actual block connectivity. For example, virtual blocks may play no semantic role in the execution of a model. In this step, the virtual blocks may be optimized away, e.g., removed, and the remaining non-virtual blocks may be reconnected to each other appropriately. This compiled version of the design model with actual block connections may be used from this point forward in the execution process. The way in which blocks are interconnected in the model does not necessarily define the order in which the equations (e.g., included in methods) corresponding to the individual blocks will be solved (executed). These equations may include outputs equations, derivatives equations and update equations.

Block sample times may also be determined during the compilation stage. A block's sample time may be set explicitly, e.g., by setting a SampleTime parameter of the block, or it may be determined in an implicit manner based on the block's type or its context within the model. The SampleTime parameter may be a vector $[T_s, T_o]$ where $T_s$ is the sampling period and $T_o$ is the initial time offset.

The selected solver 112 may determine the size of the simulation time steps for the simulation of the model, and these simulation time steps may be selected to correspond with the sample times of the blocks of the model. When a simulation time step matches the sample time for a block, a sample time hit occurs, and the block is scheduled for execution during that simulation step.

The schedulers 116, 118 may generate execution lists for the blocks of the model. In particular, the schedulers 116, 118 may generate a block sorted order list and a method execution list. The schedulers 116, 118 may utilize one or more algorithms for generating the block sorted order and method execution lists. For example, the static scheduler 116 may use the Rate Monotonic Scheduling (RMS), Earliest Deadline First Scheduling, Static Cyclic Scheduling, or Deadline Monotonic Scheduling. The dynamic scheduler 118 may use an event calendar to schedule future events, such as timeouts and alarms.

Link Phase

In the link stage, memory may be allocated and initialized for storing run-time information for blocks of the model.

Code Generation and Model Execution Phase

Following the model compilation and link stages, code may or may not be generated for the model. If code is generated, the model may be executed through an accelerated execution mode in which the model, or portions of it, is translated into either software modules or hardware descriptions, which is broadly referred to herein as code. If this stage is performed, then the stages that follow use the generated code during the execution of the design model. If code is not generated, the model may execute in an interpretive mode in which the compiled and linked version of the model may be directly utilized to execute the model over the simulation time. The model may not be executed when code is generated for the model. Instead of executing the model within the modeling environment 100, the generated code may be compiled and deployed on a target device, such as a controller, test hardware, etc.

Generated code may be stored in memory, e.g., persistent memory, such as a hard drive or flash memory. The user interface engine 102 may provide or support a Code Generation button in a GUI that may be selected by the user, or the user interface engine 102 may receive a code generation command entered by the user, e.g., in the GUI or the CLI. The code generation command also may be invoked programmatically, for example, when a particular event occurs. In response to the code generation command being activated, the code generator 240 may generate code for the model.

In an embodiment, the generated code may be textual code, such as textual source code, that may be compiled and executed on a target machine or device. The generated code may conform to one or more programming languages, such as Ada, Basic, C, C++, C#, SystemC, FORTRAN, VHDL, Verilog, embedded MATLAB, a vendor or target specific HDL code, such as Xilinx FPGA libraries, assembly code, etc. For example, one or more code generation files, such as header, main, make, and other source files may be generated for the design model. The target language compiler 132 may compile the generated code for execution by target hardware, such as a microprocessor, a Digital Signal Processor (DSP), a Field Programmable Gate Array (FPGA), etc.

The model execution analyzer 122 may analyze the execution instructions generated for the model, as indicated at block 208. For example, the model execution analyzer 122 may access the execution instructions generated by the simulation engine 106 to determine the execution order of one or more objects of the model, the identity of tasks executing particular objects of the model, the priority of particular tasks and/or objects of the model, the existence of queues, e.g., for buffering messages, and the logical execution times at which messages are generated, added to queues, removed from queues, and consumed. The model execution analyzer 122 may obtain further information regarding the execution of the model.

The auto diagram builder 126 may generate one or more message sequence diagrams as indicated at block 210, and the one or more message sequence diagrams may be presented, e.g., on a display, as indicated at block 212. In an embodiment, the one or more message sequence diagrams may be presented as the model is executed. In another embodiment, the one or more message sequence diagrams may be generated for viewing after model execution.

Sample Model

Figure 3:
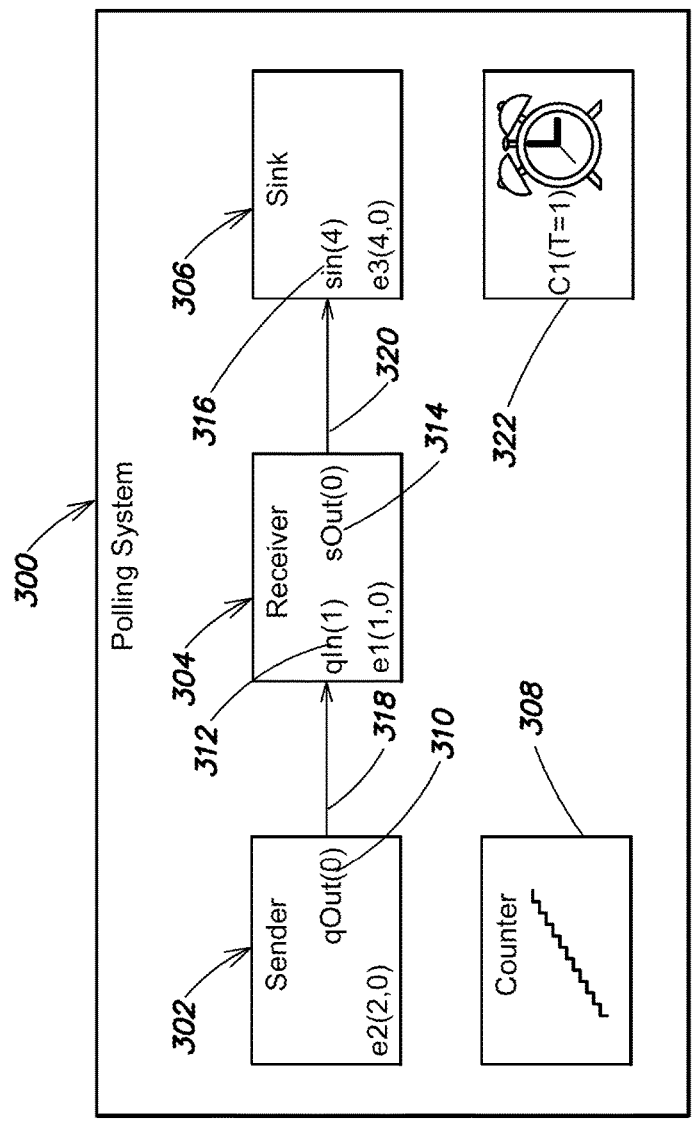
FIG. 3 is a schematic illustration of at least a portion of a graphical program in accordance with an embodiment of the disclosure.

FIG. 3 is a schematic illustration of at least a portion of a graphical model 300, which may implement a polling system. The model 300 includes a plurality of graphical objects, such as blocks, connections, etc. Specifically, the model 300 includes a sender block 302, receiver block 304, a sink block 306 and a counter or data store memory block 308. The model 300 also may include a clock 322, and the clock 322 may be configured with a period (T) equal to one second. The sender block 302 may include an output queue (qOut) 310 of size '0'. The receiver block 304 may include an input queue (qIn) 312 of size '1', and an output queue (sOut) 314 of size '0'. The sink block 306 may include an input queue (sIn) of size '4'. The sender, receiver and sink blocks 302, 304, 306 may be message-based blocks, and may each be configured to execute in response to specified triggering events. In particular, the triggering events for the sender, receiver and sink blocks 302, 304, 306 blocks, which may be identified as e2, e1 and e3, respectively, may be periodic events corresponding to sample times. For example, event e1 may be specified as a sampling period of '1' and an offset of '0'. Event e2 may be specified as a sampling period of '2' and an offset of '0'. Event e3 may be specified as a sampling period of '4' and an offset of '0'.

Furthermore, the sender block 302 may be configured such that, when event e2 occurs, the sender block 302 places the current value of the counter block 308 on its output queue (qOut) 310, generates a message having the current value of the counter block 308 as its payload, and increments the counter block 308. Messages generated by the sender block 302 are received at the input queue (qIn) 312 of the receiver block 304, as indicated by a first arrow 318. The receiver block 304 may be configured such that, when event e1 occurs, the receiver block 304 determines whether there is a message on its input queue (qIn) 312. If so, the receiver block 304 retrieves the message, places the value of the message at its output queue (qOut) 314, and generates a message with the value. If there is no message on the receiver block's input queue (qIn) 312, the receiver block 304 generates a message with a payload of '-1'. Messages generated by the receiver block 304 are received at the input queue (sIn) 316 of the sink block 306, as indicated by a second arrow 320. The sink block 306 may be configured such that, when event e3 occurs, the sink block 306 retrieves the messages on its input queue (sIn) 316, and displays the message values, e.g., on a console.

A user may be interested in observing the execution of the model 300. The user may enter a command to generate one or more message sequence diagrams for the model 300. The user may designate that information concerning the sender, receiver and sink blocks 302, 304, 306 is to be included in the one or more message sequence diagrams.

The model execution analyzer 122 may examine the execution instructions, including the execution schedules, generated for the model 300 by the simulation engine 106. If the model 300 has not yet been executed, the diagramming tool 120 may direct the simulation engine 106 to execute the model, thereby generating execution instructions. The filtering unit 124 may direct the model execution analyzer 122 to analyze the execution instructions for the occurrence of elements of the model, such as blocks, queues, connections, etc., that were identified as being of interest to the user, e.g., the sender, receiver and sink blocks 302, 304, 306. The filtering unit 124 also may direct the model execution analyzer 122 to examine one or more logical execution time periods that are of interest to the user.

The model compiler 110 may establish a single task, e.g., the 'PollingSystemPeriodic' task, to execute the functions defined by all three blocks 302, 304, and 306. In addition, the static scheduler 116 may be used and may schedule the order of the events e1, e2, and e3, such that event e2 is processed before event e1, which is processed before event e3.

Message Sequence Diagrams

Figure 4:
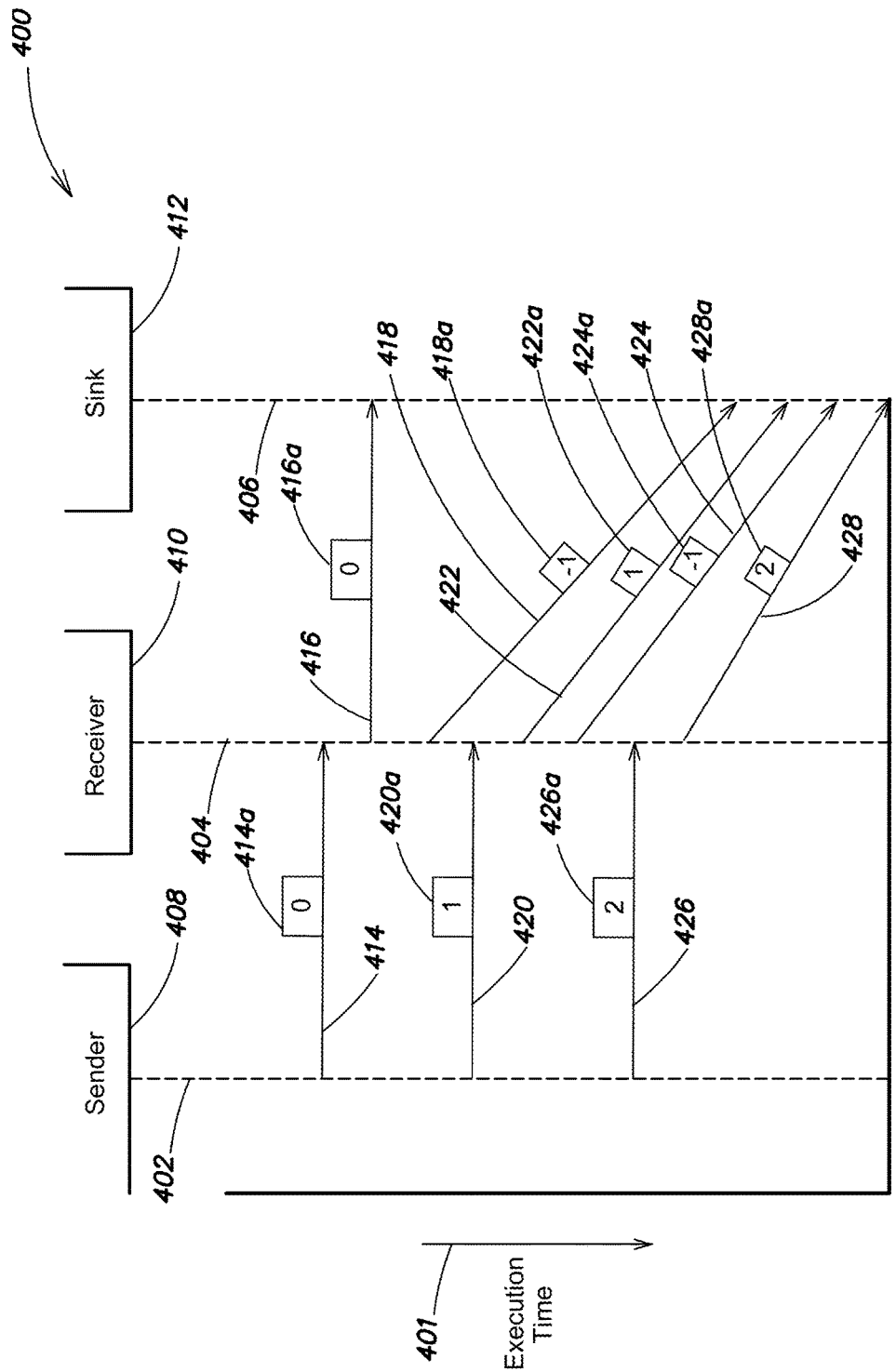
FIG. 4 is a highly schematic illustration of a message sequence diagram in accordance with an embodiment of the disclosure.

FIG. 4 is a schematic illustration of a first message sequence diagram 400 that may be created by the auto diagram builder 126 to illustrate the interaction among the sender, receiver and sink blocks 302, 304, 306 of the model 300. The first message sequence diagram 400 may illustrate interactions among the selected entities of the model 300, e.g., the sender, receiver and sink blocks, 302, 304, 306. The interactions, moreover, may be shown in time-wise relationship, as illustrated by the execution time arrow 401. In an embodiment, the auto diagram builder 126 may scroll the first message sequence diagram, e.g., upward, opposite the execution time arrow 401, to provide a new area at the bottom of the diagram 400 in which to display additional interactions. That is, the first diagram 400 may be a dynamic diagram.

The auto diagram builder 126 may be configured to utilize a plurality of different graphical affordances in the first diagram 400 to illustrate the interactions among the selected entities of the model 300. For example, the auto diagram builder 126 may include a first type of graphical affordance to represent the selected entities, i.e., the sender, receiver and sink blocks 302, 304, 306. The first type of graphical affordance may be a lifeline. In particular, the auto diagram builder 126 may include a first lifeline 402 for the sender block 302, a second lifeline 404 for the receiver block 304, and a third lifeline 406 for the sink block 306. The lifelines 402, 404, 406 may be dashed lines that are parallel to each other, and may extend vertically in the diagram 400. The lifelines 402, 404, 406 may include headers, such as headers 408, 410, 412, that contain information identifying the respective entities, such as their names, e.g., 'sender', 'receiver', and 'sink'.

The auto diagram builder 126 may use a second type of graphical affordance to represent interactions between the entities. For example, the auto diagram builder may represent the occurrence of message send and receive interactions among the entities, during execution of the model 300, using one or more symbols or other graphical images or effects, such as connectors, which may be solid line arrows, where the arrows extend between the lifelines 402, 404, 406, thereby visually linking the lifelines. An arrow may identify the lifelines of the sending and receiving blocks. For example, the tail of an arrow may be located on the lifeline of the entity sending the message, while the head of the arrow may be located on the lifeline of the entity receiving the message. As mentioned, the auto diagram builder 126 may arrange the arrows on the diagram 400 in an order that illustrates the execution order of the interactions, as determined by the simulation engine 106. For example, the auto diagram builder 126 may place the arrow for a first interaction above a second arrow for a second interaction where the first interaction occurs before the second interaction whether the interactions occur in the same time step or in different time steps.

As mentioned, the schedulers 116, 118 of the model compiler 110 generate an execution schedule for the model 300 over the simulation time. The message-based blocks 302, 304, 306 are configured to execute at particular sample times. Accordingly, the blocks 302, 304, 306 may be message-based blocks that may be scheduled for execution at each simulation time step that corresponds to a sample time hit for a respective one of the blocks 302, 304, 306.

All three blocks 302, 304, 306 may be scheduled for execution in a first simulation time step, which may correspond to sample time 0. The sender block 302 reads the value of the counter block 308, e.g., 0, and generates a first message with this value as its payload. The message is received at the receiver block 304, which generates a second message with this value as its payload. The second message is received at the sink block 306, which displays the value from the message, e.g., 0, on the console.

On the first diagram 400, a first arrow 414 extending from the sender's lifeline 402 to the receiver's lifeline 404 represents the first message. A second arrow 416 extending from the receiver's lifeline 404 to the sinks' lifeline 406 represents the second message. In an embodiment, the auto diagram builder 126 may provide information concerning the payload of messages illustrated in the first diagram 400. For example, the auto diagram builder 126 may include a payload data box adjacent to, e.g., above, the arrow, and may present the value of the message's payload in the data box. A first data box 414a may be associated with the first arrow 414, indicating that the payload of the first message is 0. A second data box 416a may be associated with the second arrow 416, indicating that the payload of the second message is also 0. Execution of the sink block 306 does not involve the generation or sending of any messages. Accordingly, no arrows are shown from the sink's lifeline 406.

As mentioned, the receiver block 304 executes at each sample time, e.g., sample times 0, 1, 2, 3, etc.; the sender block 302 executes at every other sample time, e.g., sample times 0, 2, 4, 6, etc.; and the sink block 306 executes every fourth sample time, e.g., sample times 0, 4, 8, 12, etc. Accordingly, at the simulation time step for sample time 1, only the receiver block 304 is scheduled for execution. The receiver block 306 again generates a message. However, because there is no new data on the receivers input queue (qIn) 312, the receiver block 304 transmits a message whose payload is −1. This message is represented on the diagram 400 as a third arrow 418 having third data box 418a.

In an embodiment, the auto diagram builder 126 positions the arrows representing messages to indicate when, during execution of the model 300, the message is both sent and received. The first and second messages are both sent and received during the first simulation step, which corresponds to sample time 0, because all three blocks 302, 304, 306 execute at this sample time. Accordingly, the auto diagram builder 126 may draw the first and second arrows 414, 416 horizontally on the diagram 400.

However, while the third message as represented by the third arrow 418 is sent by the receiver block 304 during the simulation time corresponding to sample time 1, this third message is not received by the sink block 306 until the simulation time corresponding to sample time 4, which is the next time after sample time 0 that the sink block 306 is scheduled to execute. Accordingly, while the tail of the third arrow 418 is placed on the receiver's lifeline 404 at a location indicating that it is the next message to be sent after the second message, the head of the third arrow 418 is placed on the sink's lifeline 406 at a much lower point, e.g., a point representing the simulation time step for sample time 4. The slope of an arrow in the first diagram 400 may thus represent a delay between a logical execution time at which a message is sent and a logical execution time at which the message is received.

At the simulation time for sample time 2, both the sender block 302 and the receiver block 304 are scheduled for execution. The sender block 302 again reads the value of the counter block 308, which is now 1, and generates a message with that value as its payload. This message is illustrated in the diagram 400 by a fourth arrow 420 with a data box 420a illustrating that the payload of this message is 1. The receiver block 304 receives the message, and generates its own message with the value from the received message, e.g., 1. The message generated by the receiver block 304 is illustrated in the diagram 400 by a fifth arrow 422 with a data box 422a. Because the message represented by the fifth arrow 422 is not received by the sink block 306 until the sink block next executes, the fifth arrow 422 like the third arrow 418 is also sloped indicating the time delay.

At the simulation time for sample time 3, only the receiver block 302 is scheduled for execution. The receiver block 304 generates a message but, because no new data was received by the receiver block 304, the receiver block 304 uses the value of −1 for the payload of this message. This message is illustrated in the diagram by a sixth arrow 424 with a data box 424a. The sixth arrow 424 is also displayed in a sloping manner indicating that it is not received by the sink block 306 until a later logical execution time.

At the simulation time for sample time 4, all three blocks 302, 304, 306 are once again scheduled for execution. The sender block 302 reads the value of the counter block 308, i.e., 2, and generates a message with this value as its payload. This message is represented in the diagram 400 by a seventh arrow 426 with a data box 426a. The receiver block 304 receives the message from the sender block 302, and generates its own message using the value from the received message, i.e., 2. The message generated by the receiver block 304 is illustrated by an eighth arrow 428 with a data box 428a.

Even though the eighth arrow 428 represents a message that is sent and received during the same simulation time step, e.g., sample time 4, the eighth arrow is sloped indicating that the sink block 306 receives the message at a logical time that is after it was sent by the receiver block 304. This is due to the fact that, after the receiver block 304 sends this message it is not processed by the sink block 306 until after the sink block 306 has processed the other messages represented by arrows 418, 422 and 424.

Logical Execution Time Regions

Figure 5:
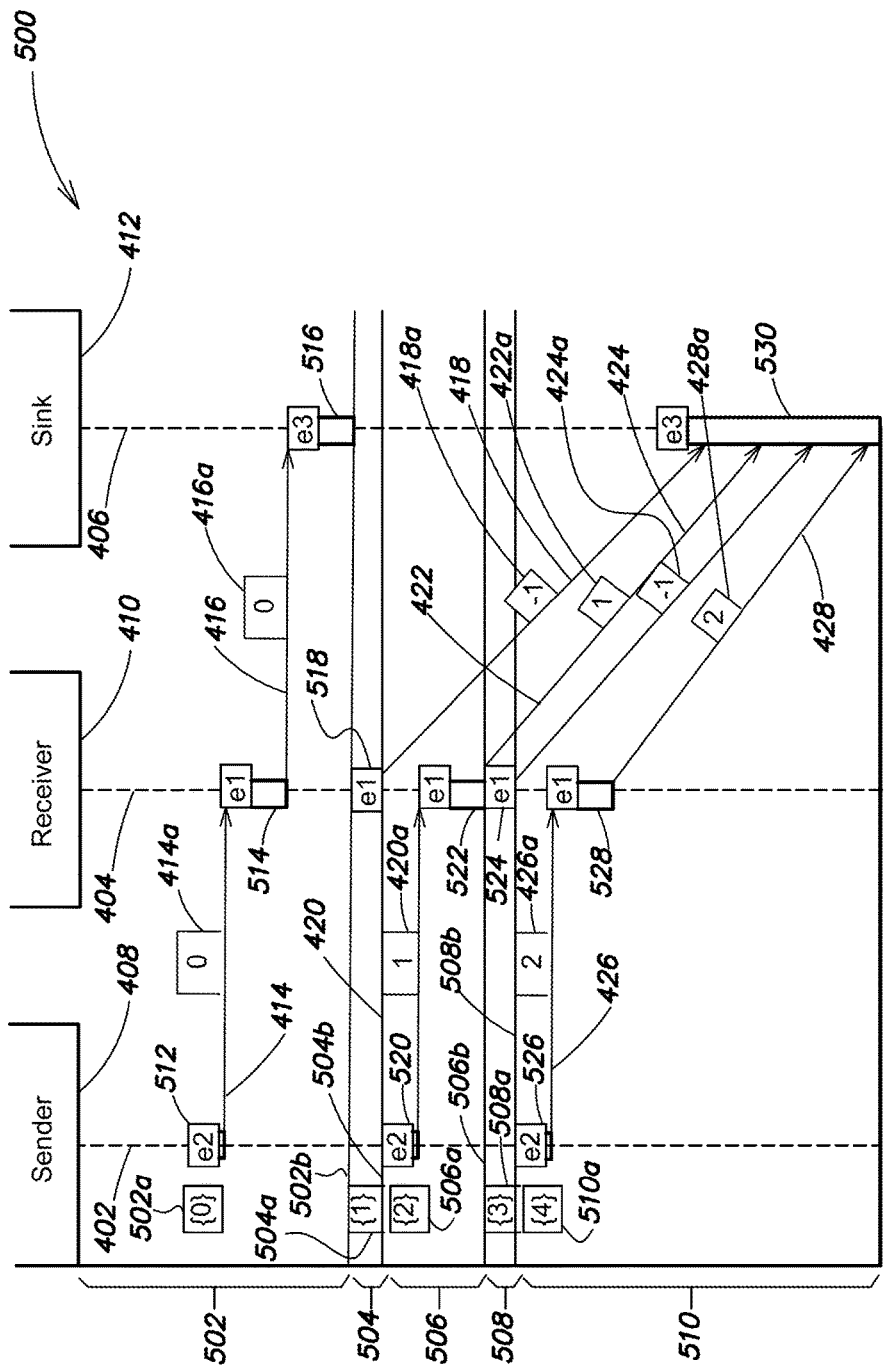
FIG. 5 is a highly schematic illustration of a message sequence diagram in accordance with an embodiment of the disclosure.

FIG. 5 is a schematic illustration of a second message sequence diagram 500 that may be generated by the auto diagram builder 126 to illustrate the interaction among the sender, receiver and sink blocks 302, 304, 306 of the model 300. Like the first message sequence diagram 400, the second diagram 500 may include the lifelines 402, 404, 406 with the headers 408, 410, 412. The second diagram 500 also may include the arrows 414-428 and the data boxes 414a-428a.

The auto diagram builder 126 may also be configured to utilize one or more graphical affordances to represent logical execution time of the program 300 on a message sequence diagram. For example, the auto diagram builder 126 may be configured to include a plurality of horizontal regions on a message sequence diagram, where each region corresponds to a particular logical execution time instant. The horizontal regions may be referred to as epochs. In an embodiment, an epoch may correspond to a simulation time step during which an activity involving at least one of the selected entities occurs. The auto diagram builder 126 may include boundaries such as lines separating adjacent epochs and may include information regarding the logical execution time instant of the epochs.

Included in the second diagram 500 is a first epoch 502 for the simulation time step corresponding to sample time 0. The first epoch 502 may include a data box 502a that contains information regarding the particular logical execution time instant of the first epoch, e.g., the simulation time step that corresponds to sample time 0. A boundary line 502b may mark the end of the first epoch 502 and the start of a second epoch 504. The second epoch 504 may include a data box 504a that contains information regarding its logical execution time instant, e.g., the simulation time step that corresponds to sample time 1, and a boundary 504b that separates the second epoch 504 from a third epoch 506. The third epoch 506 includes a data box 506a that contains information regarding its logical execution time instant, e.g., the simulation time step that corresponds to sample time 2, and a boundary line 506b that separates the third epoch 506 from a fourth epoch 508. The fourth epoch 508 includes a data box 508a that contains information regarding its logical execution time instant, e.g., the simulation time step that corresponds to sample time 3, and a boundary line 508b that separates the fourth epoch 508 from a fifth epoch 510. The fifth epoch 510 includes a data box 510a that contains information regarding its logical execution time instant, e.g., the simulation time step that corresponds to sample time 4.

In addition to illustrating epochs on a message sequence diagram, the auto diagram builder 126 may also be configured to include one or more graphical affordances that represent the task used to execute the blocks 302, 304, 306. For example, the auto diagram builder 126 may overlay a task activation bar onto a lifeline to indicate when a task is executing the block represented by that lifeline.

As mentioned, the model compiler 110 may be directed to implement or define a single task to execute the sender, receiver and sink blocks 302, 304, 304. The model compiler 110 may define a task called 'PollingSystemPeriodic'.

During the first epoch 502, a first task activation bar 512 may indicate that the task, i.e., the 'PollingSystemPeriodic' task, first executes the sender block 302. The length of the task activation bar 512 may provide an indication of the length of the physical execution time that the task spends executing the sender block 304. Upon completion of the sender block 302, the task switches to executing the receiver block 304, as indicated by a second task activation bar 514. Upon completion of execution of the receiver block 304, the task executes the sink block 306, as indicated by a third task activation bar 516. A task activation bar may include a header portion, and information identifying the event that triggered execution of a block by the task, such as the event's name, may be included in the header portion. For example, the event that triggers execution of the sender block 302 is called e2; the event that triggers execution of the receiver block 304 is e1; and the event that triggers execution of the sink block 306 is e3.

As the 'PollingSystemPeriodic' task can only execute one of the blocks at any given point in time, there is no overlap among the task activation bars 504-508.

During the second epoch 504, which corresponds to the simulation time step for sample time 1, the task only executes the receiver block 304, as indicated by fourth task activation bar 518. During the third epoch 506, which corresponds to the simulation time step for sample time 2, the task executes the sender block 302 and the receiver block 304, as indicated by fifth and sixth task activation bars 520, 522. During the fourth epoch 508, which corresponds to the simulation time step for sample time 3, the task only executes the receiver block 304, as indicated by seventh task activation bar 524. During the fifth epoch 510, which corresponds to the simulation time step for sample time 4, the task executes all three blocks, as indicated by eighth, ninth, and tenth task activation bars 526, 528, 530.

The message sequence diagram 500 provides the user with an indication of which activities occur in a given logical execution time instant, i.e., an epoch, and the relative order of those activities in that time instant. For example, with reference to the first epoch 502, it can be observed that the task executes the sender block 302 before executing the receiver block 304, and that the task executes the receiver block 304 before executing the sink block 306. The diagram 500 also may provide an indication of the event that triggers the execution of a block of interest. To conserve display space, the auto diagram builder 126 may be configured to size epochs based on the number of activities, such as messages or portions thereof, being displayed in the epochs. An epoch that presents many messages or portions thereof may appear larger than an epoch that presents only a few messages.

Figure 6:
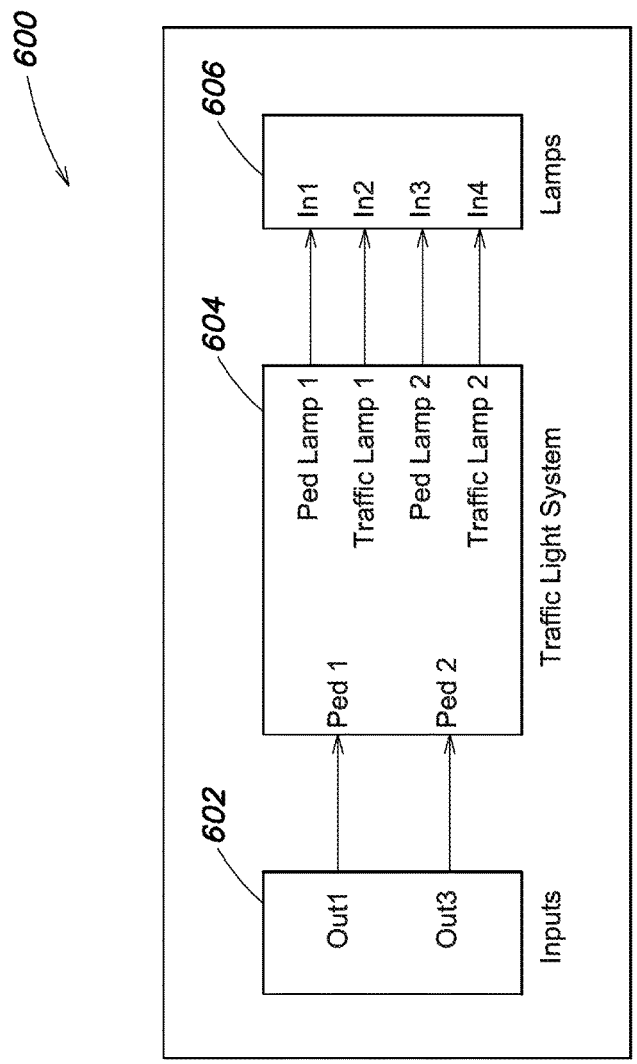
FIG. 6 is a schematic illustration of an executable graphical model in accordance with an embodiment of the disclosure.

FIG. 6 is a schematic illustration of an executable graphical model or program 600, which may be configured to simulate the control and operation of two traffic lights. The graphical model 600 may be opened or created on a display of a data processing device, such as a desktop, laptop, tablet, etc. Specifically, the graphical model 600 may be opened, edited, and executed by the modeling environment 100, or by another program development system, that may provide a desktop environment on the display. The graphical model 600 may represent a top-level view of the system or environment being modeled or simulated, and may include a plurality of components, such as subsystems or sub-models. For example, the model 600 may include first, second, and third subsystems 602, 604, and 606. The first subsystem (Inputs) 602 may be configured to model the operation of control buttons, such as pedestrian control buttons, at two traffic lights. The second subsystem (Traffic Light System) 604 may be configured to model the control of a traffic light system. The third subsystem (Lamps) 606 may be configured to model the operation of the light elements, such as traffic and pedestrian control lights, at the two traffic lights. In an embodiment, the semantics of the graphical model correspond to the Simulink® model based design environment from The MathWorks, Inc., including the Stateflow chart tool.

Figure 7:
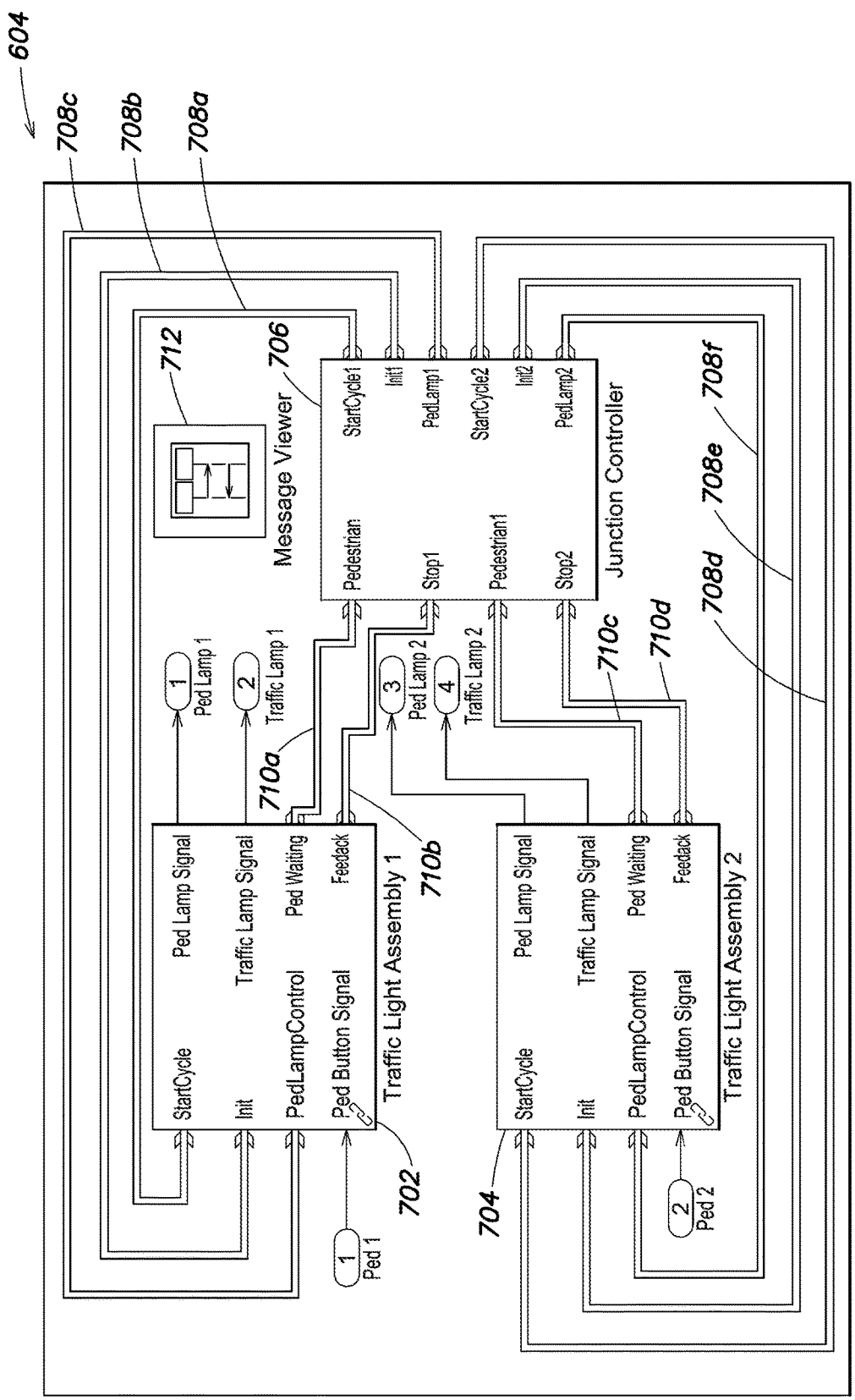
FIG. 7 is a schematic illustration of a portion of the model of FIG. 6 in accordance with an embodiment of the disclosure.

FIG. 7 is a schematic illustration of the second subsystem (Traffic Light System) 604 of the graphical model 600, which has been opened to show the components and other model elements that form the Traffic Light System subsystem 604. The Traffic Light System subsystem 604 may include a plurality of components, such as sub-models or subsystems, which may be or may include one or more state charts. In particular, the Traffic Light System subsystem 604 may include a first library linked, Traffic Light Assembly subsystem 702, a second library linked Traffic Light Assembly subsystem 704, and a Junction Controller subsystem 706. In other words, model components, such as subsystems, sub-models, etc., may be hierarchically arranged. To the extent a first component includes a plurality of other components, the first component may be referred to as a parent component and the other components may be referred to as child components of the parent component. For example, the Traffic Light System subsystem 604 may be referred to as a parent component with respect to the first Traffic Light Assembly subsystem 702, the second Traffic Light Assembly subsystem 704, and the Junction Controller subsystem 706, which may be referred to as "child" components of the Traffic Light System subsystem 604 (the "parent" component). Nevertheless, a "child" component may itself include other components, such that the "child" component may be identified as a parent component when referring to its child components. In other words, a parent component may be at a first level of the model hierarchy, and the child components may be at a second level of the model hierarchy. The child components may themselves include one or more components at a third level of the model hierarchy, and so on.

The subsystems 702, 704, and 706 of the Traffic Light System subsystem 604 may be configured to generate and receive messages during execution of the graphical model 600 by the modeling environment 100. They may also be configured to compute and read one or more signals. Messages defined within the subsystem 604 may be represented in the subsystem 604 through one or more designated graphical affordances, such as double line arrows, while other graphical affordances, such as single line arrows, may represent signals defined within the graphical model 600. For example, one or more components of the Junction Controller subsystem 706 may generate six types of messages, as indicated by message arrows 708*a-f*, that may be received by the Traffic Light Assembly subsystems 702 and 704, which in turn, may generate four types of messages, as indicated by message arrows 710*a-d*, that may be received by the Junction Controller subsystem 706.

In an embodiment, the user interface engine 102 of the modeling environment 100 may be configured to present a graphical object, such as a Message Viewer block 712, on the display with a graphical model. In response to the selection of the Message Viewer block 712, the diagramming tool 120 may be configured to open one or more Message View windows or panes on the display of the data processing system. It should be understood that in addition to or instead of the Message Viewer block 712, a command button may be added to a command ribbon or button bar, or to a menu bar, of the desktop for opening a Message View window. A Message Viewer block type may be included in one or more palettes of block types. A user may select the Message Viewer block type from the palette, and add an instance of the block to a graphical model.

Figure 8:
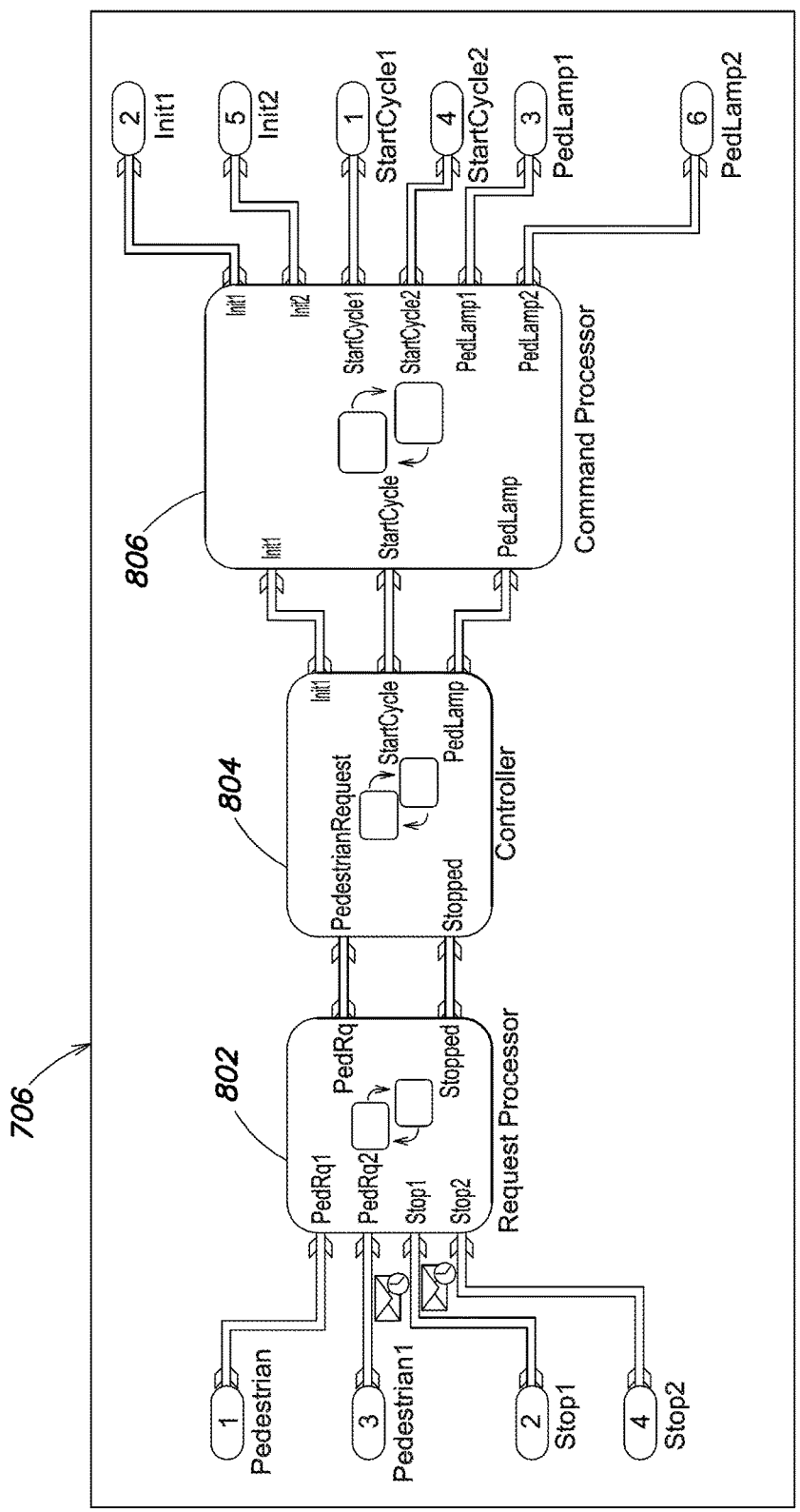
FIG. 8 is a schematic illustration of a portion of the model of FIG. 7 in accordance with an embodiment of the disclosure.

FIG. 8 is a schematic illustration of the Junction Controller sub-system 706, which has been opened to show the components and/or elements that form the Junction Controller sub-system 706. The Junction Controller sub-system 706 includes a first state-based component (Request Processor) 802, a second state-based component (Controller) 804, and a third state-based component (Command Processor) 806, one or more of which may be state charts. The state based components 802, 804, and 806 may be configured to send and receive messages as indicated by the double line arrows illustrated in FIG. 8.

The simulation engine 106 may be configured to execute the graphical model 600 or a portion thereof, for example in response to a user command or programmatically. The model 600 may be executed over an execution or simulation time, such as 0 to 10 seconds, which may be specified for the model 600, e.g., through user input or programmatically. During execution, components or other elements of the model 600 may generate one or more messages that persist for execution time intervals that are something less than the model's entire or full execution or simulation time. Messages also may have fixed payloads, e.g., payloads whose values do not vary over time. The messages may be received by other model components or elements and their payloads may be processed by those other components or elements. The sending and receiving of messages may be specified graphically, textually, or a combination of graphically and textually.

The diagramming tool 120 may monitor and/or trace the occurrence of messages within the graphical model 600 as it executes, and may generate a visual representation of the model's message behavior. This visual representation may be presented in one or more Message View windows or panes that may be included on the display of the data processing device. In an embodiment, the diagramming tool 120 may be configured to present a dynamic and/or animated view of the model's message behavior in the Message View window by representing the messages and other model components with graphical elements, such as window gadgets (widgets). The diagramming tool 120 may be further configured to present the graphical elements representing the messages in an order that is the same as, or at least closely matches, the order of the occurrence of the messages during execution of the graphical model 600, e.g., relative to the execution time of the graphical model 600. For example, when messages occur at different sample times, time steps, simulation times, etc., the diagramming tool 120 may maintain the temporal order of the messages on the Message View windows. The temporal order may be in terms of a logical time. In addition, a state diagram for example may define a plurality of state transitions among a plurality of states where one transition triggers another, which triggers another, and so on, and each state may issue a message. Nonetheless, all of the state transitions, and thus all of the messages, may be considered to occur at the same logical time, for example in the same sample time, time step, simulation time, etc. When the state diagram is executed, the transitions and the messages may occur at different times in a physical sense. The diagramming tool 120 may maintain the execution order of the transitions and/or messages occurring at the same logical time. The diagramming tool 120 may thus present a display of messages in the Message Viewer windows that maintains an order, such as a temporal order and/or an execution order, of the messages.

Figure 9:
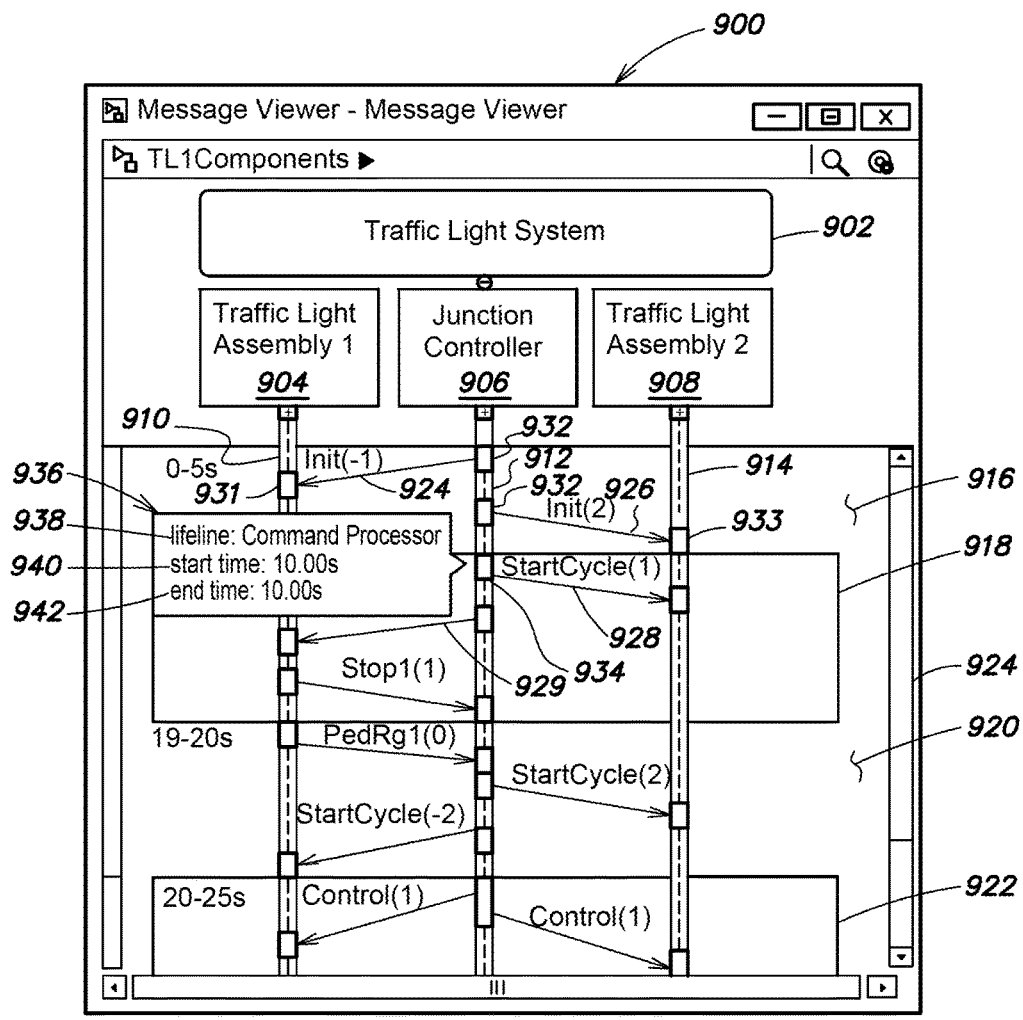
FIG. 9 is a schematic illustration of a Message View window in accordance with an embodiment of the disclosure.

FIG. 9 is a schematic illustration of a first Message View window 900 in accordance with an embodiment of the disclosure. The auto diagram builder 126 may be configured to include in the first Message View window 900 a plurality of lifelines where each lifeline corresponds to a particular component or element of the graphical model 600 that sends and/or receives messages. The auto diagram builder 126 may be further configured to organize the lifelines according to the hierarchy of the graphical model 600. For example, the auto diagram builder 126 may provide a first header 902 representing the traffic light system subsystem 604. Adjacent, e.g., below, the first header 902, the auto diagram builder 126 may provide sub-headers for at least some of the components of the traffic light system subsystem 604. In particular, the auto diagram builder 126 may provide a Traffic Light Assembly 1 sub-header 904, a Junction Controller sub-header 906, and a Traffic Light Assembly 2 sub-header 908. Corresponding lifelines 910, 912, and 914 may be arranged to extend from the sub-headers 904, 906, and 908. In an embodiment, the lifelines 910, 912, and 914 may be parallel to each other and may extend vertically across a plurality of horizontally arranged bands that represent execution time periods of the graphical model 600. For example, the auto diagram builder 126 may provide a first time band 916 that corresponds to a first model simulation time period, e.g., 0-5 seconds (s), a second time band 918 that corresponds to a second model simulation time period, e.g., 5-19 s, a third time band 920 that corresponds to a third model simulation time period, e.g., 19-20 s, and a fourth time band 922 that corresponds to a fourth model simulation time period, e.g., 20-25 s. It should be understood that, to the extent the model simulation time exceeds 25 s, one or more additional time bands may be provided, and may be presented by operating a vertical scroll bar 924 or other GUI element of the Message View window 900.

It should be understood that the auto diagram builder 126 may be configured to omit or hide one or more time bands from the Message View window 900. For example, the auto diagram builder 126 may be configured to display time bands during which messages of interest occur, and to hide or otherwise not display other time bands. A user may select or designate messages of interest and the auto diagram builder 126 may identify the occurrence of the messages of interest, show the time bands during which such messages of interest occur, and hide or otherwise not display other time bands, e.g., time bands during which other messages, which are not the messages of interest, are occurring. In an embodiment, a user may also designate one or more payload values of interest, and the auto diagram builder 126 may be configured to determine when messages whose payloads match the designate value of interest occur, and present those matching messages on one or more Message Viewer windows. It should be understood that the user may designate a value using various relationship operators, such as equal to, less than, greater than, etc.

The auto diagram builder 126 may be configured to include additional graphical affordances or widgets to represent the occurrence of messages. In an embodiment, the auto diagram builder 126 may represent messages with single line arrows extending between the lifelines 910, 912, and 914 in which the tail of an arrow is placed at the lifeline of the component that sent the respective message, and the head of the arrow is placed at the lifeline of the component that received the respective message. As illustrated by arrows 924-929, whose tails are placed at the Junction Controller lifeline 912, the Junction Controller component 706 generates and sends an Initialize (Init) message with a payload of −1 that is received by the Traffic Light Assembly 1 component 702, an Init message with a payload of 2 that is received by the Traffic Light Assembly 2 component 704, a StartCycle message with a payload of 1 received by the Traffic Light Assembly 2 component 704, and a StartCycle message with a payload of −1 received by the Traffic Light Assembly 1 component 702.

The auto diagram builder 126 may be configured to include further graphical affordances or widgets that indicate whether messages are being generated and/or received by sub-components of the components represented by the lifelines 910, 912, and 914. For example, the auto diagram builder 126 may use bar elements, such as bar elements 930-934 overlaid on the lifelines 910, 912, and 914 to indicate that messages are generated and/or received by sub-components of the components represented by the lifelines 910, 912, and 914.

In an embodiment, the auto diagram builder 126 may be configured to present additional information regarding a model component or entity that sent or received a message. This additional information may be presented in response to user interaction with the Message View window 900. For example, in response to a user operating a mouse device to hover a cursor over a bar element, the auto diagram builder 126 may be configured to cause a pop-up window to be presented on the Message View window where the popup window provides additional information. For example, if a user hovers the cursor over the bar element 934, the auto diagram builder 126 may cause a pop-up window 936 to be presented that includes a first entry 938 identifying the name of the component, i.e., the Command Processor component 806, that generated the respective message, a second entry 940 indicating the model execution start time, i.e., 10.00 s, for the Command Processor component 806, and a third entry 942 indicating the model execution end time, i.e., 10.00 s, for the Command Processor component 806.

The auto diagram builder 126 may be further configured to present additional information for a message in the Message View window 900 besides message name, payload value, and execution time of occurrence. The additional information may be presented in response to user interaction with the Message View window 900. For example, in response to a user hovering a cursor over an arrow that represent a message, the auto diagram builder 126 may be configured to cause a pop-up window to be presented providing the additional information.

Figure 10:
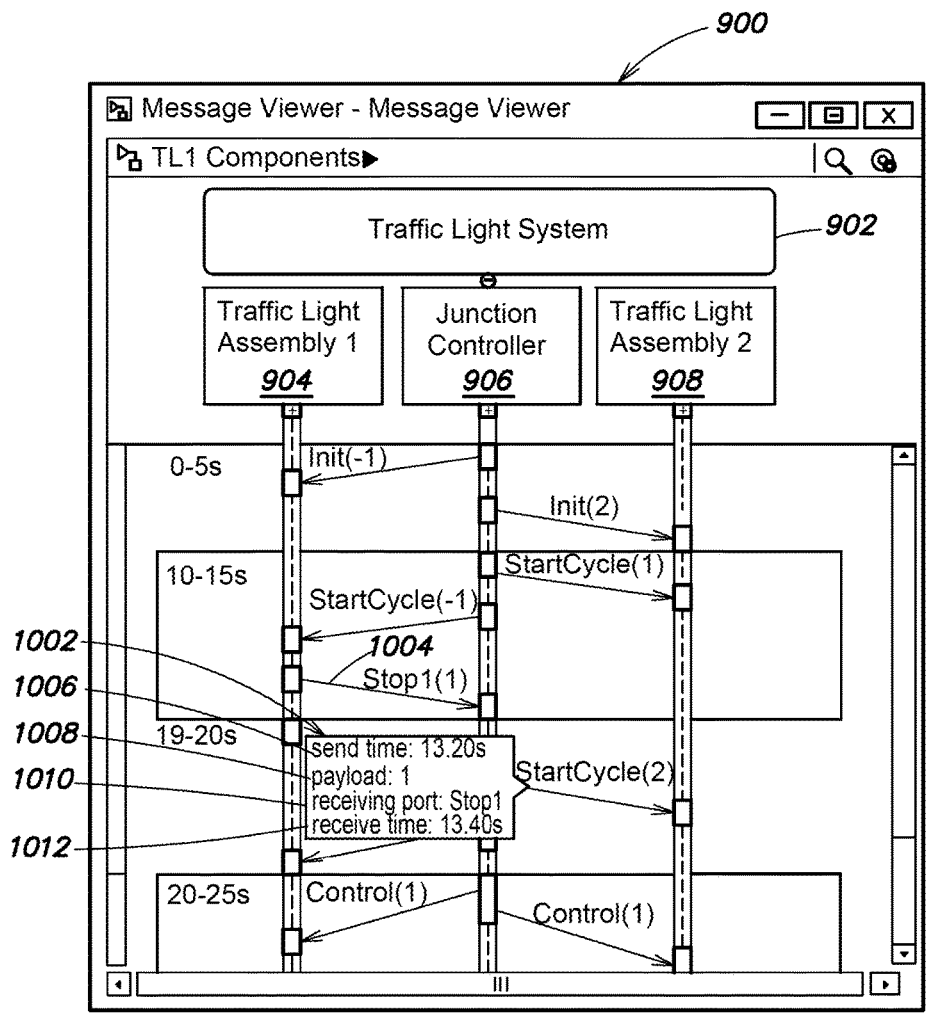
FIG. 10 is a schematic illustration of a Message View window in accordance with an embodiment of the disclosure.

FIG. 10 is a schematic illustration of the Message View window 900 with a message pop up window 1002 corresponding to an arrow 1004 representing a Stop type of message sent by the Traffic Light Assembly 1 component 702 with a payload of 1 that is received by the Junction Controller component 706. The pop up window 1002 may include a plurality of entries containing the additional information. Specifically, the pop up window 1002 may include a first entry 1006 presenting the model execution time at which the message was sent, i.e., 13.20 s, a second entry 1008 that presents the value of the message's payload, i.e., 1, a third entry 1010 that presents a name of the port at the receiving component on which the message was received, i.e., Stop1, and a fourth entry 1012 that presents the model execution time at which the message was received, i.e., 13.40 s.

The auto diagram builder 126 may be further configured to alter the granularity of model execution time as presented on Message View window 900. For example, the auto diagram builder 126 may alter the granularity of one or more of the time bands 916-922 in response to user interaction with the Message View window 900.

Figure 11:
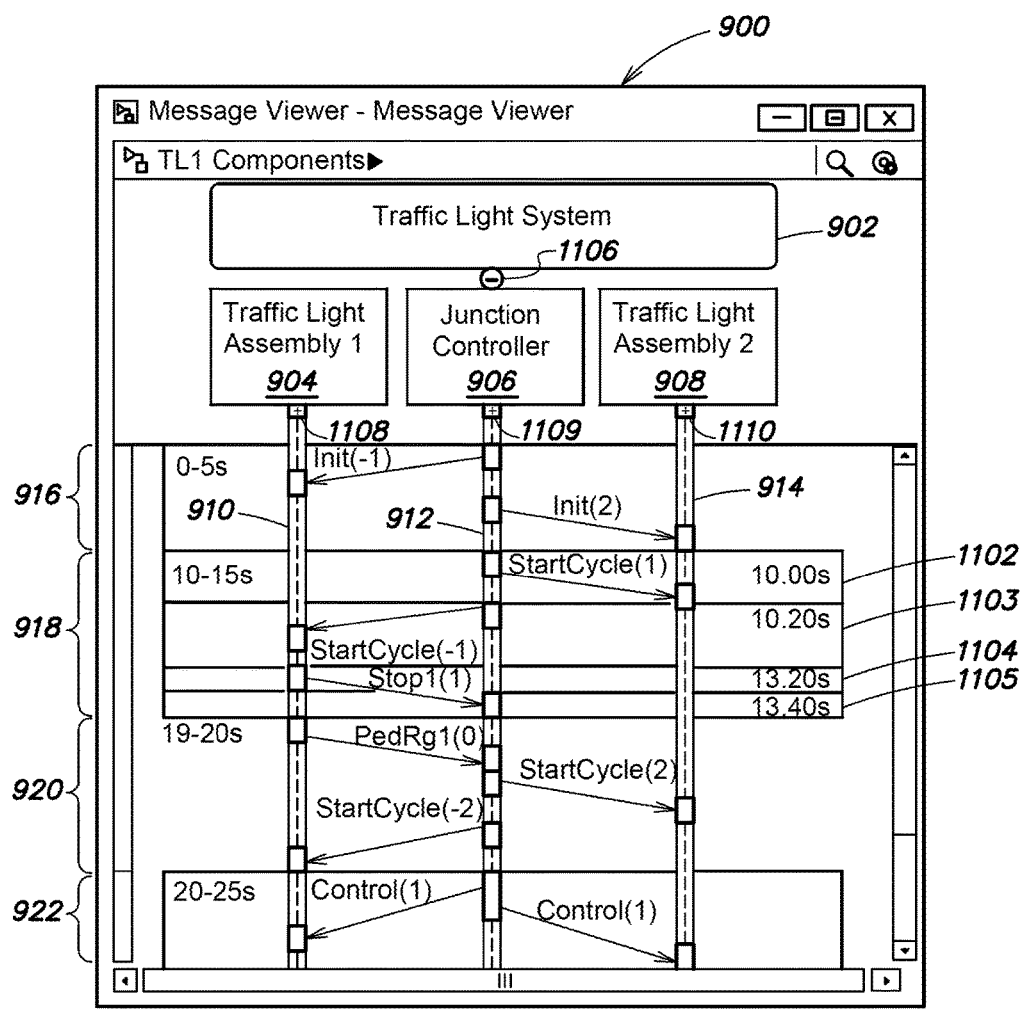
FIG. 11 is a schematic illustration of a Message View window in accordance with an embodiment of the disclosure.

FIG. 11 is a schematic illustration of the Message View window 900. In response to the user hovering the cursor over the second time band 918, the auto diagram builder 126 may be configured to divide the second time band 918 into a plurality of sub-bands that present a finer granularity of model execution time than the time bands 916-922. In particular, while the second time band 918 covers model execution time 10-15 s, with the cursor hovered over the second time band 918, four sub-bands 1102-1105 may be overlaid onto the second time band 918. The sub-bands 1102-1105 represent portions of the model execution time represented by the second time band 918. In particular, the sub-bands 1102-1105 may represent 10.00 s, 10.20 s, 13.20 s, and 13.40 s, respectively. It should be understood that the auto diagram builder 126 may cause the pop-up windows 936 and 1002, and the sub-bands 1102-1105 to disappear from the Message View window 900 in response to user interaction such as the user moving the cursor away from the respective graphical affordance or widget or pressing an escape key.

It should be understood that the additional information may be presented in response to other user actions besides a mouse hover, such as selecting a command button, entering a textual command at a Command Line Interface (CLI), using a drop down or pull down menu, etc. It should also be understood that the auto diagram builder 126 may be configured to include the additional information on the Message View window 900 without the need for a user command or input.

Figure 12:
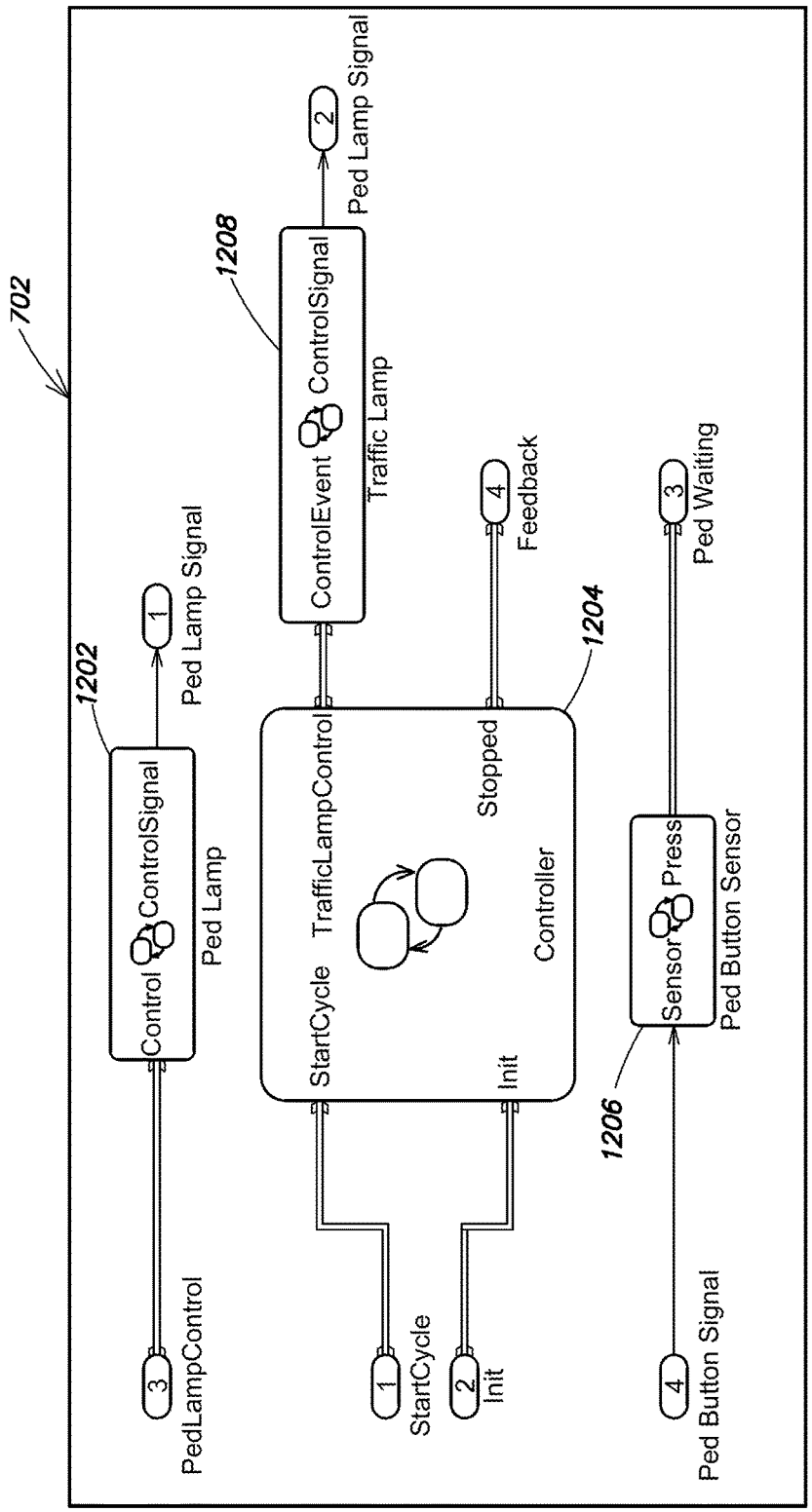
FIG. 12 is a schematic illustration of a portion of the model of FIG. 6 in accordance with an embodiment of the disclosure.

FIG. 12 is a schematic illustration of the Traffic Light Assembly 1 component 702 of the graphical model 600. The Traffic Light Assembly 1 component 702 includes a plurality of state components, such as a Pedestrian Lamp (PedLamp) state chart 1202, a Controller state chart 1204, a Pedestrian Button Sensor (PedButtonSensor) state chart 1206, and a Traffic Lamp state chart 1208.

In an embodiment, the auto diagram builder 126 may be configured to organize lifelines according to the model hierarchy of the graphical model 600, and to expand and collapse lifelines presented on the Message View window 900, for example in response to user input or interaction. That is, a lifeline representing a "parent" component may be replaced with lifelines representing the "child" components of the parent component. Alternatively, the lifelines representing the "child" components may be shown in addition to the lifeline for the "parent component". In an embodiment, the user interface engine 128 may be configured to include one or more graphical affordances or widgets in the Message View window 900 through which a user can cause lifelines to be expanded or collapsed according to the model hierarchy. Referring to FIG. 11, one or more command buttons may be associated with the lifeline headers that, if selected, cause lifelines to be expanded or collapsed. For example, Traffic Light System header 902 may include a button or icon 1106 that can be toggled between a + sign and a − minus sign to expand or collapse lifelines for the parent/child hierarchy of the traffic light system component 604. When the button is in the form of a + sign, selection of the button causes headers and lifelines to be presented in the Message View window 900 for all or at least some of the child components and elements that form the parent traffic light system component 604. In particular, additional headers and lifelines may be provided for those components that send and/or receive messages during execution of the graphical model 600. When the button is in the form of a − sign, selection of the button may cause headers and lifelines for the components of the traffic light system component 604 to be collapsed into a single lifeline for the traffic light system component 604. The traffic light assembly 1 header 904, junction controller header 906, and traffic light assembly 2 header 908 may similarly include respective expand/collapse buttons 1108-1110. In response to selection of the expand/collapse button 1108 for the traffic light assembly 1 header 904, for example, the user interface engine 128 may be configured to replace lifeline 910 with lifelines for the components of the traffic light assembly 1 component 702 that send and receive messages and/or to maintain the lifeline 910 and add lifelines for these "child" components.

When a lifeline is collapsed, the auto diagram builder 126 may be configured to provide information regarding messages sent to or received from the collapsed lifeline. For example, auto diagram builder 126 may annotate an arrow with a name or other identity of the child component sending or receiving the respective message. In another embodiment, this information may be presented when the user "hovers" the cursor over the respective arrow or selects an arrow, or it may be presented in a manner determined by an option setting.

Figure 13:
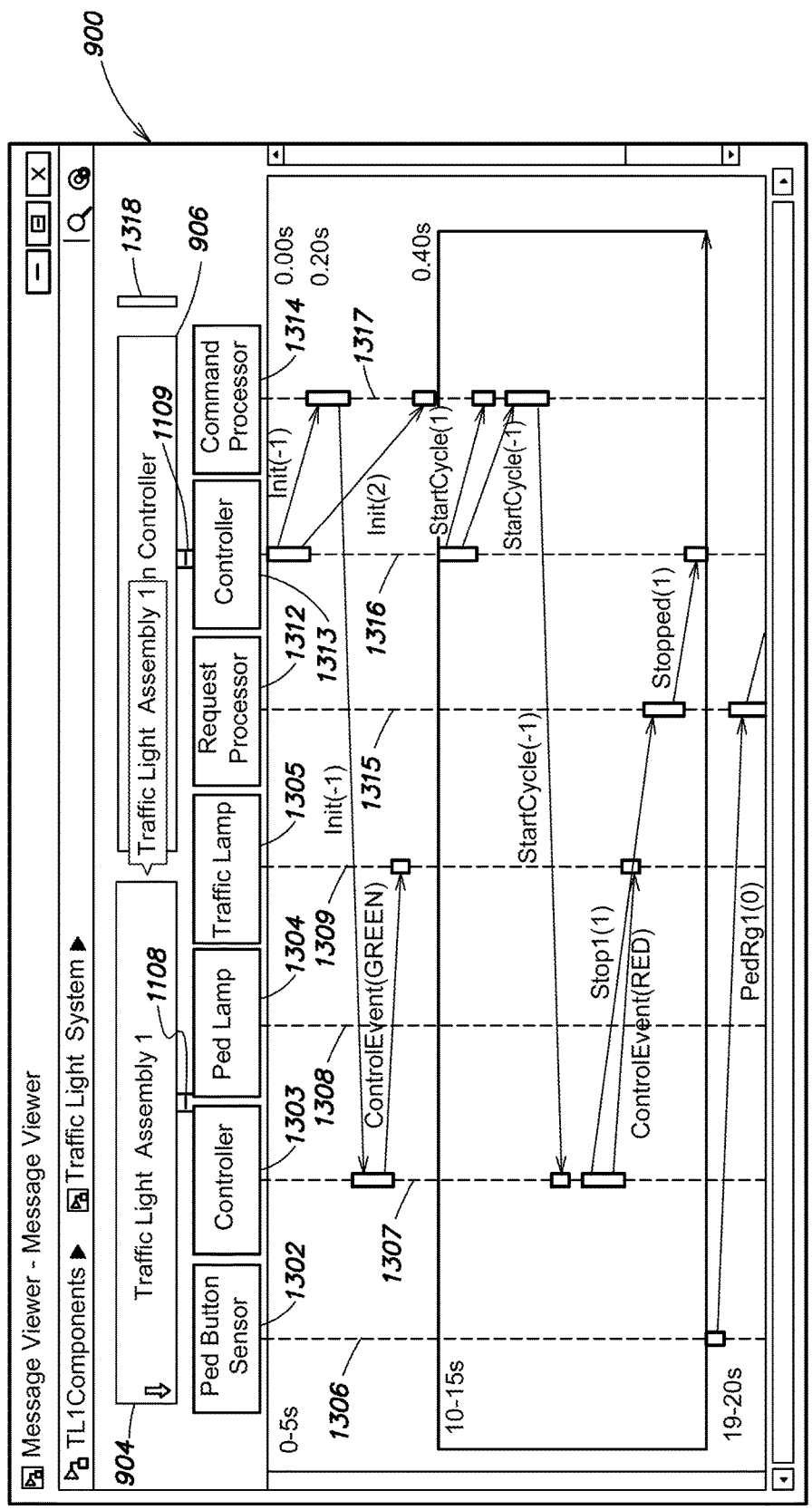
FIG. 13 is a schematic illustration of a Message View window in accordance with an embodiment of the disclosure.

FIG. 13 is a schematic representation of the Message View window 900 in which the Traffic Light Assembly 1 header 904 and the Junction Controller header 906 have been expanded to show lifelines for the components of the traffic light assembly 1 component 702 and the junction controller component 706. For example, headers 1302-1305 and corresponding lifelines 1306-1309 for the Ped Button Sensor component 1206, the Controller component 1204, the Ped Lamp component 1202, and the Traffic Lamp component 1208 of the traffic light assembly 1 component 702 are presented in the Message View window 900. Additionally, headers 1312-1314 and corresponding lifelines 1315-1317 for the Request Processor component 802, the Controller component 804, and the Command Processor component 806 of the Junction Controller component 706 are presented in the Message View window 900.

The auto diagram builder 126 also may be configured to include one or more graphical affordances or widgets that may be operated, e.g., by a user, to remove or return a header and lifeline from or to the Message View window 900. For example, the headers 904, 906, 908 may themselves be implemented as buttons. In response to the selection of a header 904, 906, 908, e.g., through user input, such as single or double mouse or touchpad clicks, combination mouse/keyboard entries, finger swipes, screen taps, etc., the auto diagram builder 126 may be configured to remove the selected header and lifeline from the Message View window 900. For example, in the version of the Message View window 900 presented in FIG. 13, the Traffic Light Assembly 2 header 908 and lifeline 914, which appear in FIGS. 9-11, have been removed and replaced with button 1318. In response to the selection of the button 1318, the auto diagram builder 126 may be configured to return the Traffic Light Assembly 2 header 908 and lifeline 914 to the Message View window 900.

In an embodiment, the user interface engine 128 may be configured to move headers and lifelines around in the Message View window 900, for example in response to user interaction. More specifically, the user interface engine 128 may configure headers and lifelines for drag and drop operations. That is, using a mouse device to control a cursor, a user may select a lifeline and/or header, drag the selected lifeline and header to a new position on the Message View window 900, and drop the selected lifeline and header at the new position.

Figure 14:
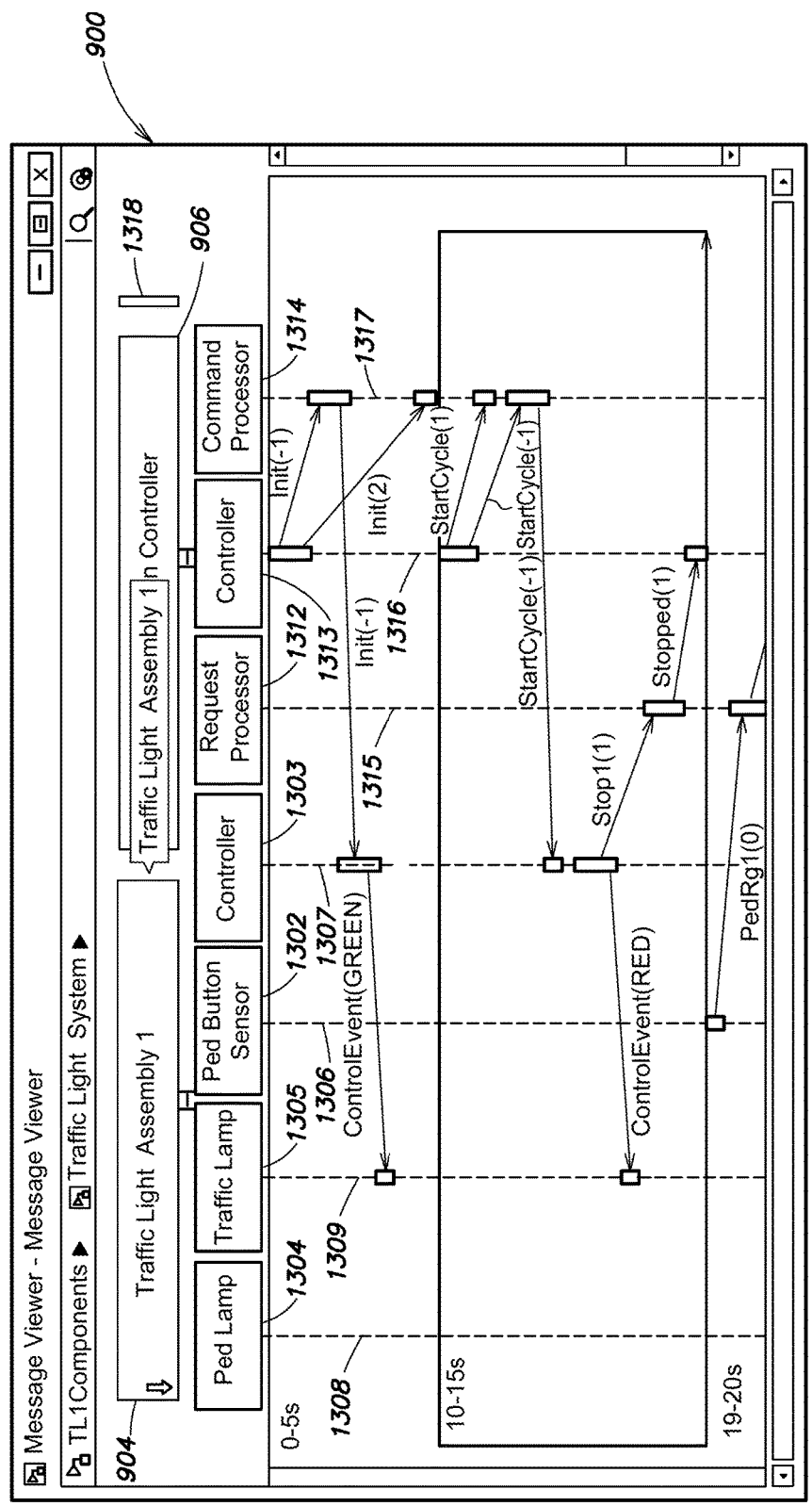
FIG. 14 is a schematic illustration of a Message View window in accordance with an embodiment of the disclosure.

FIG. 14 is a schematic illustration of the Message View window 900 after a user has dragged and dropped several of the headers and lifelines to new positions. First, with reference to FIG. 13, the headers and lifelines of the Traffic Light Assembly 1 header 904 are in the following order from left to right: Ped Button Sensor header 1302 and lifeline 1308, Controller header 1303 and lifeline 1307, Ped Lamp header 1304 and lifeline 1308, and Traffic Lamp header 1305 and lifeline 1309. After user manipulations, e.g., drag and drop operations, the ordering has been changed as illustrated in FIG. 14. More specifically, the headers and lifelines of the Traffic Light Assembly 1 header 904 are now in the following order from left to right: Ped Lamp header 1304 and lifeline 1308, Traffic Lamp header 1305 and lifeline 1309, Ped Button Sensor header 1302 and lifeline 1306, and Controller header 1303 and lifeline 1307.

By re-arranging the headers and lifelines, a user may unclutter the Message View window 900. For example, before rearranging the headers and lifelines, as represented in FIG. 13, many message arrows extend across several lifelines. After rearranging the headers and lifelines, as represented in FIG. 14, these message arrows no longer extend across as many lifelines, which makes the information presented in the Message View window 900, namely the model's message behavior, easier to read.

The auto diagram builder 126 may be configured to store in a memory the occurrence of at least some of the messages for the model. This data may then be used in future display operations. In addition, the auto diagram builder 126 may be configured to organize the storing of messages by model component, such as specific subsystems, sub-models, etc. Accordingly, future display operations can be generated for the messages associated with one or more particular components of the model.

In an embodiment, the auto diagram builder 126 may be configured to hide and/or collapse one or more time bands.

Figure 15:
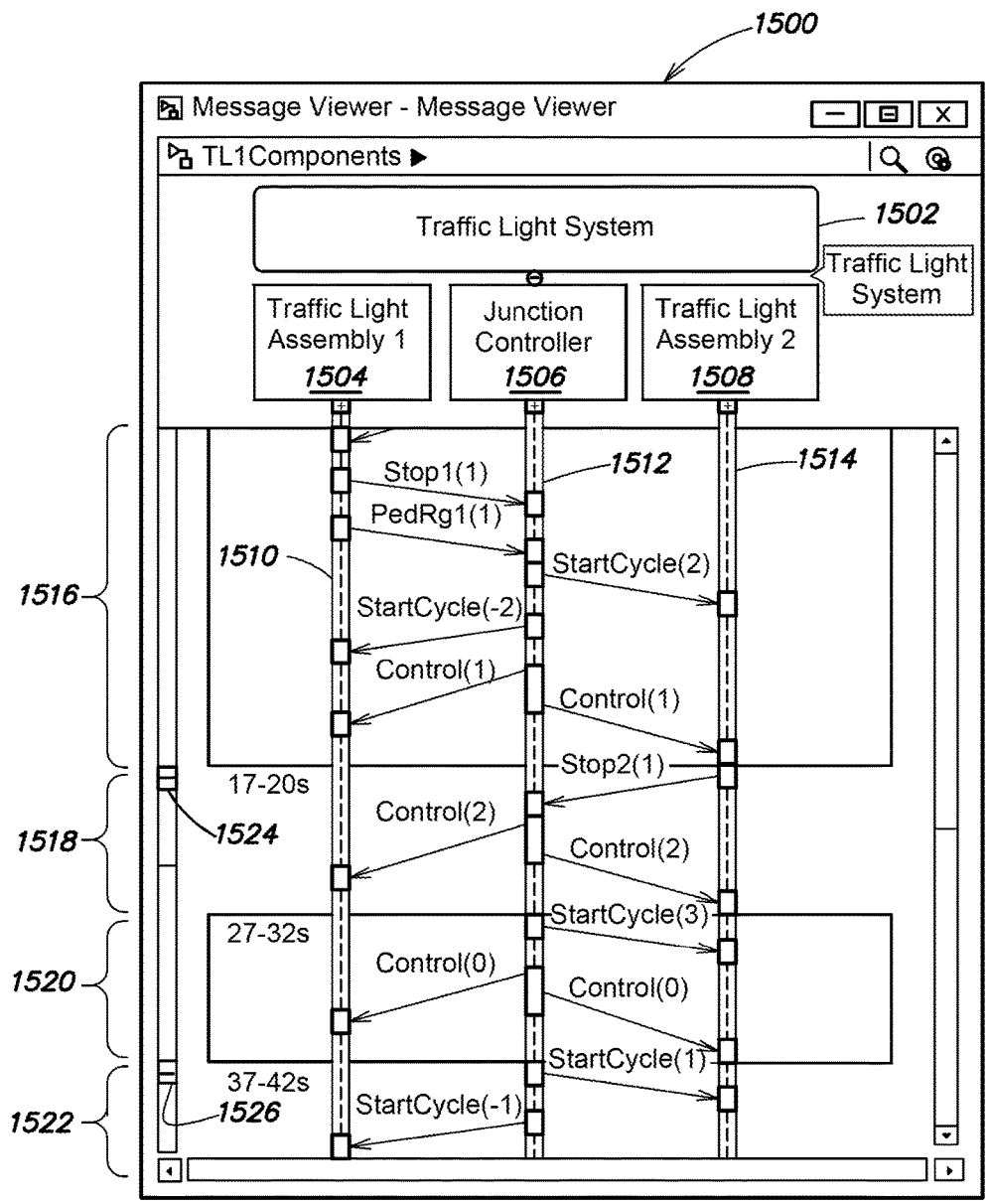
FIG. 15 is a schematic illustration of a Message View window in accordance with an embodiment of the disclosure.

FIG. 15 is a schematic illustration of a Message View window 1500, which is similar to the previously described Message View window 900. The Message View window 1500 includes a first header 1502 for the Traffic Light System component 604, and additional headers 1504, 1506, and 1508 for the Traffic Light Assembly 1 component 702, the Junction Controller component 706, and the Traffic Light Assembly 2 component 704. The Message View window 1500 also includes lifelines 1510, 1512, and 1514 for the headers 1504, 1506, and 1508. The lifelines 1510, 1512, and 1514 extend across a plurality of execution time bands, such as a portion of a first time band 1516 corresponding to model execution time interval 10-16 s, a second time band 1518 corresponding to model execution time interval 17-20 s, a third time band 1520 corresponding to model execution time interval 27-32 s, and a portion of a fourth time band 1522 corresponding to mode execution time interval 37-42 s.

In an embodiment, the diagramming tool 120 may be configured to identify model execution time periods during which no messages are sent or received, and may omit such time periods from presentation in a Message View window. For example, with reference to the Message View window 1500 of FIG. 15, the diagramming tool 120 may determine that, during execution of the model, no messages are sent or received during model execution times 21-26 s and 33-36 s. As illustrated, the diagramming tool 120 may include one or more time bands for model execution time periods 17-20 s, 27-32 s, and 37-42 s, but omit time bands for 21-26 s and 33-36 s to conserve display area. In an embodiment, the diagramming tool 120 may be configured to present the omitted time bands, for example, in response to user input. The diagramming tool 120 also may be configured to include one or more graphical affordances, such as narrow bands or rows, for the omitted time bands. Whether to include or omit time bands in a Message View window may be user settable, for example through an option setting.

Suppose a user is not interested in seeing one or more time bands, for example because there is little or no important messaging activity or behavior taking place during those time bands. In an embodiment, the user interface engine 128 may be configured to hide and show one or more time bands, for example in response to user interaction with the Message View window 1500. In an embodiment, one or more show/hide command buttons may be associated with at least some of the time bands presented in the Message View window 1500. For example, a first show/hide command button 1524 may be associated with the second time band 1518. Another show/hide command button 1526 may be associated with the fourth time band 1522. The show/hide command buttons may include a − sign to indicate that information may be hidden or collapsed from view. In response to a user selecting the show/hide command buttons, the diagramming tool 120 may be configured to hide the respective time bands.

It should be understood that other user inputs may be used to hide or show time bands. For example, the diagramming tool 120 may be configured to hide a time band in response to a user double-clicking the time band, e.g., with a mouse or touch pad. Similarly, the diagramming tool 120 may be configured to show a hidden time band in response to a user double-clicking a button or other graphical affordance associated with the hidden time band.

Figure 16:
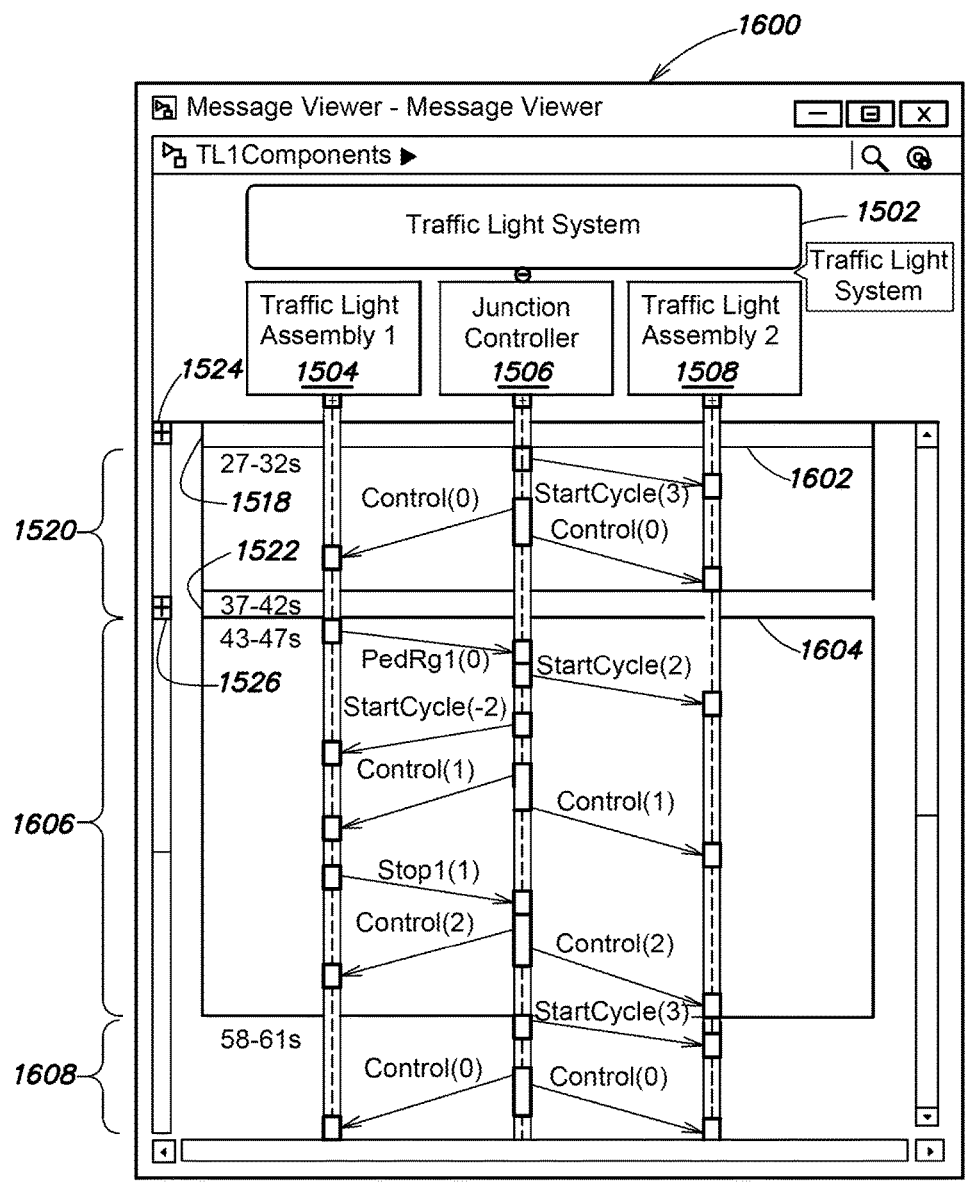
FIG. 16 is a schematic illustration of a Message View window in accordance with an embodiment of the disclosure.

FIG. 16 is a schematic illustration of the Message View window 1600 after the user has selected the show/hide command buttons associated with the second and fourth time bands 1518 and 1522. As shown in FIG. 16, the time bands 1518 and 1522 are hidden providing additional screen space for other time bands. In particular, additional time bands such as a fifth time band 1606 corresponding to model execution time 43-47 s and sixth time band 1608 corresponding to a portion of model execution time 56-61 s may now be included.

In an embodiment, the user interface engine 128 may be configured to replace the hidden time bands with graphical affordances, such as narrow horizontal rows 1602 and 1604, to indicate hidden time bands. In an embodiment, the diagramming tool 120 may endow the rows with information regarding the message activity that occurred during the hidden time bands. For example, abbreviated or summary information, such as total number of messages sent and/or received and/or message names or types may be presented on or in the area of the hidden time bands. The rows 1602 and 1604 may be smaller in displayed area than the time bands that they replace, thereby making display area available for, e.g., information presented in other time bands. The user interface engine 128 may change the icon associated with the show/hide buttons 1524 and 1526 from a − sign to a + sign to indicate that hidden or collapsed information, e.g., time bands, may be shown or expanded. In response to the user selecting the show/hide buttons 1524 and 1526 with the time bands hidden, the user interface engine 128 may be configured to show the previously hidden time bands on the Message View window 1500.

Figure 17:
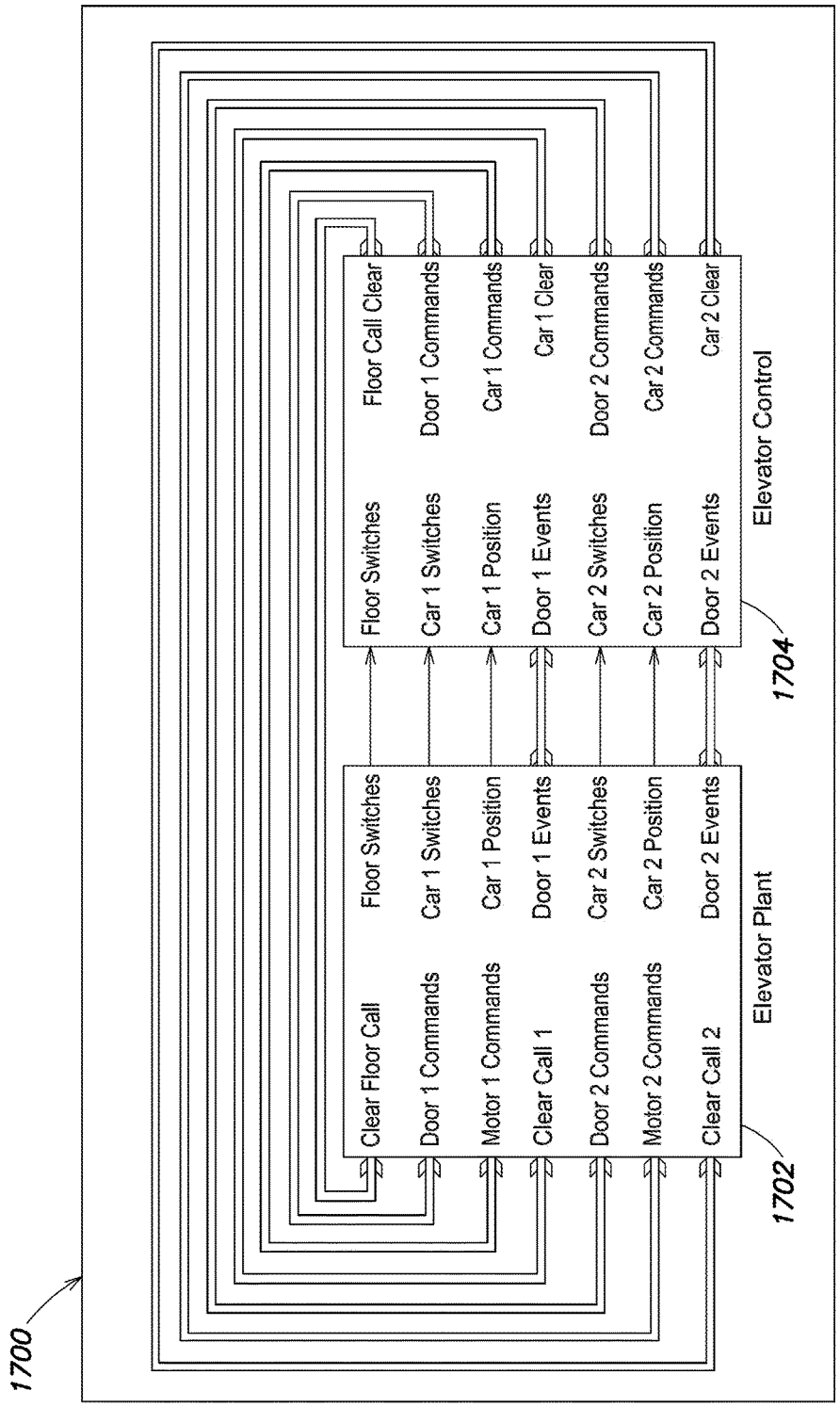
FIG. 17 is a schematic illustration of an executable graphical model in accordance with an embodiment of the disclosure.

FIG. 17 is a schematic illustration of a top level view of an executable graphical model 1700 that includes an elevator plant subsystem or component 1702 and an elevator control subsystem or component 1704. During execution of the graphical model 1700 the elevator plant component 1702 and the elevator control component 1704 send and receive message, as indicated by the double line arrows, and read and write signals, as indicated by the single line arrows.

Figure 18:
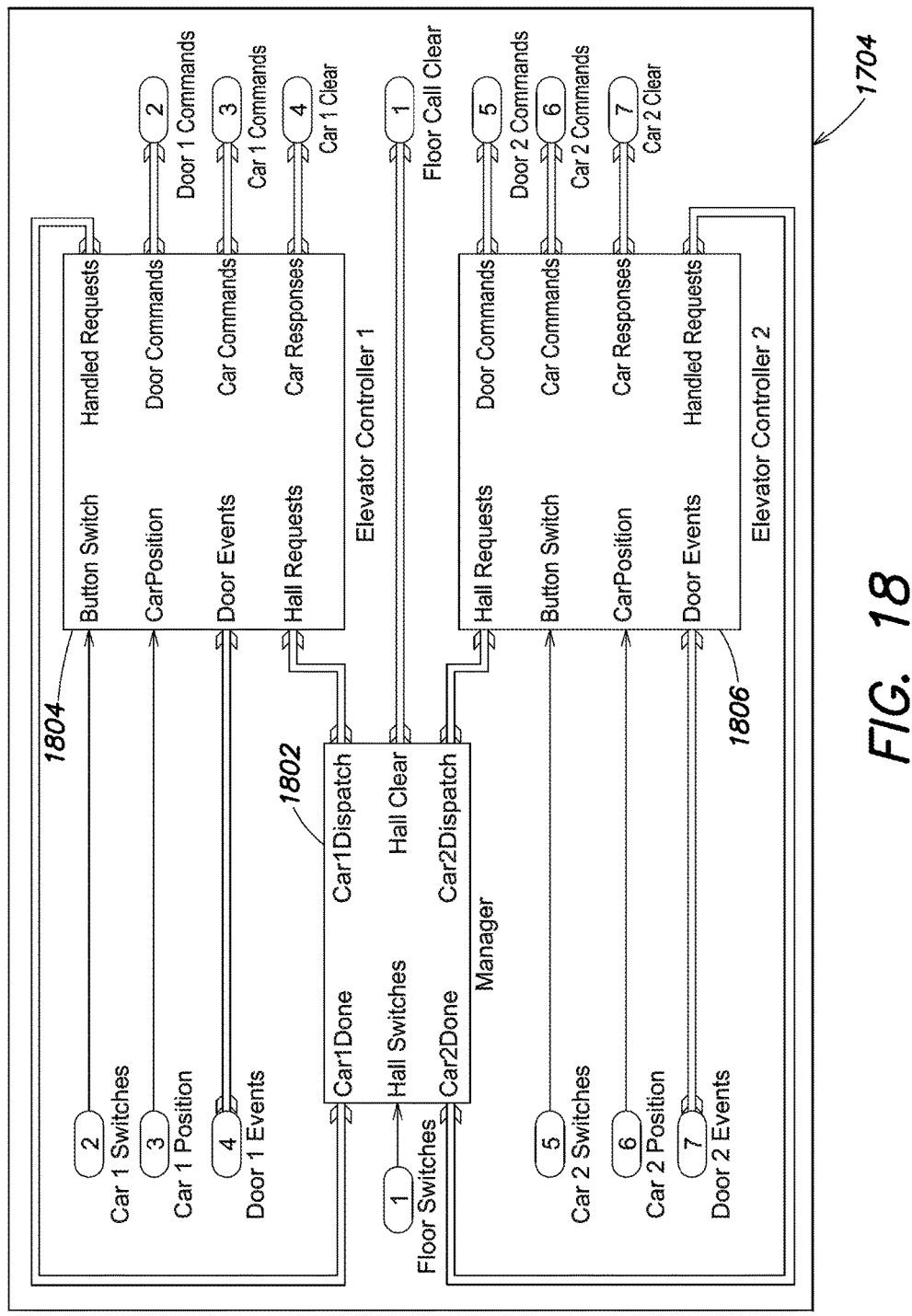
FIG. 18 is a schematic illustration of a portion of the model of FIG. 17 in accordance with an embodiment of the disclosure.

FIG. 18 is a schematic illustration of the elevator control component 1704, which has been opened to show the components and other model elements that make up the elevator control component 1704. Specifically, the elevator control component 1704 includes a manager component 1802, an elevator controller 1 component 1804, and an elevator controller 2 component 1806. The elevator control component 1704 may include other model elements such as graphical objects representing message exchanges, graphical objects representing signals, and graphical objects representing message and signal input and output ports.

Figure 19:
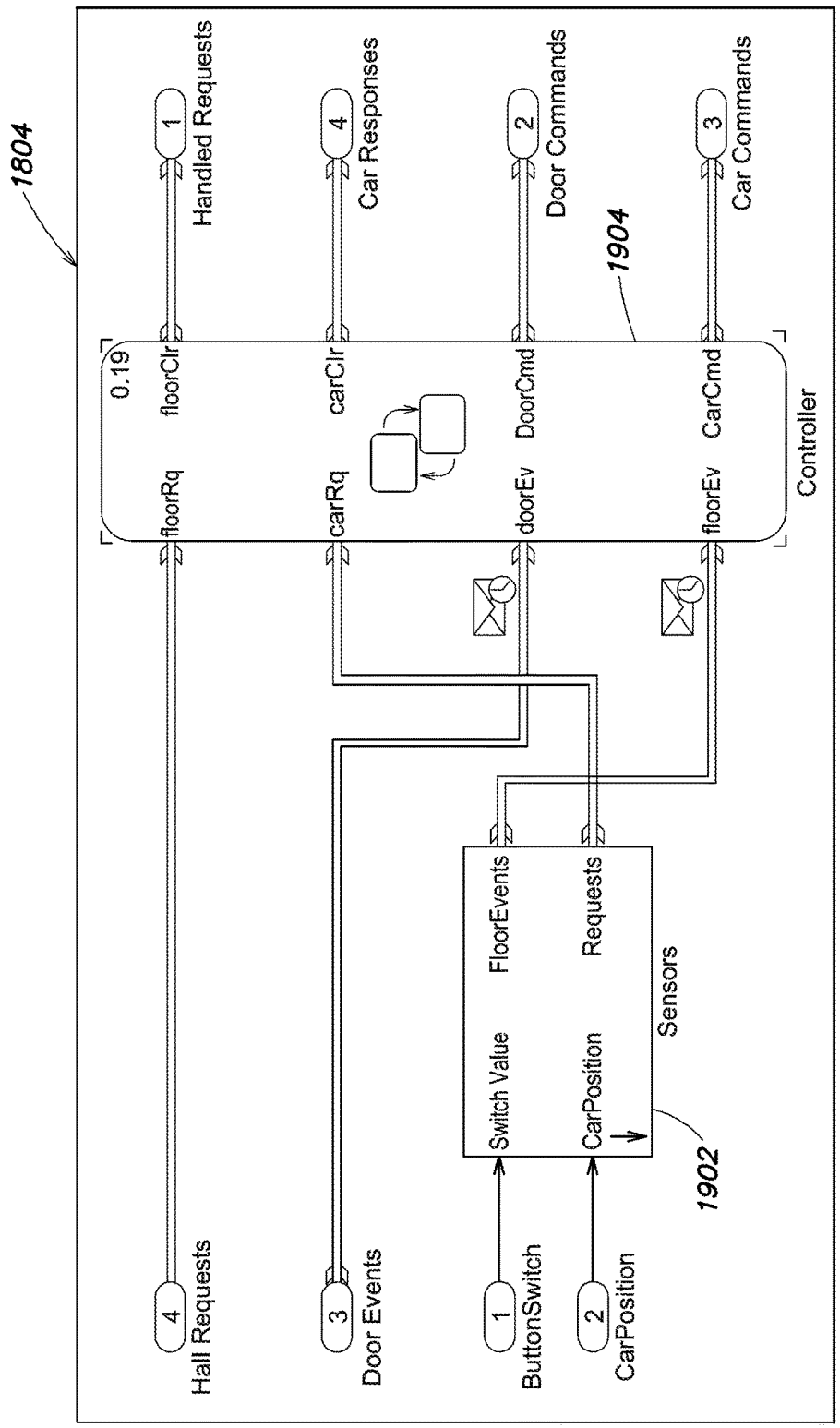
FIG. 19 is a schematic illustration of a portion of the model of FIG. 18 in accordance with an embodiment of the disclosure.

FIG. 19 is a schematic illustration of the elevator controller 1 component 1804, which has been opened to show the components and other model elements that make up the elevator controller 1 component 1804. Specifically, the elevator controller 1 component 1804 includes a sensors component 1902 and a controller state chart 1904. The elevator controller 1 component 1804 may include other model elements, such as graphical affordances that represent message exchanges, graphical affordances that represent signals, and graphical affordances that represent message and signal input and output ports.

Figure 20A:
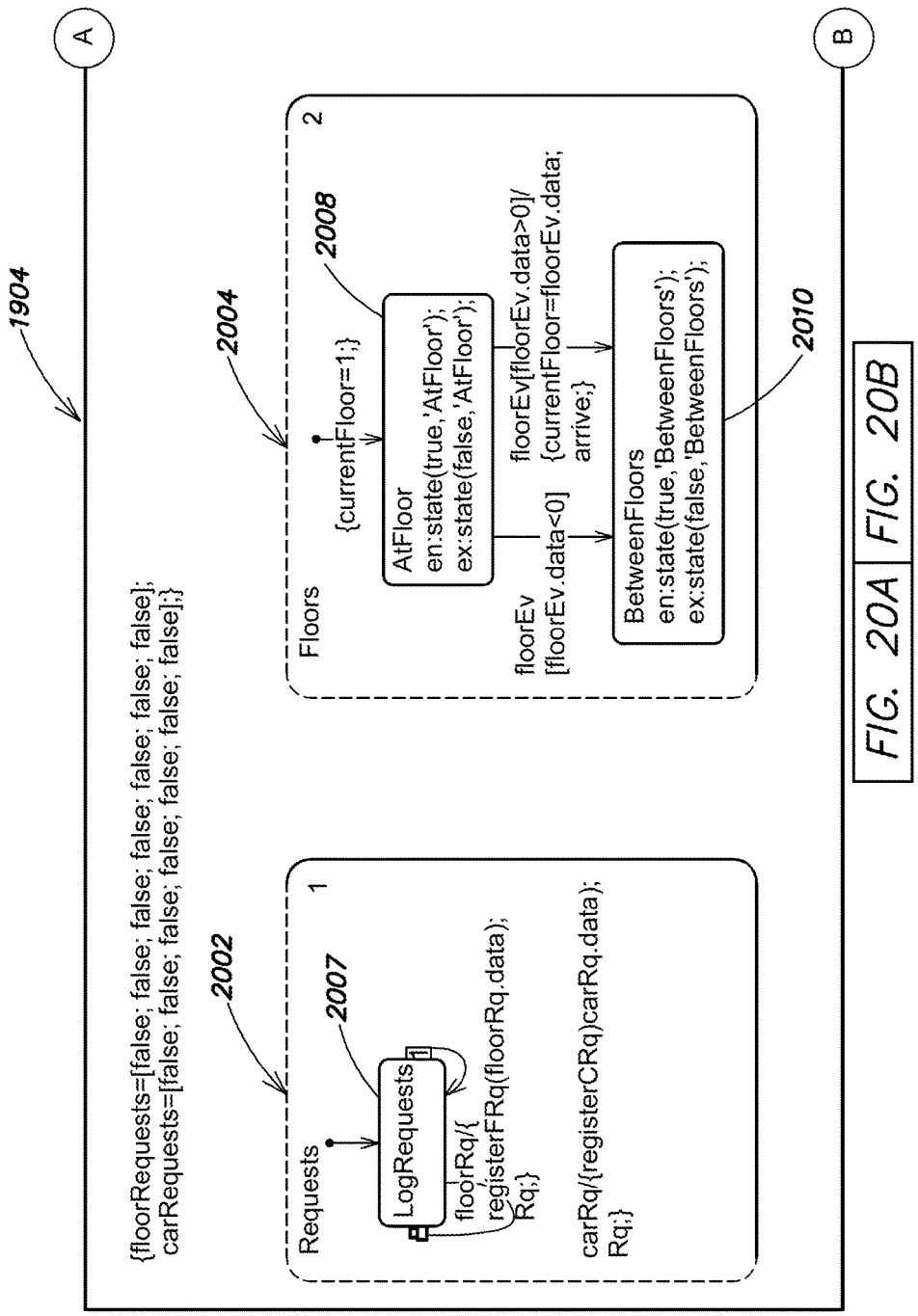
FIGS. 20A and 20B are partial views of a schematic illustration of a portion of the model of FIG. 19 in accordance with an embodiment of the disclosure.
Figure 20B:
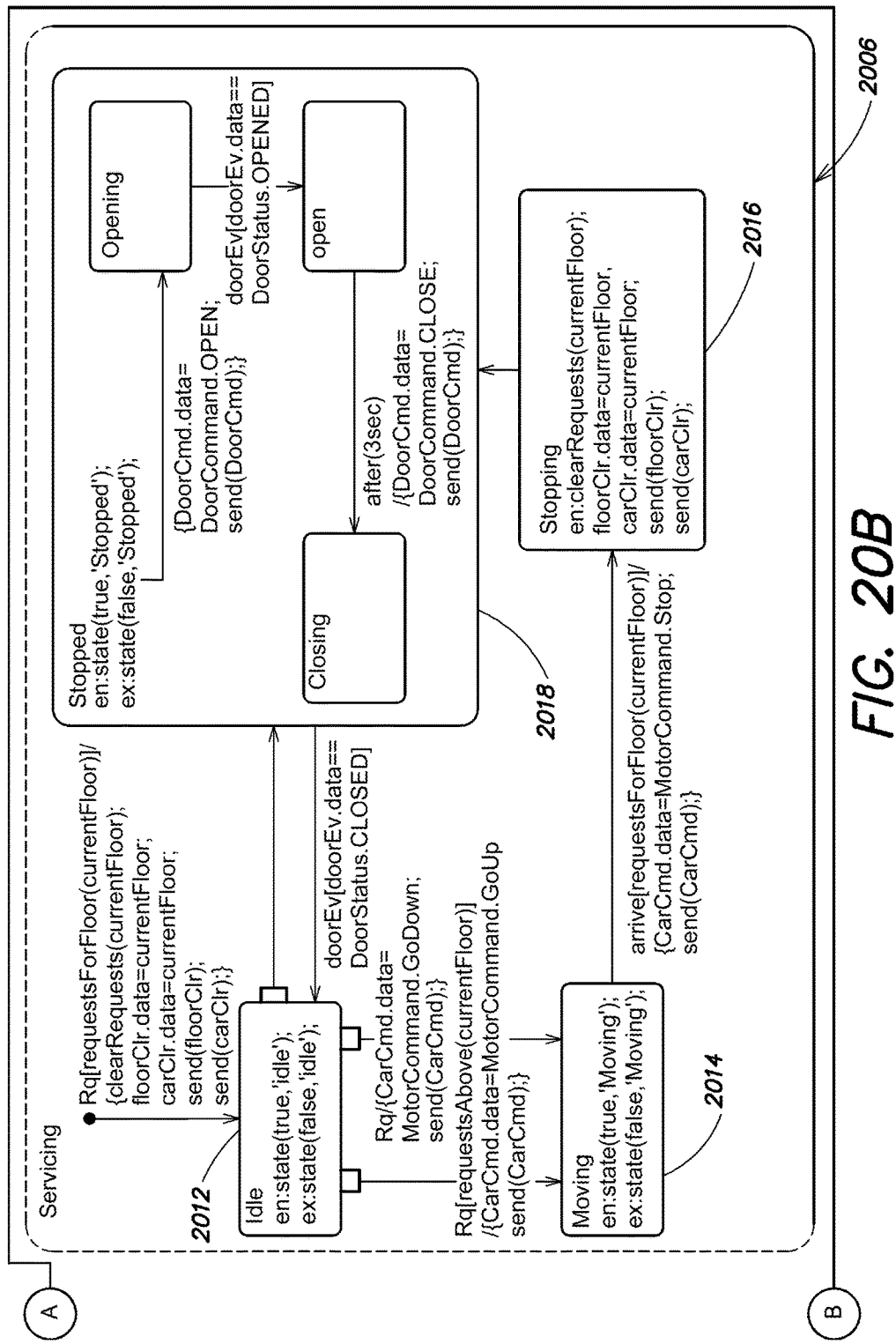

FIGS. 20A and 20B are partial views of a schematic illustration of the controller state chart 1904, which has been opened to show the components and other model elements that make up the controller state chart 1904. Specifically, the controller state chart 1904 includes a requests state 2002, a floors state 2004, and a servicing state 2006, which may be orthogonal (AND) states of the controller state chart 1904. The requests state 2002, in turn, may include a LogRequests state 2007. The floors state 2004 may include an AtFloor state 2008 and a BetweenFloors state 2010. The servicing state 2006 may include an idle state 2012, a Moving state 2014, a stopping state 2016, and a stopped state 2018. The controller state chart 1904 may include other model elements, such as graphical elements representing state transitions and conditions, and textual elements representing commands or functions to be executed or performed during execution of the controller state chart 1904. The sending of a message may be textually specified using a predefined syntax, such as 'send(MessageName, payload)'.

The graphical model 1700 may be executed, and the model execution analyzer 122 may monitor the creation of messages, and their exchange among components and other elements of the model. In addition, the auto diagram builder 126 may be configured to create one or more Message View windows that provide a visual representation of at least a portion of the model's message behavior. In an embodiment, the visual representation may present the messages in a temporal order that matches or at least closely resembles the temporal order that the messages were sent and received in terms of the model's execution time.

Figure 21:
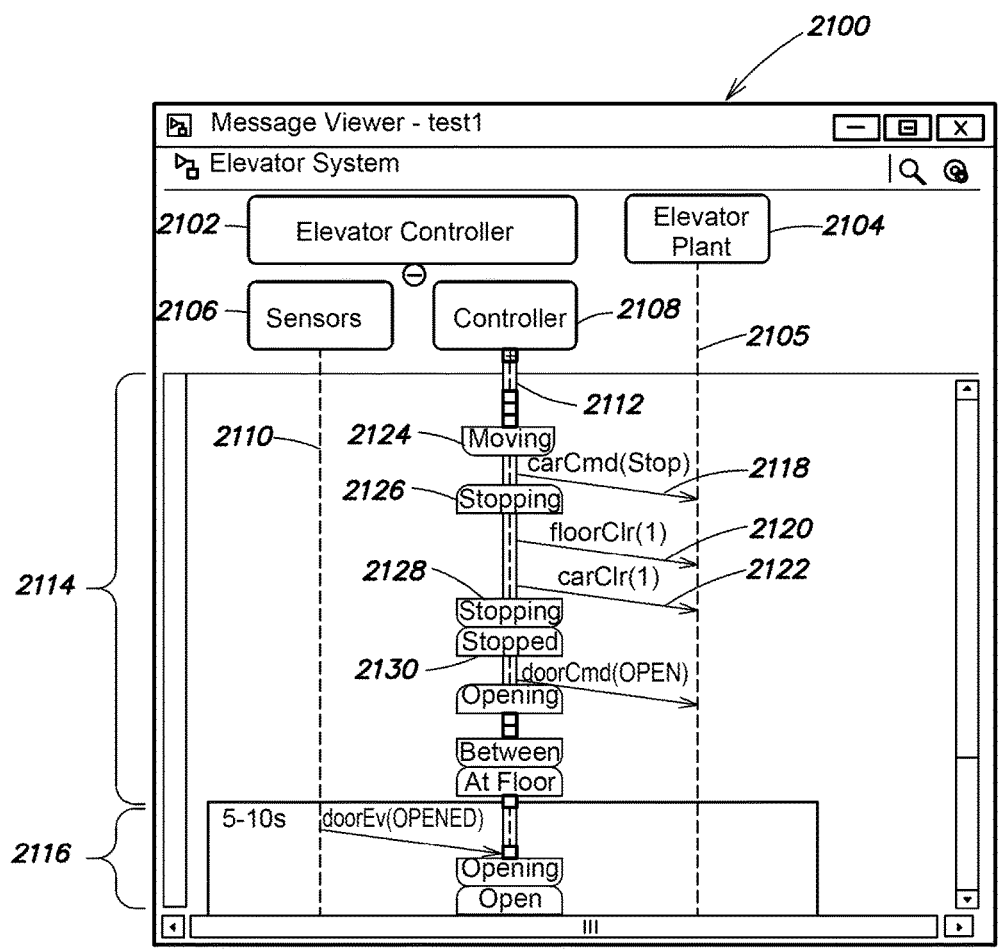
FIG. 21 is a schematic illustration of a Message View window in accordance with an embodiment of the disclosure.

FIG. 21 is a schematic illustration of a Message View window 2100 that may be generated by the user interface engine 128 and presented on a display, e.g., of a data processing device, such as a workstation, a laptop computer, a tablet computer, etc. The Message View window 2100 may include a plurality of lifelines or swim lanes representing particular components of the graphical model 1700, and the lifelines or swim lanes may scroll across a model execution time scale. Graphical affordances may be presented on the Message View window 2100 that represent particular messages. Specifically, the Message View window 2100 may include a first header 2102 that corresponds to the elevator controller 1 component 1804, and a second header 2104 that corresponds to the elevator plant component 1702. The Message View window 2100 also may include a first lifeline 2105 for the elevator plant component 1702. Instead of including a lifeline for the first header 2102, the lifeline and/or the first header 2102 may be expanded to provide a third header for the sensors component 1902 and a fourth 1 header for the controller state chart 1904. Sub-headers 2106 and 2108 and second and third lifelines 2110 and 2112 may be included for the sensors component 1902 and the controller state chart 1904, respectively. The Message View window 2100 also may include a plurality of model execution time bands or portions thereof, such as partial time bands 2114 and 2116, which cover portions of the execution time of the graphical model 1700.

The auto diagram builder 126 may be configured to provide one or more graphical affordances on the Message View window 2100 to represent at least some of the messages sent and received during execution of the graphical model 1700. In an embodiment, the auto diagram builder 126 may represent the occurrence of messages with arrows that extend between lifelines. The tail portion of an arrow may be located at the lifeline of the component that generated or sourced the message and at a point corresponding to the execution time at which the message was sent, while the head of the arrow may be located at the lifeline(s) of the component(s) that received the message and at a point corresponding to the execution time at which the message was received. With reference to FIG. 21, a first arrow 2118 may represent a Car Command (carCmd) type of message having a payload of 'Stop' that is generated by the controller state chart 1904 and received by the elevator plant component 1702. A second arrow 2120 may represent a floor clear (floorClr) type of message having a payload of '1' that is generated by the controller state chart 1904 and received by the elevator plant component 1702. A third arrow 2122 may represent a car clear (carClr) type of message having a payload of '1' that is generated by the controller state chart 1904 and received by the elevator plant component 1702.

In an embodiment, to the extent a lifeline represents a component having one or more states, the auto diagram builder 126 may be configured to include one or more graphical affordances on the Message View window 2100 that indicate when the one or more states are entered and/or exited during execution of the graphical model. In another embodiment, lifelines may be presented for one or more states. The graphical affordances used to indicate state entry and exit events may be presented in temporal order with respect to the sending and receiving of messages. For example, the auto diagram builder 126 may add one or more shapes or other widgets that include the name of the state being entered or exited. In an embodiment, the auto diagram builder 126 may use a first shape similar to an upper half of a flowchart terminator symbol to indicate a state being entered, and a second shape similar to a lower half of a flowchart terminator symbol to indicate a state being exited.

With reference to FIG. 21, a first state exit symbol 2124 may be disposed on the lifeline 2112 for the controller state chart 1904 to indicate when, in terms of model execution time, the moving state 2014 is exited. A first state entry symbol 2126 may be disposed on the lifeline 2112 to indicate when the stopping state 2016 is entered. A second state exit symbol 2128 indicates when the stopping state 2016 is exited, while a second state entry symbol 2130 indicates when the stopped state 2006 is entered. Arrows having tails that join a lifeline between state entry and exit symbols, such as arrows 2120 and 2122, indicate messages being sent while a state is active, e.g., the stopping state. By evaluating the state entry and exit symbols displayed on a lifeline, a user can understand which states are active at particular execution intervals or times, and the messages that are sent or received while those states are active. It should be understood that other graphical indicators may be used. For example, the segment of a lifeline that corresponds to the state being active could be colored differently than other segments of the lifeline, the line could have a different style, etc.

A user may expand the lifelines of a component, such as the lifeline 2112, which represents the controller state chart 1904, to obtain more detailed information regarding the hierarchy of states within the controller state chart 1904, when those states are active, and the messages being exchanged. A user may also collapse the details of behavior while in one state. For example, in response to user input, the auto diagram builder 126 may be configured to collapse state entry and state exit symbols together so that the symbols appear adjacent to each other in the Message View window. The details of state behavior between the state entry and state exit, which may not be of interest to the user, may thus be hidden from view. For example, the arrows may be omitted or otherwise not shown on the Message Viewer window.

Figure 22:
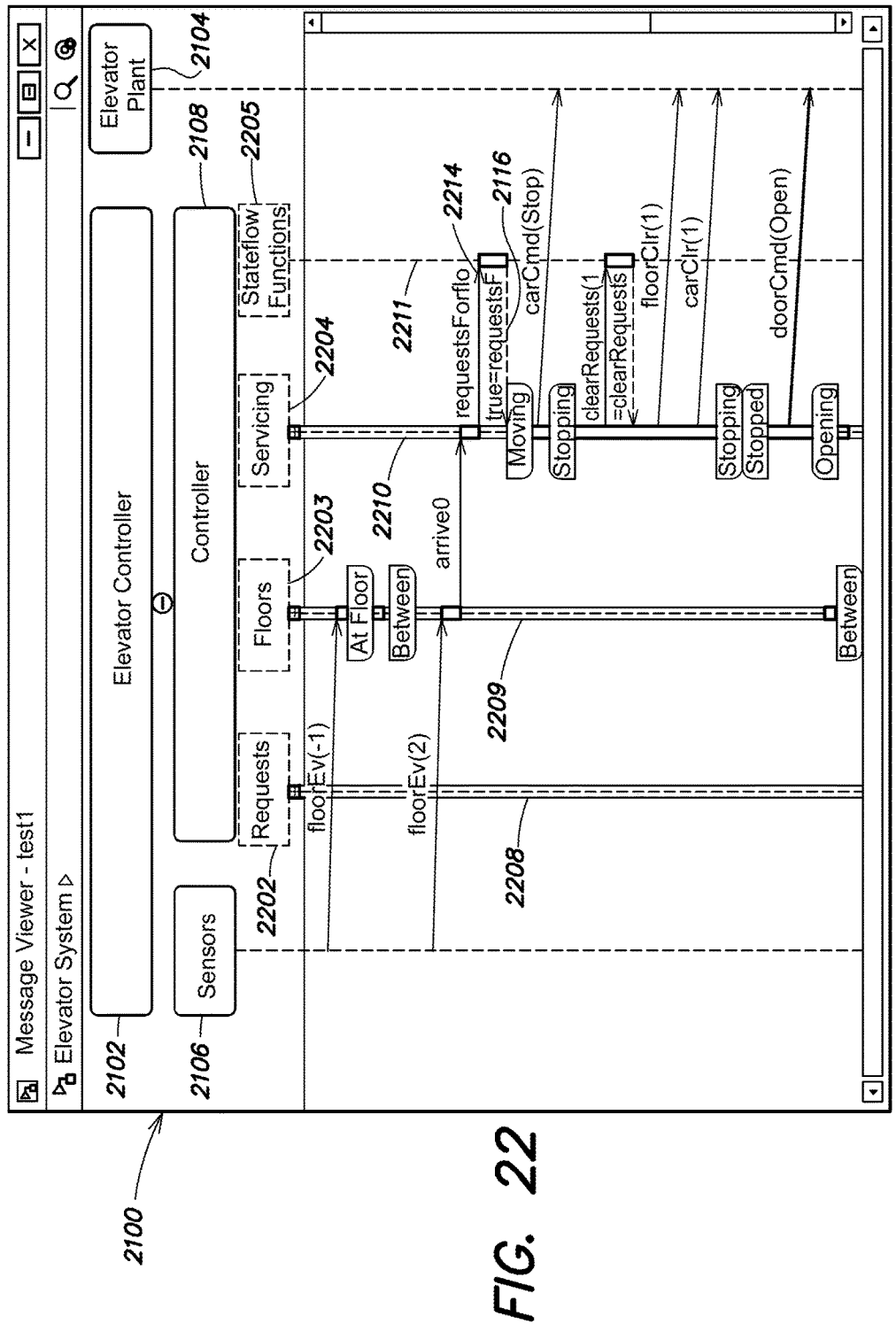
FIG. 22 is a schematic illustration of a Message View window in accordance with an embodiment of the disclosure.

FIG. 22 is a schematic illustration of the Message View window 2100 in which the lifeline 2112 for the controller state machine 1904 is replaced with separate headers 2202-2205 and lifelines 2208-2211 of the state and other components or elements of the controller state machine 1904. Specifically, the header 2202 and the lifeline 2208 represent the requests state 2002. The header 2203 and the lifeline 2209 represent the floors state 2004. The header 2204 and the lifeline 2210 represent the servicing state 2006.

To the extent a graphical model or portion thereof, such as a state chart, includes one or more functions, such as function defined in a text-based programming language or development environment having dynamic typing that supports array-based functionality, such as the MATLAB environment, functions defined in a state transition diagramming language supporting hierarchy, even broadcast, and AND/OR state decomposition, such as the Stateflow modeling environment, or other functions, the auto diagram builder 126 may be configured to include one or more headers and lifelines for these functions. For example, to the extent the controller state chart 1904 includes one or more Stateflow functions that may be called and may return results or other data or information, the auto diagram builder 126 may include the header 2205 and the lifeline 2211 to represent the Stateflow functions. In addition, the auto diagram builder 126 may be configured to include graphical affordances on the Message View window 2100 that represent calls to the one or more functions represented by the Stateflow functions header 2205 and the lifeline 2211. With reference to FIG. 22, a first arrow 2214 may represent a function call, e.g., requestsForFloor( ) to the Stateflow functions, and a second arrow 2216 may represent the function return, e.g., true=requestsForFloor. The first arrow 2214 may have a tail located at or near the lifeline(s) associated with the component(s) or other model element(s) that issued the function call, while the second arrow 2216 may have a head located at or near the lifeline(s) associated with the component(s) or other model element(s) that received the function return.

In an embodiment, the user interface engine 128 may be configured to include one or more Message View windows in a desktop environment, model editor or other Graphical User Interface (GUI) created by the user interface engine 102.

Figure 23A:
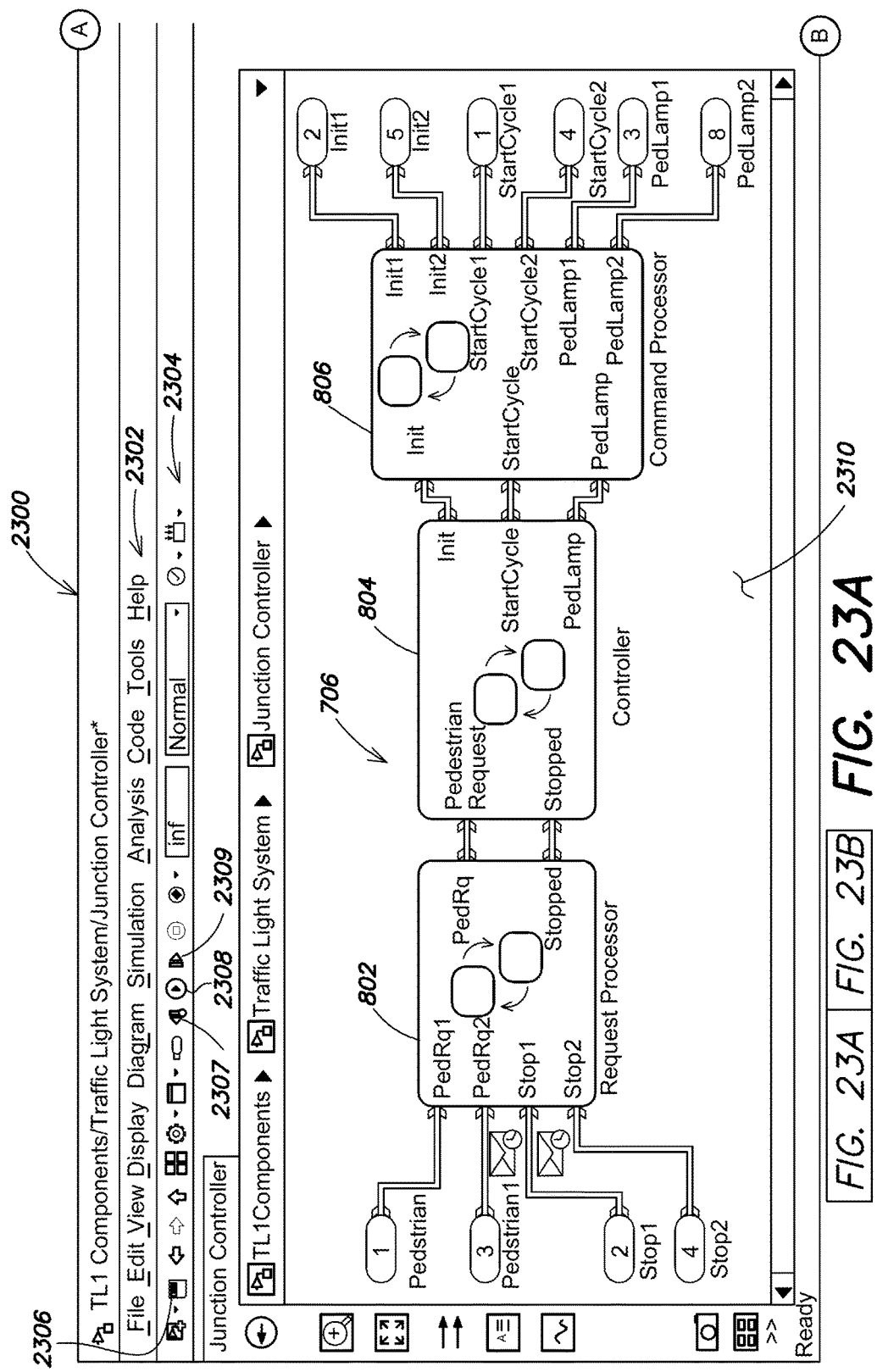
FIGS. 23A and 23B are partial views of a schematic illustration of a model editor window in accordance with an embodiment of the disclosure.
Figure 23B:
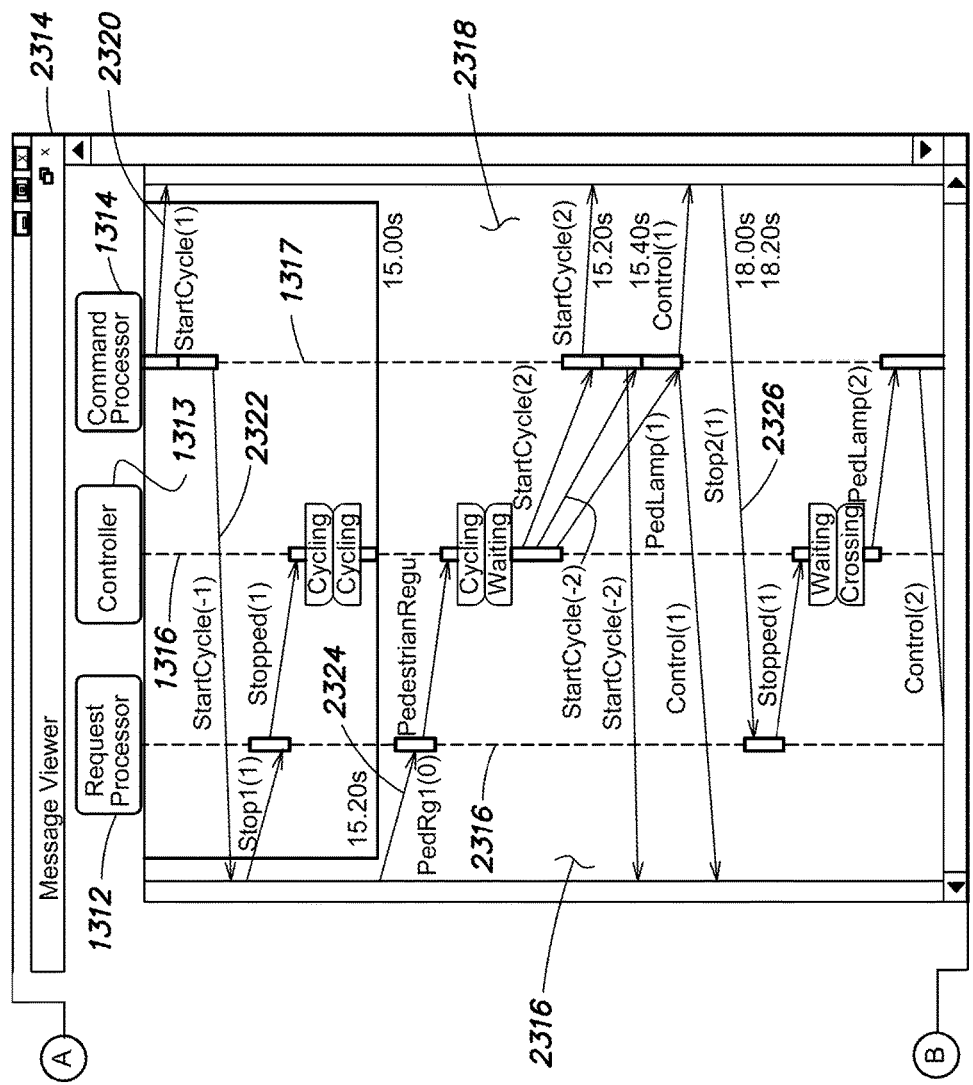

FIGS. 23A and 23B are partial views of a schematic illustration of a model editor window 2300, which may be presented on a display of a data processing device by a processor. The model editor window 2300 may include a plurality of graphical affordances or widgets, such as a menu bar 2302 and a toolbar 2304. The menu bar 2302 may include a plurality of menu commands, such as File, Edit, View, Display, etc., one or more of which may be organized into drop down menus that present user selectable commands. The toolbar 2304 may include a plurality of command buttons, which may be in the form of icons, such as a Save button 2306, a Run button 2308, a Backward step button 2307, a Forward step button 2309, and a Pause button (not shown), among others. In response to the selection of the Run button 2308, e.g., by a user, the simulation engine 106 may execute the graphical model opened in the model editor window 2300. The model editor window 2300 also may include a model canvas 2310 for presenting one or more views of a graphical model or portions thereof, such as the Junction Controller model 706.

In an embodiment, the user interface engine 128 may be configured to include a Message View window 2314 within or as part of the model editor window 2300. For example, the Message View window 2314 and the model canvas 2310 may be vertically arranged, e.g., side-by-side, horizontally arranged, e.g., one over the other, or arranged in some other configuration. In an embodiment, the modeling environment 100 may be configured to match the components of the graphical program 706 presented on the model canvas 2310 with the components whose lifelines 1315-1317 are presented in the Message View window 2314. In a first embodiment, selection of the graphical program or portion thereof may control which headers and lifelines are presented in the Message View window 2314. In a second embodiment, selection of headers and lifelines in the Message View window 2314 may control which graphical model or portion thereof is presented on the model canvas 2310.

In addition, the diagramming tool 120 may be configured to operate the Message View window 2314 in a live or dynamic mode during execution of the graphical model 2312. More specifically, the simulation engine 106 may be configured to execute, e.g., run, a graphical model opened on the model canvas 2310. During execution, model input values may be received and processed, and model output values may be computed. In addition, one or more states may be entered and exited during execution of the graphical model. Furthermore, one or more components may generate and send messages, and the messages may be received, queued, and/or processed by other model components. The diagramming tool 120 may be configured to operate the Message View window 2314 to provide a visual indication of at least some of the messages being generated and sent, the components that generate and send the messages, the components that receive the messages, and the state of the components as the messages are sent or received. In the live or dynamic mode, the diagramming tool 120 may be configured to scroll the lifelines 1315-1317 presented in the Message View window 2314 automatically, e.g., in an upward direction, so that new space, e.g., toward the bottom of the Message View window 2314, may be made available for presenting new messages.

The diagramming tool 126 may be configured to represent a message on a Message View window even though there is no lifeline for the component that either sent or received the message. The diagramming tool 126 may cause the arrows representing such messages to start or end at one or more particular locations on the Message View window. For example, the diagramming tool 126 may configure the Message View window 2314 with a first area 2316 and a second area 2318 disposed along the left and right side edges of the Message View window 2314, respectively. The first and second areas 2316 and 2318 may be referred to as gutters. For a message that is sent by a component represented by a lifeline, but received by a component that is not represented by a lifeline within the current view, the head of the respective arrow, such as arrows 2320 and 2322, may be located at the first or second areas 2316 and 2318. For messages that are sent by a component that is not represented by a lifeline in the current view, but is received by a component that is represented by a lifeline in the current view, such as arrows 2324 and 2326, the tail of the respective arrow may be located at the first or second areas 2316 and 2318. In an embodiment, the first and second areas 2316 and 2318 are oriented in a similar manner as the lifelines, e.g., vertically, to maintain the same illustration of arrows as between the lifelines 1315-1317.

By hovering a cursor over such arrows 2320, 2322, 2324, and 2326, the diagramming tool 126 may cause one or more pop-up windows (not shown) to be presented on the Message View window 2314 that provides additional information about the respective message, such as the name or identity of the component that sent or received the message, which is not represented by a lifeline.

Figure 24A:
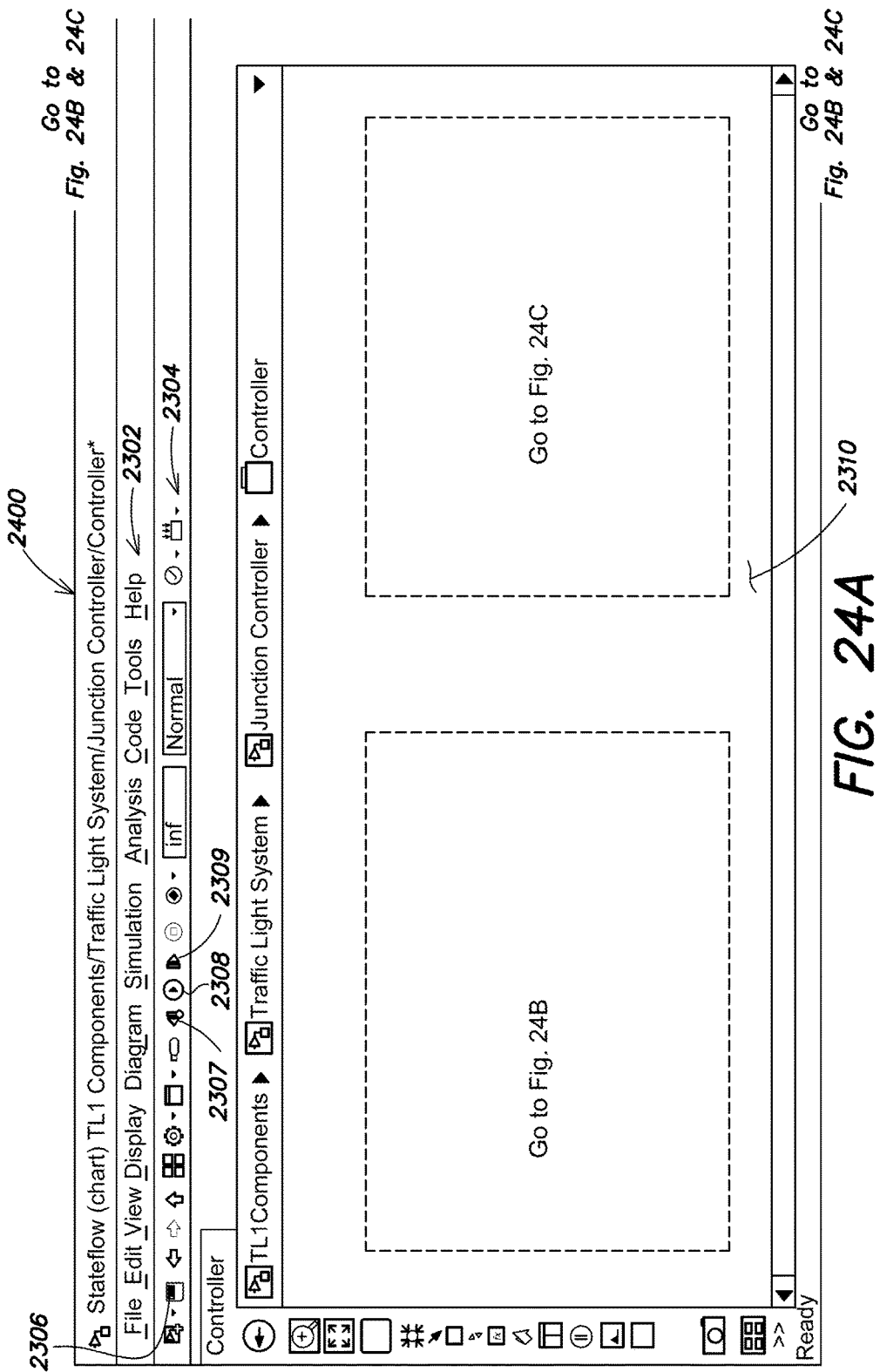
FIGS. 24A-24C are partial views of a schematic illustration of a model editor window in accordance with an embodiment of the disclosure.
Figure 24B:
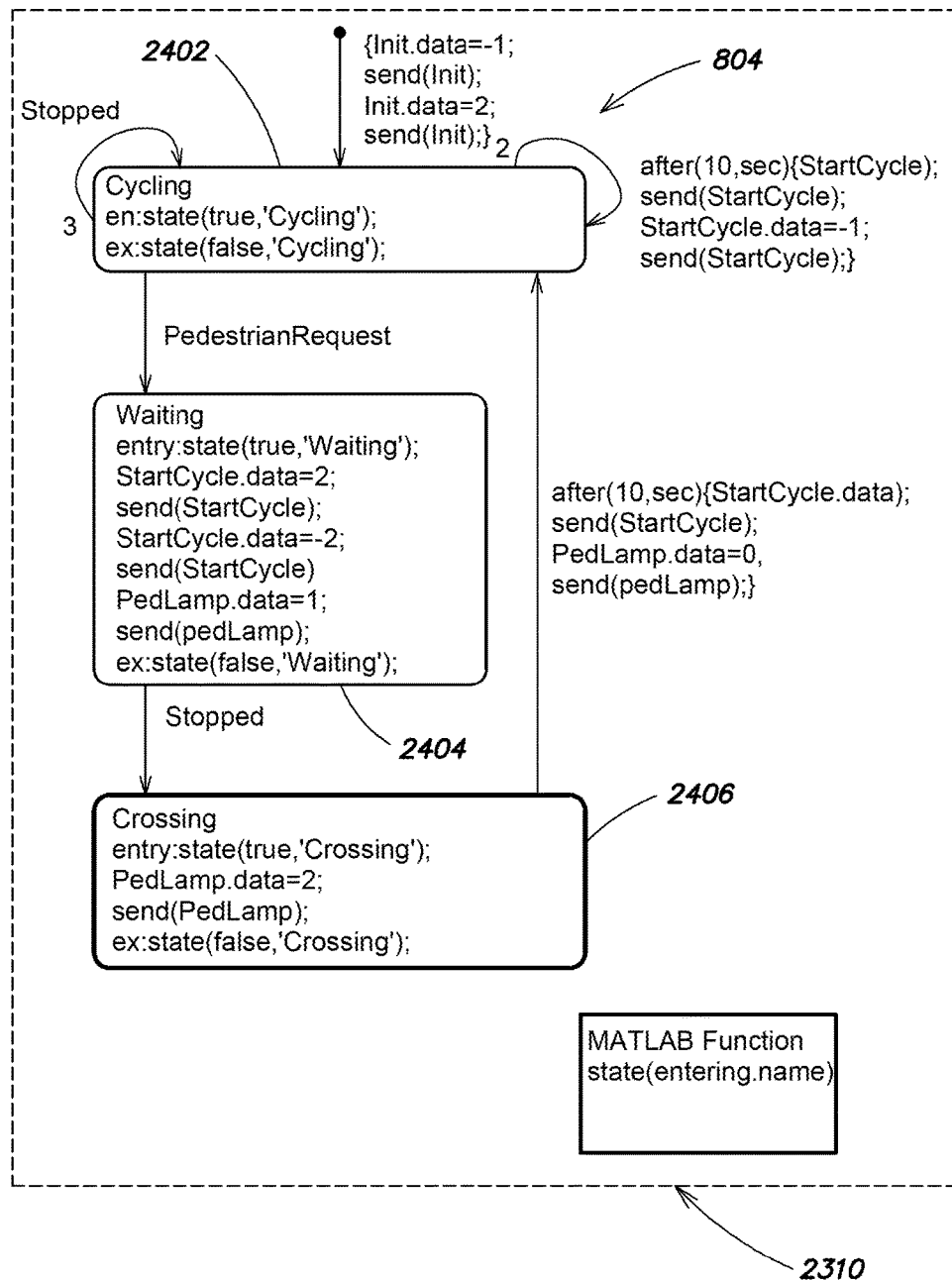
Figure 24C:
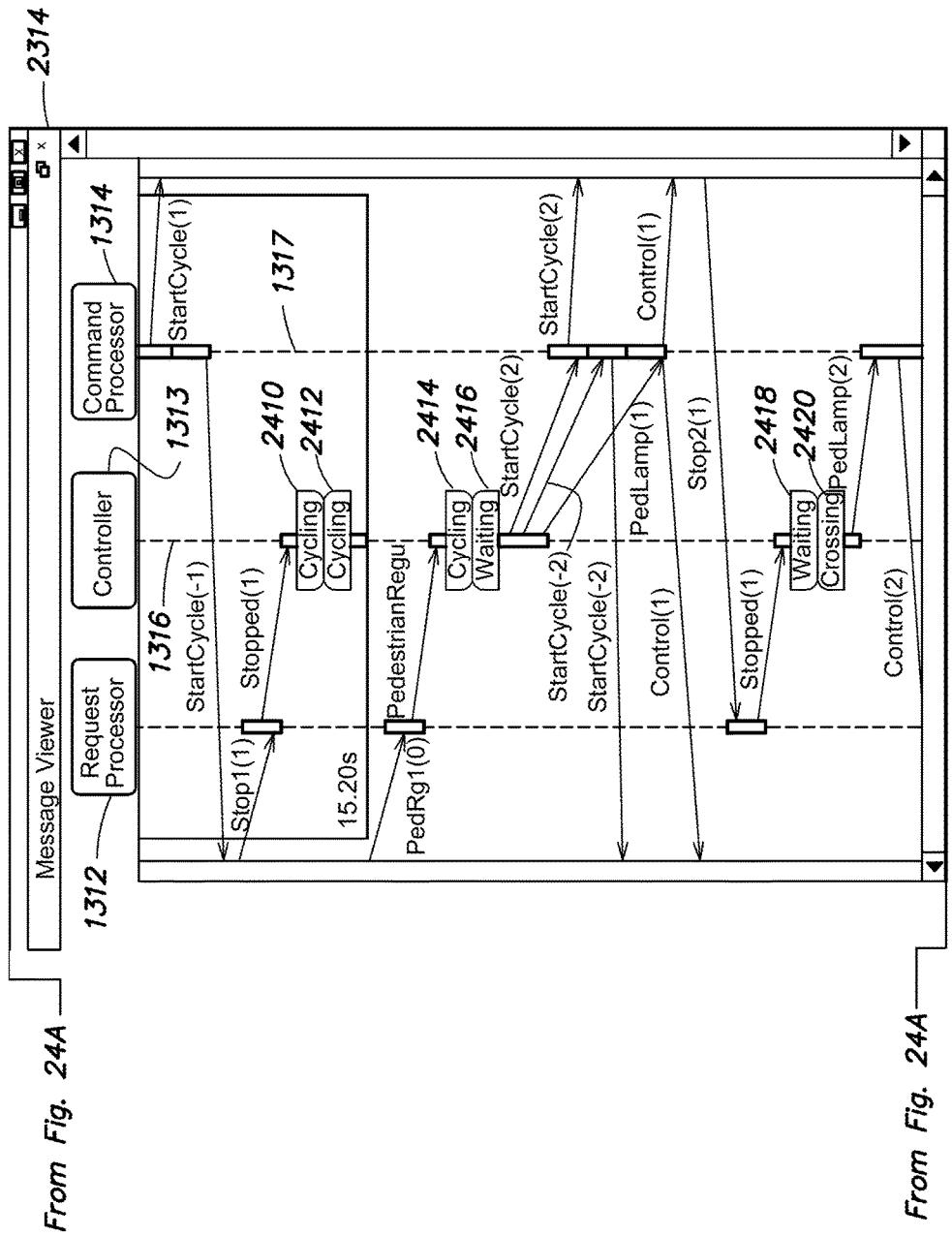

FIGS. 24A-24C are partial views of a schematic illustration of another embodiment of a model editor window 2400. In this embodiment, the graphical model or portion thereof presented in the model canvas 2310 may be different from the components whose lifelines are presented in the Message View window 2314. For example, the controller component 804 of the junction controller component 706 may be opened and displayed on the model canvas 2310. The controller component 804 may be a state diagram that includes a Cycling state 2402, a Waiting state 2404, and a Crossing state 2406. The diagramming tool 120 may include graphical affordances on the lifeline 1316 for the controller component 804 that indicates when these states are entered and exited. For example, a first graphical affordance 2410 indicates the exiting of the Cycling state. A second graphical affordance 2412 indicates the entering of the Cycling state. A third graphical affordance 2414 indicates the exiting of the Cycling state. A fourth graphical affordance 2416 indicates the entering of the Waiting state. A fifth graphical affordance 2418 indicates the exiting of the Waiting state, and a sixth graphical affordance 2420 indicates the entering of the Crossing state.

As the graphical model executes the user interface engine 102 may animate one or more portions of the model. For example, the user interface engine 102 may use one or more graphical affordances to indicate when a particular component or element of the model, as presented on the model canvas 2310, is executing and/or active. For example, the user interface engine 102 may highlight a block or state of a graphical model when it is executing or active. With reference to FIG. 24B, the Crossing state 2406 may be highlighted or the color of its border may be changed or bolded to indicate that, at this point in the model execution, the controller component 804 is currently in the Crossing state 2406. In other words, the diagramming tool 120 and the user interface engine 102 may cooperate to provide an animation mode for the execution of the graphical model, as presented on the model canvas 2310, and a live or dynamic mode for the Message View window 2314. In the live or dynamic mode, arrows representing messages pop up on the Message View window when those messages occur during execution of the model. By observing the model editor window 2400 and, in particular, the model canvas 2310, which may illustrate the execution of a model in an animated fashion, and the Message View window 2314, which may illustrate the model's messaging behavior, a user may obtain a better understanding of the model's operation.

The auto diagram builder 126 may be configured to present an animated version of the Message View window during execution of the model. In this case, arrows may be presented on the Message View window even though the messages that correspond to those arrows have not yet occurred during the current execution of the model. The arrows may be arranged within the Message View window based on a prior execution of the model, or an analysis of the model. As the message occurs during a current execution of the model, a graphical affordance or widget may be used to mark the respective arrow (which is already present) on the Message View window. For example, when the message corresponding to a given arrow occurs during model execution, the auto diagram builder 126 may be configured to display the given arrow in bold, in a new color, with a shadow, blinking, etc. Animation of arrows on the Message View window may be presented serially, e.g., bolding one arrow at a time, or the animation may be batched. For example, if a first message triggers the occurrence of a second message, the arrows for both message may be bolded at the same time, e.g., to improve the display of the animation.

In another embodiment, the auto diagram builder 126 may be configured to display graphical affordances on the model canvas as an animated version of message exchange.

In an embodiment, the simulation engine 106 may be configured to pause or step the execution of the graphical model, for example in response to a user selecting the Backward step button 2307, the Forward step button 2309, or a Pause button. The diagramming tool 120 may be similarly configured to pause or step the Message View window 2314 with the pausing or stepping of the graphical model in response to the selection of the Backward step button 2307, the Forward step button 2309, or a Pause button. The diagramming tool 126 may be configured to step or pause the Message View window in sync with the stepping or pausing of the model execution.

The modeling environment 100 may further include one or more debugging tools. The debugging tool may be configured to insert a breakpoint into the execution of a model in response to a user marking a breakpoint at a desired location in the Message View window. For example, a user may select a point along a lifeline and insert a breakpoint at that selected point. The auto diagram builder 126 may be configured to present a particular graphical affordance or widget on the lifeline to indicate the addition of a breakpoint. The breakpoint may be used to indicate that execution of the model should halt when a message to a particular lifeline is sent, when a message from a particular lifeline is sent, or when a message from one particular lifeline to another particular lifeline is sent. After inserting a breakpoint, a user may step backwards through the execution of the model, then re-run the model stopping at the specified breakpoint. For example, the simulation engine 106 may be configured to pause and backstep a model. In addition, a user may re-run a model following the insertion of a breakpoint. The subsequent execution of the model may need to be identical to the prior execution of the model, when the breakpoint was inserted, or determined to match that prior execution.

Model execution may then be resumed until some specified occurrence, such as the next breakpoint is encountered, execution associated with a current or designated lifeline completes, execution associated with a new or next lifeline is activated, etc. Furthermore, a call stack listing all messages may be presented and a selection may be made of a particular message from the call stack. Execution may proceed until the selected message occurs, such that the selected message operates as a breakpoint.

In an embodiment, the message view window presents a trace of at least some of the messages sent and received during execution of a graphical model in the temporal order that the messages were sent and received. To the extent the trace extends across a model execution time that is larger than the display area assigned to the message view window, one or more vertical scroll bars may be provided. A user may operate the one or more vertical scroll bars to navigate to different model execution time periods of the message trace. In addition, to the extent message view window includes more lifelines than can be shown in the display area assigned to the message view window, one or more horizontal scroll bars may be provided. A user may operate the one or more horizontal scroll bars to bring one or more lifelines into view on the message view window. In addition, a zoom in/zoom out feature may be provided.

Illustrative Data Processing System

Figure 25:
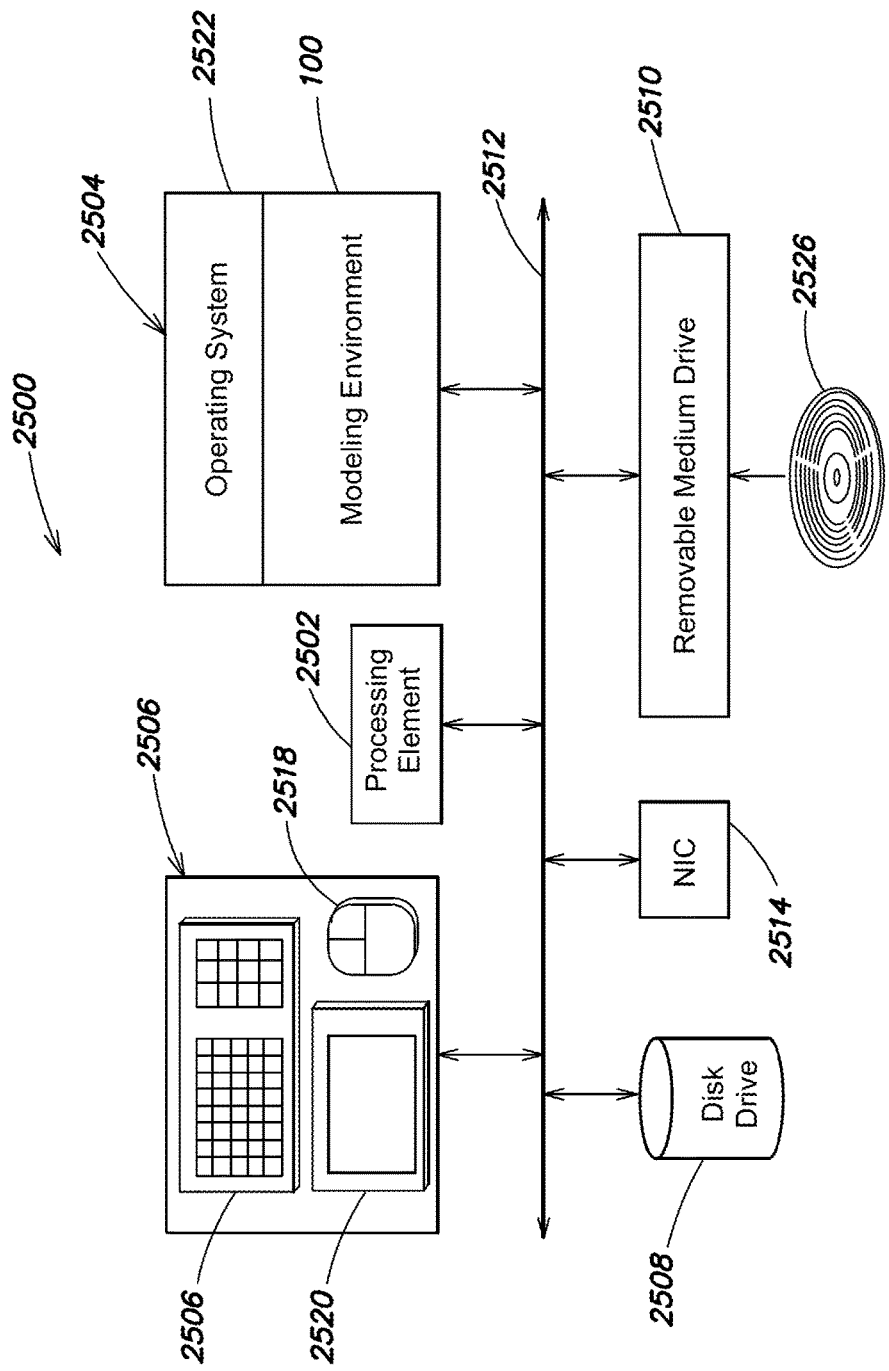
FIG. 25 is a schematic illustration of a data processing system in accordance with an embodiment of the disclosure.

FIG. 25 is a schematic illustration of a computer or data processing system 2500 for implementing an embodiment of the invention. The computer system 2500 may include one or more processing elements, such as a processing element 2502, a main memory 2504, user input/output (I/O) 2506, a persistent data storage unit, such as a disk drive 2508, and a removable medium drive 2510 that are interconnected by a system bus 2512. The computer system 2500 may also include a communication unit, such as a network interface card (NIC) 2514. The user I/O 2506 may include a keyboard 2516, a pointing device, such as a mouse 2518, and a display 2520. Other user I/O 2506 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2504, which may be a Random Access Memory (RAM), may store a plurality of program libraries or modules, such as an operating system 2522, and one or more application programs that interface to the operating system 2522, such as the modeling environment 100.

The removable medium drive 2510 may accept and read a computer readable medium 2526, such as a CD, DVD, floppy disk, solid state drive, tape, flash memory or other non-transitory medium. The removable medium drive 2510 may also write to the computer readable medium 2526.

Suitable computer systems include personal computers (PCs), workstations, servers, laptops, tablets, palm computers, smart phones, electronic readers, and other portable computing devices, etc. Nonetheless, those skilled in the art will understand that the computer system 2500 of FIG. 25 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment application 102 may be hosted on a server, and accessed by a remote client through an application hosting system, such as the Remote Desktop Connection tool from Microsoft Corp.

Suitable operating systems 2522 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 2522 may provide services or functions for other modules, such as allocating memory, organizing data according to a file system, prioritizing requests, etc. The operating system 2522 may run on a virtual machine, which may be provided by the data processing system 2500.

As indicated above, a user or developer, such as an engineer, scientist, programmer, etc., may utilize one or more input devices, such as the keyboard 2516, the mouse 2518, and the display 2520 to operate the modeling environment 200, and construct one or more graphical skeleton components and/or one or more models that include one or more graphical skeleton components. As discussed, the graphical models may be computational and may have executable semantics. In particular, the models may be executable. In particular, the model may provide one or more of time-based, event-based, state-based, frequency-based, control-flow based, and dataflow-based execution semantics. The execution of a model may simulate operation of the system that is being designed or evaluated. The term graphical model, moreover, is intended to include graphical program.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIG. 2, the order of the acts may be modified in other implementations. Further, non-dependent acts may be performed in parallel.

In addition, while particular examples of graphical affordances have been described and shown, it should be understood that other graphical affordances may be used. For example, other connectors, such as lines, boxes, bars, etc., may be used instead of or in addition to the arrows. Similarly, other icons or widgets may be used. In addition, various combinations of features may be combined in one or more of the message sequence diagrams of the invention.

Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more tangible computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing in a memory an executable graphical model including a plurality of components including hierarchically arranged child components disposed within parent components, the child components configured to send and receive messages during execution of the graphical model in an order, the messages
      persist for determined time intervals between a model execution start time and a model execution end time, and
      have payloads that remain fixed for a given send-receive interaction;
   identifying, by a processor coupled to the memory:
      the child components configured to send and receive messages, and
      the determined time intervals of the messages;
   automatically generating, by the processor, a message view window for the graphical model, the message view window including:
      an execution time scale corresponding to a time of execution of the graphical model,
      parent lifelines corresponding to the parent components, the parent lifelines extending across the execution time scale, and
      a plurality of first graphical affordances associated with the parent lifelines, the plurality of first graphical affordances representing the messages, the plurality of first graphical affordances arranged in the order of the messages; and
   expanding a given parent lifeline corresponding to a given parent component of the executable graphical model to show child lifelines corresponding to at least two of the child components of the given parent component.

2. The method of claim 1 wherein the expanding occurs in response to user interaction with the message view window.

3. The method of claim 1 further comprising:
   moving, in response to user interaction with the message view window, at least one of the parent lifelines from a first location on the message view window to a second location on the message view window, where the plurality of first graphical affordances remain associated with the at least one of the parent lifelines moved to the second location.

4. The method of claim 1 further comprising:
   hiding at least one of the parent lifelines from view on the message view window; and
   showing, on the message view window, the at least one of the parent lifelines that had been hidden.

5. The method of claim 1 wherein one or more of the plurality of first graphical affordances extend between a pair of parent or child lifelines.

6. The method of claim 1 wherein the plurality of first graphical affordances are arrows including heads and tails, and the heads and tails of at least two of the arrows are located at the parent and child lifelines.

7. The method of claim 6 wherein the message view window includes one or more gutter areas configured to represent parent or child components for which no lifelines are included, and
   a head or a tail of a first arrow is located at the one or more gutter areas.

8. The method of claim 1 further comprising:
   receiving a designation of a given one of the first graphical affordances corresponding to a particular one of the messages; and
   in response to the receiving, providing a widget configured to present information regarding the particular one of the messages.

9. The method of claim 1 wherein the time scale is organized into a plurality of time bands that correspond to time periods between the execution start time and the execution end time, the method further comprising:
   receiving a designation of a given one of the plurality of time bands; and
   in response to the receiving, providing finer execution time granularity within the given one of the plurality of time bands.

10. The method of claim 9 wherein the designation of the given one of the plurality of time bands is a mouse hover operation over the given one of the plurality of time bands.

11. The method of claim 1 further comprising:
    providing an animated view of the execution of the graphical model,
    where the message view window is a live image configured to update in sync with the animated view of the execution of the graphical model.

12. The method of claim 11 wherein the message view window is adjacent to the animated view of the execution of the graphical model.

13. The method of claim 1 wherein the graphical model includes a graphical object that represents the message view window, the method further comprising:
    receiving a designation of the graphical object; and
    in response to receiving the designation of the graphical object, opening the message view window on a display.

14. The method of claim 1 wherein the child components of the executable graphical model are
    state-based components,
    time-based components,
    event-based components,
    dataflow-based components,
    control flow-based components, or
    dataflow and control flow-based components.

15. The method of claim 1 further comprising:
    collapsing the given parent lifeline corresponding to the given parent component of the executable graphical model to hide the child lifelines corresponding to the at least two of the child components of the given parent component.

16. The method of claim 15 wherein the collapsing is performed in response to receiving a user command.

17. A method comprising:
storing in a memory an executable graphical model including a plurality of state-based components configured to send and receive messages during execution of the graphical model in an order, the messages
persist for determined time intervals between a model execution start time and a model execution end time, and
have payloads that remain fixed for a given send-receive interaction;
identifying, by a processor coupled to the memory:
the components configured to send and receive messages, and
automatically generating, by the processor, a message view window for the graphical model, the message view window including:
an execution time scale corresponding to a time of execution of the graphical model,
lifelines corresponding to at least two of the state-based components, the lifelines extending across the execution time scale,
a plurality of first graphical affordances associated with the lifelines, the plurality of first graphical affordances representing the messages, the plurality of first graphical affordances arranged in the order of the messages, and
a plurality of second graphical affordances indicating, for at least one of the plurality of state-based components, an entry into a first state and an exit from the first state,
wherein at least one of the plurality of second graphical affordances identifies a name of the first state.

18. The method of claim 17 wherein the plurality of second graphical affordances are disposed along a first lifeline assigned to the at least one of the plurality of state-based components.

19. The method of claim 17 wherein the order is
a temporal order,
an execution order, or
a temporal and an execution order.

20. The method of claim 17 wherein the executable graphical model executes over a plurality of simulation time steps, and the order includes a temporal order based on the plurality of time steps.

21. The method of claim 17 wherein a group of the plurality of first graphical affordances represent messages occurring between the entry into the first state and the exit from the first state, the method further comprising:
collapsing the plurality of second graphical affordances that indicate the entry into the first state and the exit from the first state; and
hiding the group of the plurality of first graphical affordances that represent messages occurring between the entry into the first state and the exit from the first state.

22. One or more non-transitory computer-readable media including stored thereon instructions that when executed by a computing device cause the computing device to perform operations comprising:
storing in a memory an executable graphical model including a plurality of components including hierarchically arranged child components disposed within parent components, the child components configured to send and receive messages during execution of the graphical model in an order, the messages
persist for determined time intervals between a model execution start time and a model execution end time, and
have payloads that remain fixed for a given send-receive interaction;
identifying, by a processor coupled to the memory:
the child components configured to send and receive messages, and
the determined time intervals of the messages;
automatically generating, by the processor, a message view window for the graphical model, the message view window including:
an execution time scale corresponding to a time of execution of the graphical model,
parent lifelines corresponding to the parent components, the parent lifelines extending across the execution time scale, and
a plurality of first graphical affordances associated with the parent lifelines, the plurality of first graphical affordances representing the messages, the plurality of first graphical affordances arranged in the order of the messages; and
expanding a given parent lifeline corresponding to a given parent component of the executable graphical model to show child lifelines corresponding to at least two of the child components of the given parent component.

23. The one or more non-transitory computer-readable media of claim 22 wherein the expanding occurs in response to user interaction with the message view window.

24. The one or more non-transitory computer-readable media of claim 22 wherein the operations performed by the computing device further comprise:
moving, in response to user interaction with the message view window, at least one of the parent lifelines from a first location on the message view window to a second location on the message view window, where the plurality of first graphical affordances remain associated with the at least one of the parent lifelines moved to the second location.

25. The one or more non-transitory computer-readable media of claim 22 wherein the message view window includes one or more gutter areas configured to represent parent or child components for which no lifelines are included.

26. The one or more non-transitory computer-readable media of claim 22 wherein the operations performed by the computing device further comprise:
receiving a designation of a given one of the first graphical affordances corresponding to a particular one of the messages; and
in response to the receiving, providing a widget configured to present information regarding the particular one of the messages.

27. The one or more non-transitory computer-readable media of claim 22 wherein the time scale is organized into a plurality of time bands that correspond to time periods between the execution start time and the execution end time, the method further comprising:
receiving a designation of a given one of the plurality of time bands; and
in response to the receiving, providing finer execution time granularity within the given one of the plurality of time bands.

28. The one or more non-transitory computer-readable media of claim 22 wherein the operations performed by the computing device further comprise:

providing an animated view of the execution of the graphical model, where the message view window is a live image configured to update in sync with the animated view of the execution of the graphical model.

29. The one or more non-transitory computer-readable media of claim 22 wherein the graphical model includes a graphical object that represents the message view window, the method further comprising:

receiving a designation of the graphical object; and in response to receiving the designation of the graphical object, opening the message view window on a display.

30. The one or more non-transitory computer-readable media of claim 22 wherein the operations performed by the computing device further comprise:

collapsing the given parent lifeline corresponding to the given parent component of the executable graphical model to hide the child lifelines corresponding to the at least two of the child components of the given parent component.

31. One or more non-transitory computer-readable media including stored thereon instructions that when executed by a computing device cause the computing device to perform operations comprising:

storing in a memory an executable graphical model including a plurality of state-based components configured to send and receive messages during execution of the graphical model in an order, the messages persist for determined time intervals between a model execution start time and a model execution end time, and have payloads that remain fixed for a given send-receive interaction;

identifying, by a processor coupled to the memory:

the components configured to send and receive messages, and automatically generating, by the processor, a message view window for the graphical model, the message view window including:

an execution time scale corresponding to a time of execution of the graphical model, lifelines corresponding to at least two of the state-based components, the lifelines extending across the execution time scale, a plurality of first graphical affordances associated with the lifelines, the plurality of first graphical affordances representing the messages, the plurality of first graphical affordances arranged in the order of the messages, and a plurality of second graphical affordances indicating, for at least two of the plurality of state-based components, an entry into a first state and an exit from the first state, wherein at least one of the plurality of second graphical affordances identifies a name of the first state.

32. The one or more non-transitory computer-readable media of claim 31 wherein the plurality of second graphical affordances are disposed along a first lifeline assigned to the at least two of the plurality of state-based components.

33. The one or more non-transitory computer-readable media of claim 31 wherein the order is a temporal order, an execution order, or a temporal and an execution order.

34. The one or more non-transitory computer-readable media of claim 31 wherein the executable graphical model executes over a plurality of simulation time steps, and the order includes a temporal order based on the plurality of simulation time steps.

35. One or more non-transitory computer-readable media including stored thereon instructions that when executed by a computing device cause the computing device to perform operations comprising:

accessing from a memory an executable graphical model including a plurality of components, the components issuing, during execution of the graphical model, at least two of:

messages that persist for determined time intervals within a time period between a model execution start time and a model execution end time, have payloads that remain fixed for a given send-receive interaction, and have a message order during the execution of the graphical model;

events having an event order during the execution of the graphical model; or function calls including a function call order during the execution of the graphical model;

automatically generating, by a processor coupled to the memory, a display for the executable graphical model, the display including:

an execution time scale corresponding to a time of execution of the graphical model;

lifelines corresponding to the components, the lifelines extending across the execution time scale; and at least two of:

first graphical affordances extending between the lifelines, the first graphical affordances representing the messages, and being arranged on the display in the message order;

second graphical affordances extending between the lifelines, the second graphical affordances representing the events, and being arranged on the display in the event order; or third graphical affordances extending between the lifelines, the third graphical affordances representing the function calls, and being arranged on the display in the function call order.

36. The one or more non-transitory computer-readable media of claim 35 wherein the graphical model executes over a plurality of simulation time steps, and at least one of the third graphical affordances is arranged on the display as occurring in one of the simulation time steps.

37. The one or more non-transitory computer-readable media of claim 36 wherein the at least one of the third graphical affordances is orthogonal to the lifelines.

38. The one or more non-transitory computer-readable media of claim 36 wherein the lifelines are arranged vertically on the display, and the at least one of the third graphical affordances is arranged horizontally on the display.

39. The one or more non-transitory computer-readable media of claim 35 wherein the graphical model executes over a plurality of simulation time steps, and at least one of the first graphical affordances is arranged on the display as being sent in a first of the simulation time steps and received in a second of the simulation time steps.

40. The one or more non-transitory computer-readable media of claim 39 wherein the lifelines are arranged vertically on the display, and the at least one of the first graphical affordances is arranged diagonally on the display.

41. The one or more non-transitory computer-readable media of claim 35 wherein the graphical model includes a state chart including a first state and a second state, and at least one of the events causes a transition from the first state to the second state.

42. A computer-implemented method comprising:
accessing from a memory an executable graphical model including a plurality of components, the components issuing, during execution of the graphical model, at least two of:
messages that persist for determined time intervals within a time period between a model execution start time and a model execution end time, have payloads that remain fixed for a given send-receive interaction, and have a message order during the execution of the graphical model;
events having an event order during the execution of the graphical model; or
function calls including a function call order during the execution of the graphical model;
automatically generating, by a processor coupled to the memory, a display for the executable graphical model, the display including:
an execution time scale corresponding to a time of execution of the graphical model;
lifelines corresponding to the components, the lifelines extending across the execution time scale; and
at least two of:
first graphical affordances extending between the lifelines, the first graphical affordances representing the messages, and being arranged on the display in the message order;
second graphical affordances extending between the lifelines, the second graphical affordances representing the events, and being arranged on the display in the event order; or
third graphical affordances extending between the lifelines, the third graphical affordances representing the function calls, and being arranged on the display in the function call order.

43. The computer-implemented method of claim 42 wherein the graphical model executes over a plurality of simulation time steps, and at least one of the third graphical affordances is arranged on the display as occurring in one of the simulation time steps.

44. The computer-implemented method of claim 43 wherein the at least one of the third graphical affordances is orthogonal to the lifelines.

45. The computer-implemented method of claim 43 wherein the lifelines are arranged vertically on the display, and the at least one of the third graphical affordances is arranged horizontally on the display.

46. The computer-implemented method of claim 42 wherein the graphical model executes over a plurality of simulation time steps, and at least one of the first graphical affordances is arranged on the display as being sent in a first of the simulation time steps and received in a second of the simulation time steps.

47. The computer-implemented method of claim 46 wherein the lifelines are arranged vertically on the display, and the at least one of the first graphical affordances is arranged diagonally on the display.

48. The computer-implemented method of claim 42 wherein the graphical model includes a state chart including a first state and a second state, and at least one of the events causes a transition from the first state to the second state.

49. An apparatus comprising:
an electronic memory storing an executable graphical model including a plurality of components, the components issuing, during execution of the graphical model, at least two of:
messages that persist for determined time intervals within a time period between a model execution start time and a model execution end time, have payloads that remain fixed for a given send-receive interaction, and have a message order during the execution of the graphical model;
events having an event order during the execution of the graphical model; or
function calls including a function call order during the execution of the graphical model; and
a processor coupled to the memory, the processor configured to:
automatically generate a display for the executable graphical model, the display including:
an execution time scale corresponding to a time of execution of the graphical model;
lifelines corresponding to the components, the lifelines extending across the execution time scale; and
at least two of:
first graphical affordances extending between the lifelines, the first graphical affordances representing the messages, and being arranged on the display in the message order;
second graphical affordances extending between the lifelines, the second graphical affordances representing the events, and being arranged on the display in the event order; or
third graphical affordances extending between the lifelines, the third graphical affordances representing the function calls, and being arranged on the display in the function call order.

50. The apparatus of claim 49 wherein the graphical model executes over a plurality of simulation time steps, and at least one of the third graphical affordances is arranged on the display as occurring in one of the simulation time steps.

51. The apparatus of claim 50 wherein the at least one of the third graphical affordances is orthogonal to the lifelines.

52. The apparatus of claim 50 wherein the lifelines are arranged vertically on the display, and the at least one of the third graphical affordances is arranged horizontally on the display.

53. The apparatus of claim 49 wherein the graphical model executes over a plurality of simulation time steps, and at least one of the first graphical affordances is arranged on the display as being sent in a first of the simulation time steps and received in a second of the simulation time steps.

54. The apparatus of claim 53 wherein the lifelines are arranged vertically on the display, and the at least one of the first graphical affordances is arranged diagonally on the display.

55. The apparatus of claim 49 wherein the graphical model includes a state chart including a first state and a second state, and at least one of the events causes a transition from the first state to the second state.

* * * * *

UNITED STATES PATENT AND TRADEMARK OFFICE
CERTIFICATE OF CORRECTION

PATENT NO. : 9,547,423 B1  
APPLICATION NO. : 14/513978  
DATED : January 17, 2017  
INVENTOR(S) : Alan J. Moore et al.

Page 1 of 1

It is certified that error appears in the above-identified patent and that said Letters Patent is hereby corrected as shown below:

In the Specification

Column 26, Line 10 reads:  
"third header for the sensors component 1902 and a fourth 1"  
Should read:  
--third header for the sensors component 1902 and a fourth--

Column 27, Line 60 reads:  
"requestsForFloor( ) to the Stateflow functions, and a second"  
Should read:  
--requestsForFloor( ), to the Stateflow functions, and a second--

In the Claims

Claim 31, Column 37, Line 53 reads:  
"ponents, an entry into a first state and an exit from the"  
Should read:  
--ponents, an entry into a first state or an exit from the--

Signed and Sealed this  
Twenty-eighth Day of May, 2019

Andrei Iancu  
*Director of the United States Patent and Trademark Office*